United States Patent
Rockel et al.

(10) Patent No.: US 11,615,597 B2
(45) Date of Patent: Mar. 28, 2023

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Philipp Rockel, San Francisco, CA (US); Dorian D. Dargan, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/483,761

(22) Filed: Sep. 23, 2021

(65) Prior Publication Data

US 2022/0101613 A1    Mar. 31, 2022

Related U.S. Application Data

(60) Provisional application No. 63/083,821, filed on Sep. 25, 2020.

(51) Int. Cl.
| | | |
|---|---|---|
| *G06T 19/00* | (2011.01) | |
| *G06F 3/01* | (2006.01) | |
| *G06T 19/20* | (2011.01) | |

(52) U.S. Cl.
CPC ............ *G06T 19/006* (2013.01); *G06F 3/013* (2013.01); *G06F 3/017* (2013.01); *G06T 19/003* (2013.01);
(Continued)

(58) Field of Classification Search
CPC ...... G06T 19/006; G06T 19/003; G06T 19/20; G06T 2219/2021; G06F 3/013;
(Continued)

(56) References Cited

U.S. PATENT DOCUMENTS

| | | |
|---|---|---|
| 2011/0164029 A1 | 7/2011 | King et al. |
| 2012/0113223 A1 | 5/2012 | Hilliges et al. |

(Continued)

OTHER PUBLICATIONS

Invitation to Pay Additional Fees, dated Jan. 19, 2022, received in International Patent Application No. PCT/US2021/052033, which corresponds with U.S. Appl. No. 17/483,761, 33 pages.
(Continued)

*Primary Examiner* — Chong Wu
(74) *Attorney, Agent, or Firm* — Morgan, Lewis & Bockius LLP

(57) ABSTRACT

A computer system in communication with one or more input devices displays a first view of a three-dimensional environment, including a representation of a physical environment and a first user interface object having a first surface at a first position in the three-dimensional environment corresponding to a first location in the physical environment. While displaying the first view, the computer system detects movement, in the physical environment, of a first person not using the one or more input devices, and in response, in accordance with a determination that the movement of the first person in the physical environment has a first spatial relationship to the first location in the physical environment corresponding to the first user interface object, the computer system moves the first surface of the first user interface object in the first view in accordance with the movement of the first person in the physical environment.

63 Claims, 22 Drawing Sheets

(52) U.S. Cl.
 CPC ...... *G06T 19/20* (2013.01); *G06T 2219/2021* (2013.01)

(58) Field of Classification Search
 CPC ............. G06F 3/017; G06F 2203/0381; G06F 3/04883; G06F 3/011; G06F 3/0304; G06F 3/04815; G06F 3/04845
 See application file for complete search history.

(56) References Cited

U.S. PATENT DOCUMENTS

| | | | |
|---|---|---|---|
| 2018/0066956 A1* | 3/2018 | Kim | G06T 19/006 |
| 2018/0322476 A1* | 11/2018 | Wang | G06Q 20/407 |
| 2019/0034076 A1 | 1/2019 | Vinayak et al. | |
| 2020/0226814 A1 | 7/2020 | Tang et al. | |

OTHER PUBLICATIONS

International Search Report and Written Opinion, dated Mar. 14, 2022, received in International Application No. PCT/US2021/052033 which corresponds with U.S. Appl. No. 17/483,761, 72 pages.

* cited by examiner

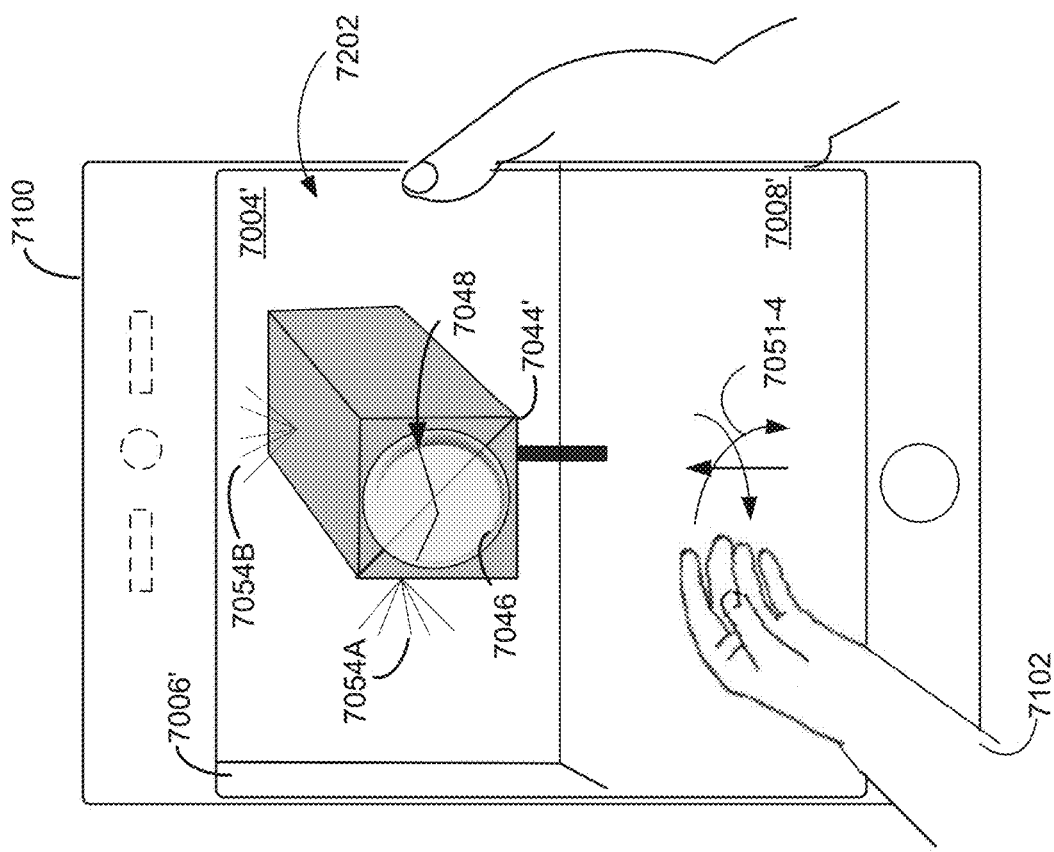
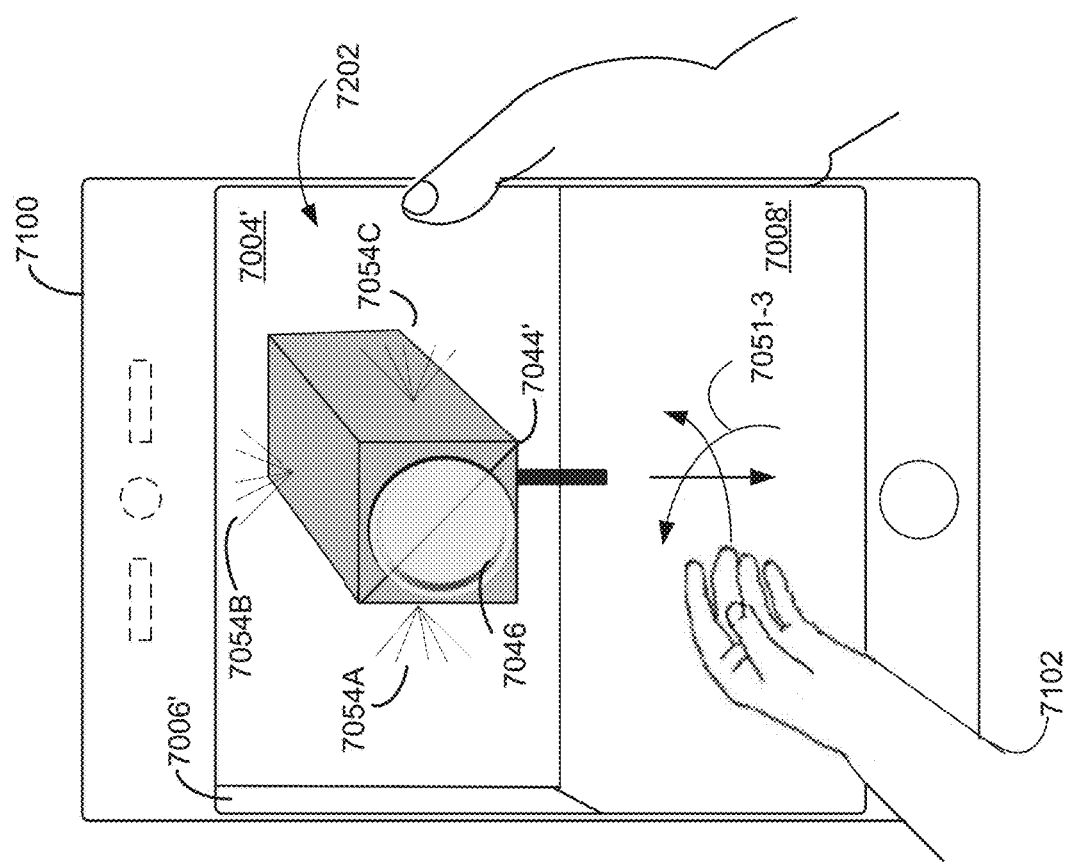

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Patent Application 63/083,821, filed Sep. 25, 2020, which is incorporated by reference in its entirety.

TECHNICAL FIELD

This disclosure relates generally to computer systems with a display generation component and one or more input devices that provide computer generated reality (CGR) experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component and one or more first input devices. The method includes displaying, via the first display generation component, a first view of a three-dimensional environment, including displaying a first user interface object that has a first surface at a first position in the three-dimensional environment, wherein the first user interface object, when activated by a user input that meets first criteria, causes performance of a first operation. The method further includes, while displaying the first user interface object that has the first surface at the first position in the three-dimensional environment, detecting first movement of a hand in a physical environment, wherein a location of the hand in the physical environment has a corresponding position in the three-dimensional environment throughout the first movement of the hand that is at least a first threshold distance away from the first position in the three-dimensional environment. The method further includes, in response to detecting the first movement of the hand in the physical environment: in accordance with a determination that the first movement of the hand meets second criteria and does not meet the first criteria, deforming the first surface of the first user interface object at the first position in the three-dimensional environment, without performing the first operation, wherein deforming the first surface of the first user interface object includes moving a first portion of the first surface relative to a second portion of the first surface that is different from the first portion of the first surface.

In accordance with some embodiments, a method is performed at a computer system that is in communication with a first display generation component and one or more input devices. The method includes displaying, via the first display generation component, a first view of a three-dimensional environment, including displaying, at a first position in the three-dimensional environment, a first user interface object that corresponds to a first operation and a second operation different from the first operation. The method further includes, while displaying the first view of the three-dimensional environment and while the first user interface object has input focus, detecting movement of a first set of fingers relative to a portion of a hand connected to the first set of fingers. The method further includes, in response to detecting the movement of the first set of fingers relative to the portion of the hand connected to the first set of fingers: in accordance with a determination that the movement of the first set of fingers relative to the portion of the hand connected to the first set of finger meets first criteria, wherein the first criteria require that a characteristic movement speed of the first set of fingers relative the portion of the hand connected to the first set of fingers exceeds a first threshold speed in order for the first criteria to be met, performing the first operation; and in accordance with a determination that the movement of the first set of fingers relative to the portion of the hand connected to the first set of fingers meets second criteria different from the first criteria, wherein the second criteria include requirements that can be met when the characteristic movement speed of the first set of fingers relative to the portion of the hand connected to the first set of fingers does not exceed the first threshold speed, performing the second operation.

In accordance with some embodiments, a method is performed at a computer system that is in communication with a first display generation component and one or more first input devices. The method includes displaying, via the first display generation component, a first view of a three-dimensional environment, including displaying a first user interface object at a first position in the three-dimensional environment, wherein the first user interface object, when activated by a user input that meets first criteria, causes performance of a first operation. The method further includes, while displaying the first view of the three-dimensional environment including displaying the first user interface object at the first position in the three-dimensional environment, detecting first movement of a hand in a physical environment. The method further includes, in response to detecting the first movement of the hand in the physical environment, changing an appearance of the first user interface object in the first view of the three-dimensional environment based on the first movement of the hand in the physical environment, including: in accordance with a determination that the first movement of the hand meets the first criteria, wherein the first criteria require that the hand moves in a first manner during the first movement of the hand in order for the first criteria to be met, performing the first operation associated with the first user interface object and changing the appearance of the first user interface object to indicate that the first operation has been performed; and in accordance with a determination that the first movement of the hand does not meet the first criteria, moving the first user interface object away from a respective position in the three-dimensional environment that corresponds to a location of the hand in the physical environment without performing the first operation.

In accordance with some embodiments, a method is performed at a computer system that is in communication with a first display generation component and one or more first input devices. The method includes displaying, via the first display generation component, a first view of a three-dimensional environment, including displaying a representation of a physical environment surrounding the first display generation component and displaying a first user interface object having a first surface at a first position in the three-dimensional environment that corresponds to a first location in the physical environment. The method further includes, while displaying the first view of the three-dimensional environment, detecting movement of a first person in the physical environment, wherein the first person is not a user of the one or more first input devices in communication with the computer system. The method further includes, in response to detecting the movement of the first person in the physical environment: in accordance with a determination that the movement of the first person in the physical environment has a first spatial relationship to the first location in the physical environment that corresponds to the first user interface object, moving the first surface of the first user interface object in the first view of the three-dimensional environment in accordance with the movement of the first person in the physical environment.

In accordance with some embodiments, a method is performed at a computer system that is in communication with a first display generation component and one or more input devices. The method includes displaying, via the first display generation component, a first view of a three-dimensional environment, including displaying a first user interface object that has a first surface at a first position in the three-dimensional environment corresponding to a first location in a physical environment. The method further includes, while displaying the first view of the three-dimensional environment including displaying the first user interface object that has the first surface at the first position in the three-dimensional environment, detecting a change in biometric data of a first user, and in response to detecting the change in biometric data of the first user, changing an appearance of the first surface in the first user interface object in accordance with the change in biometric data of the first user. The method further includes, while displaying the first user interface object with the appearance that has been changed based on the change in the biometric data of the first user, detecting first movement of the first user, and in response to detecting the first movement of the first user, changing the appearance of the first user interface object in accordance with the first movement of the first user.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7E-7J are block diagrams that illustrate performing different operations associated with a user interface object in a three-dimensional environment in response to movement of a user's hand (e.g., e.g., movement of a hand of the user, movement of one or more fingers, movement of a portion of the hand that meets different movement thresholds, etc.) in a physical environment, in accordance with some embodiments.

DESCRIPTION OF EMBODIMENTS

Figure 1:
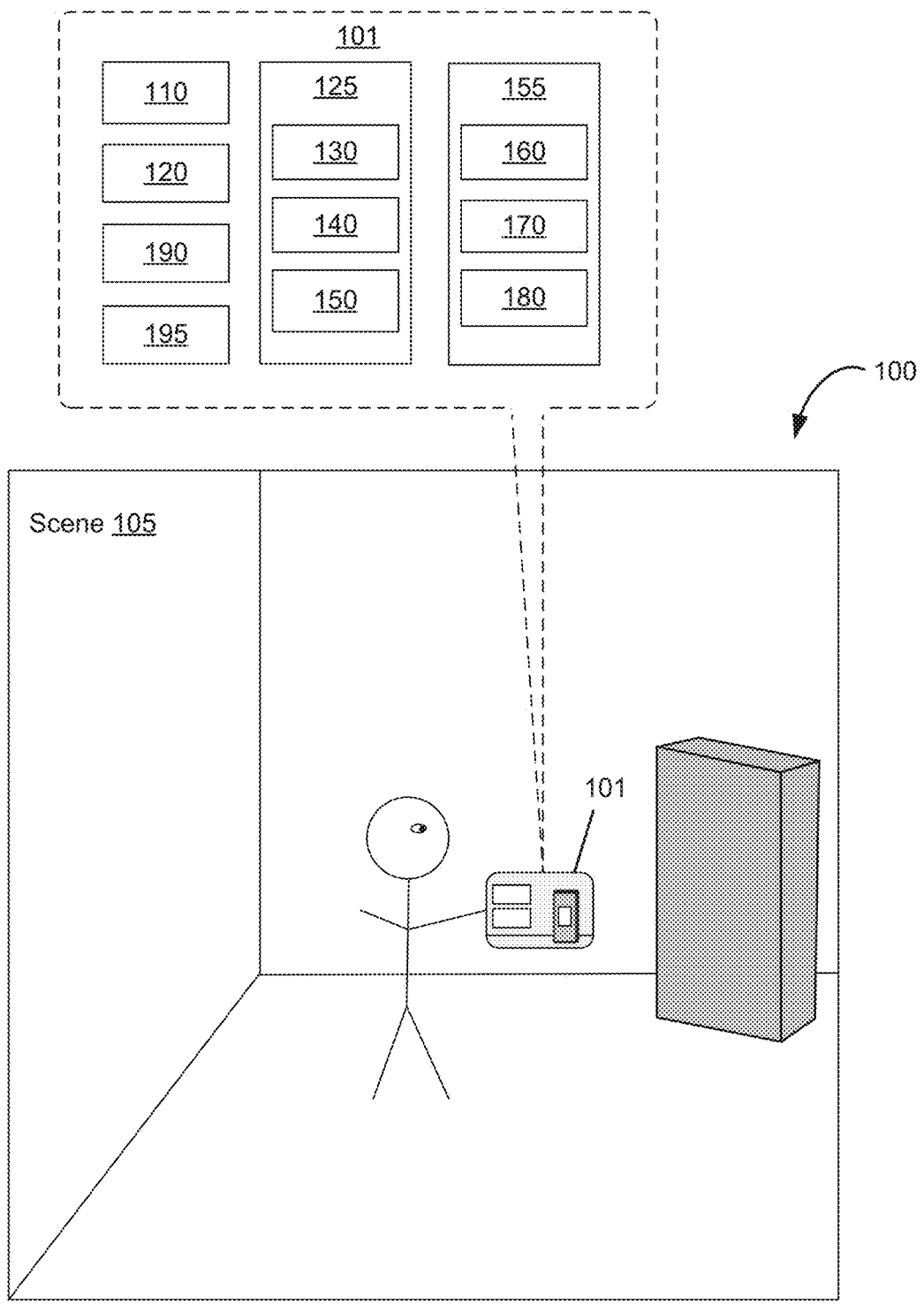
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system displays a user interface object (e.g., a virtual button, a control object, a virtual switch, a multifunction control, a user interface element, a check box, a selectable item, etc.) that has a first surface (e.g., a surface that displays content, graphics, visual feedback indicating a value and/or state of the user interface object or corresponding function(s), etc.) in a three-dimensional environment (e.g., a virtual three-dimensional environment, a mixed reality environment, an augmented reality environment, etc.). The position of the first surface of the user interface object in the three-dimensional environment corresponds to a location in a physical environment of a user that views the three-dimensional environment via a display generation component (e.g., a projector, an HMD, a display, etc.). In some embodiments, the user interface object causes the computer system to perform a respective operation, when activated in accordance with first criteria (e.g., by a hand gesture, a gaze input, a voice command, a touch gesture on a touch-sensitive surface, by an input provided via a controller, etc.). When the computer system detects a movement of a portion of the user (e.g., the user's hand, the user's fingers, etc.) in the physical environment that does not meet the first criteria, the computer does not perform the first operation, but changes the appearance of the first surface of the user interface object (e.g., deforms the first surface in accordance with the movement of the user's hand). The computer system deforms the first surface of the user interface object in response to the movement of the portion of the user, even if the movement is confined in a spatial region in the physical environment that is at least a threshold distance away from the location that corresponds to the position of the user interface object in the three-dimensional environment (e.g., the position that corresponds to the location of the portion of the user does not touch or intersect with the first surface in the three-dimensional environment, is away from the first surface of the user interface object, etc.). Deforming the first surface of the user interface object in response to a movement of a portion of the user in the physical environment, even when the movement is outside of a spatial region that corresponds to the position of the first surface in the three-dimensional environment, provides useful feedback to the user and helps the user to understand the connection between provided inputs and device responses to the inputs, thereby creating a more efficient human-machine interface. In some embodiments, when the movement of the portion of the user (e.g., user's hand, one or more fingers, etc.) meets the first criteria, the computer system performs the first operation, and optionally, changes the appearance of the first surface of the user interface object in conjunction with performing the first operation. In some embodiments, the manner by which the appearance of the first surface of the user interface object is altered depends on one or more characteristics (e.g., speed, direction, magnitude, type of the user's hand movement, etc.) of the movement in the physical environment and, optionally, the type of operation that is performed. Changing the appearance of the first surface of the user interface object in a manner that corresponds to the characteristics of the movement of the hand and, optionally, the performance of the operation, provides more information to the user regarding which operation associated with the user interface object is activated by the movement of the user performed in the physical environment, thereby reduces user mistakes and makes user interaction with the computer system more efficient.

In some embodiments, a computer system displays a user interface object at a respective position in a three-dimensional environment. The user interface object is associated with multiple operations that can be respectively triggered in response to movement of a user's hand in the physical environment when the user interface object has input focus. The computer system determines which operation to perform by evaluating the movement of the hand against different sets of criteria associated with the different operations. In some embodiments, the different sets of criteria associated with two different operations include different requirements on a characteristic movement speed of a first set of fingers relative to the portion of the hand connected to the first set of fingers. The computer performs a first operation in accordance with a determination that the movement of the user's hand meets first criteria that require the characteristic movement speed of the first set of fingers to exceed a threshold speed; and the computer performs a second operation in accordance with a determination that the movement of the user's hand does not meet the first criteria, but meets second criteria that do not require the characteristic movement speed of the first set of fingers to exceed the threshold speed. In some embodiments, the first operation and the second operation are related operations, and one correspond to a discrete change and the other correspond to a gradual change corresponding to the user interface object (e.g., a toggle control and a gradient control, a multistate switch and a slider control that spans a continuous range of values, etc.). In some embodiments, the computer system deforms the first surface in various manners throughout the movement of the first set of fingers, where the deformation of the first surface provides visual feedback regarding the detection and progress of the user's input and corresponding operations that will be performed. In some embodiments, the deformation of the user interface object provides visual feedback regarding the characteristics of the movement of the first set of fingers (e.g., direction, speed, magnitude, etc.). In some embodiments, changes in speed or direction of the movement of the first set of fingers can reduce the extent or cancel a respective operation. Using a characteristic movement speed of a set of fingers in the physical environment to determine which operation associated with a user interface object is to be performed, help to reduce visual clutter in the three-dimensional environment, and helps the user to understand the connection between provided inputs and device responses to the inputs, thereby reducing user mistakes and making user interaction with the computer system more efficient.

In some embodiments, a computer system displays a user interface object in a three-dimensional environment. The user interface object responds to a movement of a user in the physical environment in different manners depending on whether the movement meets preset criteria. For example, when the movement of the portion of the user meets first criteria (e.g., an only set of criteria, or one of multiple sets of criteria corresponding to different operations associated with the user interface object, etc.) corresponding to a first operation associated with the user interface object (e.g., an only operation, or one of multiple operations associated with the user interface object, etc.), the computer system performs the first operation and changes the appearance of the user interface object to indicate performance of the first operation. When movement of the portion of the user does not meet the first criteria, the compute system moves the user interface object (e.g., the user interface object is moved away from a region that corresponds to the location of the user's hand in the physical environment) but does not perform the first operation. Causing a user interface object to behave in different manners when the movement of the user's hand meets criteria for triggering an operation associated with the user interface object, or when the movement of the user's hand does not meet the criteria for triggering an operation associated with the user interface object provide useful visual feedback that helps the user to understand the connection between provided inputs and device responses to the inputs, thereby reducing user mistakes and making user interaction with the computer system more efficient.

In some embodiments, a computer system displays a user interface object with a first surface at a first position in a three-dimensional environment. In some embodiments, the user interface object includes a virtual screen, a virtual curtain, a virtual surface, virtual wallpaper, or virtual scenery, etc., that includes visual content (e.g., movie, images, scenery, etc.). In some embodiments, the user interface object includes one or more interactive user interface elements (e.g., controls, selectable options, user interfaces, etc.). A user of the computer system views the three-dimensional environment via a display generation component and interacts with the three-dimensional environment via one or more input devices that are in communication with the computer system. The computer system moves the first surface of the user interface object in accordance with movement and/or presence of a person in the same physical environment as the user, even when the person is not a user of the computer system or a participant of the experience provided in the three-dimensional environment. In some embodiments, the computer system also alter the display property of the first surface (e.g., making it more transparent, thinner, etc.) to reveal a representation of the presence and movement of the person in the physical environment. Moving and/or altering the appearance of at least a portion of the first surface of the user interface object in response to presence and/or movement of a person who is not a user of the computer system provides the user with greater visibility and awareness of another individual in the same physical environment without fully exiting the experience provided in the three-dimensional environment, thereby improving the user's experience and reducing unnecessary interruption of the experience, while reducing undesirable loss of social connection and interaction in the physical environment.

In some embodiments, a computer system displays a user interface object (e.g., a user interface object with a first surface, a user interface object that does not have a defined surface or shape, etc.) in a three-dimensional environment. In some embodiments, the user interface object includes a virtual screen, a virtual curtain, a virtual surface, virtual wallpaper, virtual cloud, or virtual scenery, etc. In some embodiments, the first surface serves as a means to help the user regulate his/her physiological and emotional state and provide temporary mental separation from the physical environment. The computer system receives biometric data corresponding to the user, and provide visual feedback to the user in accordance with the values and changes in the biometric data. For example, the computer system changes the appearance of the user interface object (e.g., through motion, deformation, animated changes in color, transparency, blur radius, size, shape, etc.) in accordance with the change in biometric data of the user. The computer system also changes the appearance of the first user interface object in accordance with movement of the user in the physical environment. Altering the appearance of a user interface object in accordance with biometric data as well as movement of the user provides useful feedback to the user regarding the user's physiological state, helps to guide the user to regulate his/her mental state during a meditative experience or temporary refuge from the stimuli in the physical environment.

FIGS. 1-6 provide a description of example computer systems for providing CGR experiences to users. FIGS. 7A-7D are block diagrams that illustrate altering an appearance of a surface of a user interface object in a three-dimensional environment in response to movement of a user in a physical environment, in accordance with some embodiments. FIGS. 7E-7J are block diagrams that illustrate performing different operations associated with a user interface object in a three-dimensional environment in response to movement of a user's hand in a physical environment, in accordance with some embodiments. FIGS. 7K-7N are block diagrams that illustrate causing a change in appearance of a user interface object in different manners in response to movement of a portion of a user, including performing an operation corresponding to the user interface object in conjunction with changing the appearance of the user interface object, or moving the first user interface object away from a position that corresponds to the location of the movement of the portion of the user, in accordance with some embodiments. FIGS. 7O-7R are block diagrams that illustrate moving a surface of a user interface object in a three-dimensional environment in response to movement in a physical environment of a person who is not a user of the computer system, in accordance with some embodiments. FIGS. 7S-7V are block diagrams that illustrate altering an appearance of a surface of a user interface object in a three-dimensional environment in response to changes of biometric data of a user and movement of the user, in accordance with some embodiments. The user interfaces in FIGS. 7A-7V are used to illustrate the processes in FIGS. 8-12, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
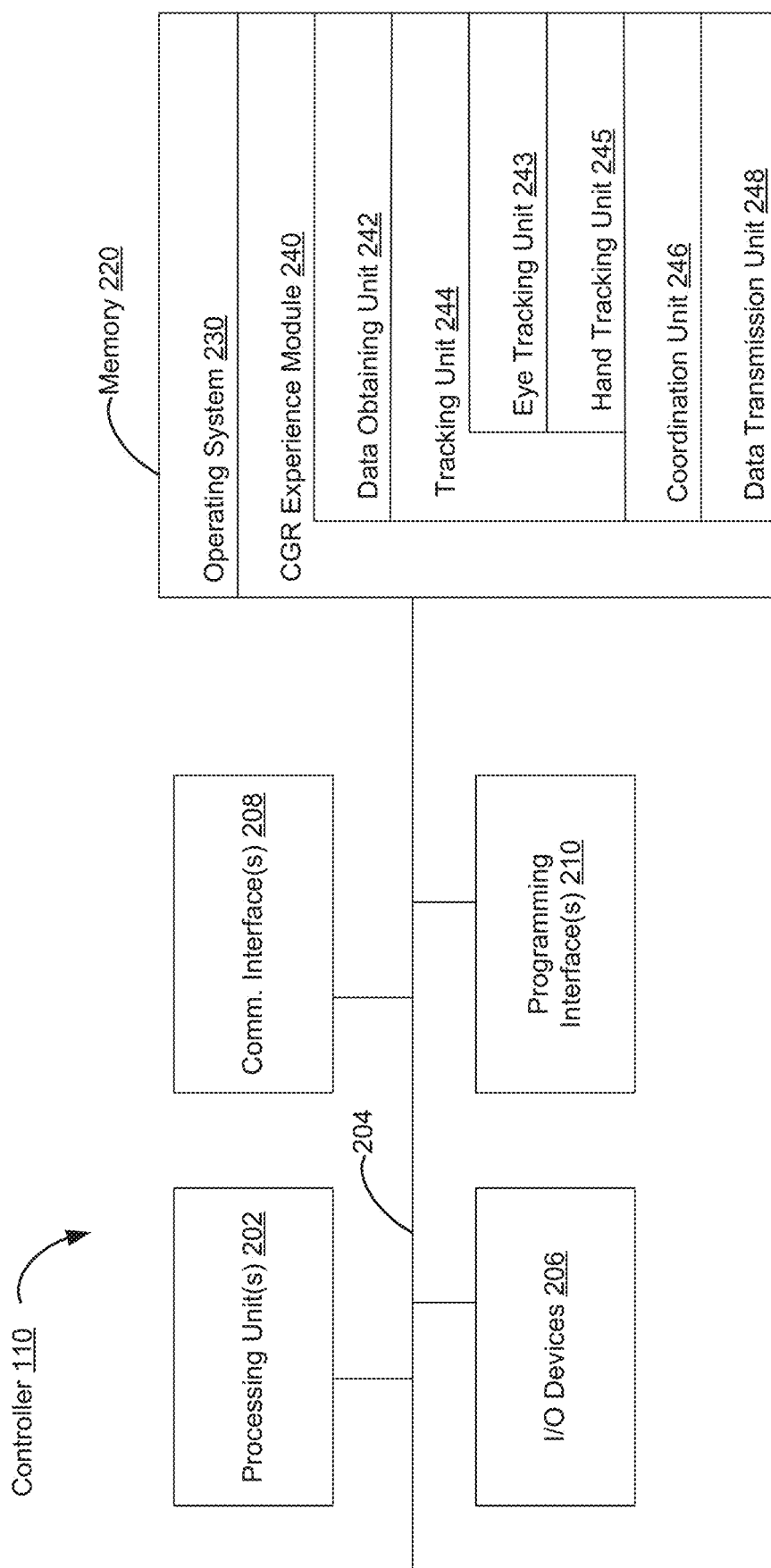
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
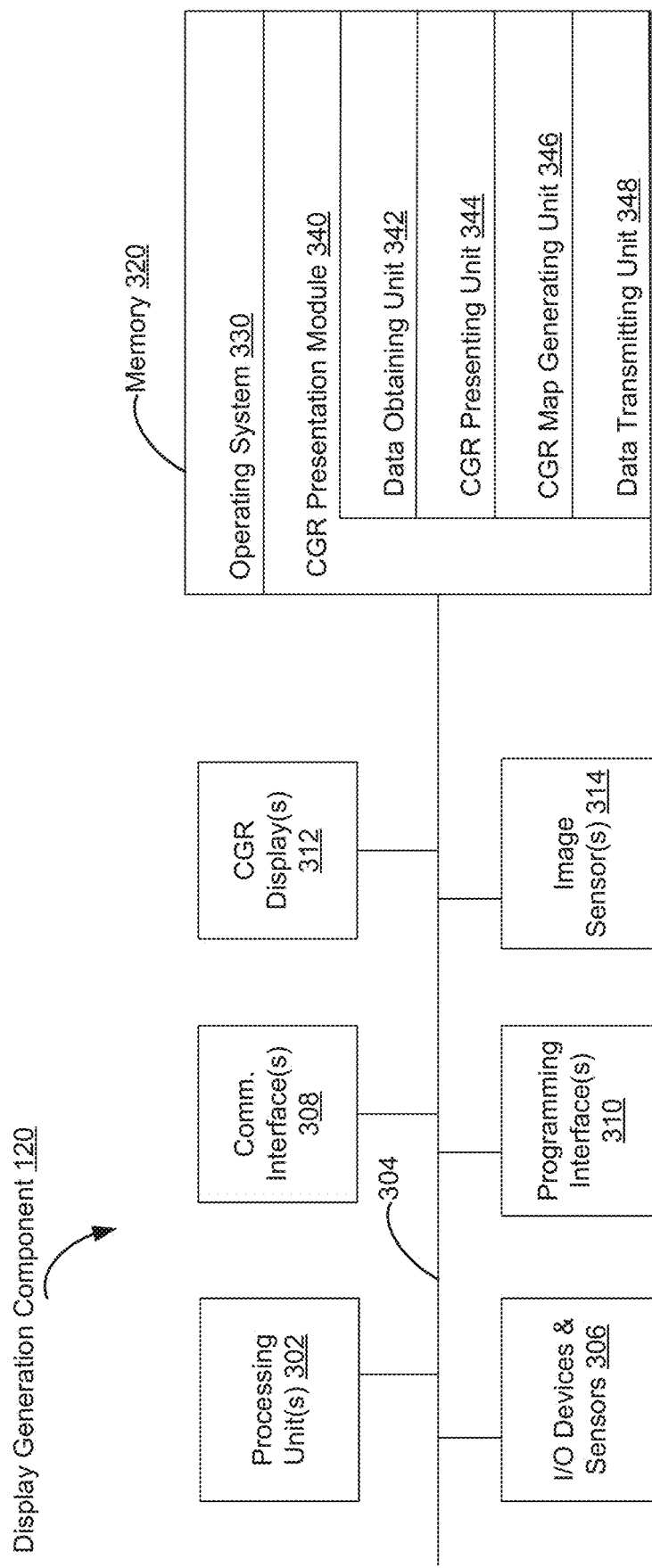
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
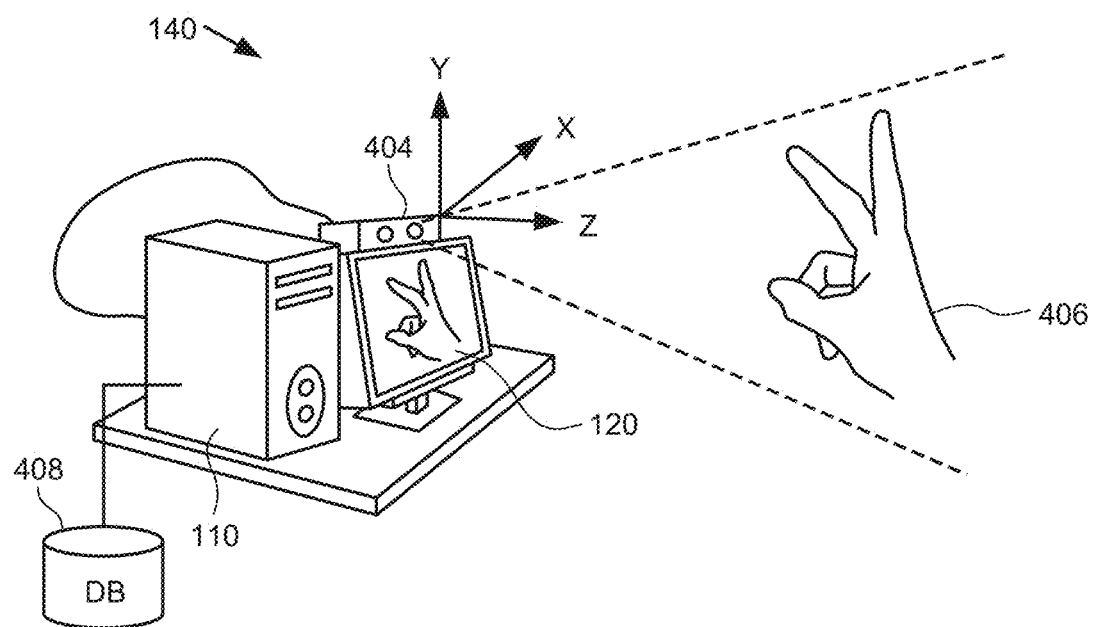
FIG. 4 is a block diagram illustrating a hand tracking unit of a computer system that is configured to capture gesture inputs of the user in accordance with some embodiments.
Figure 4:
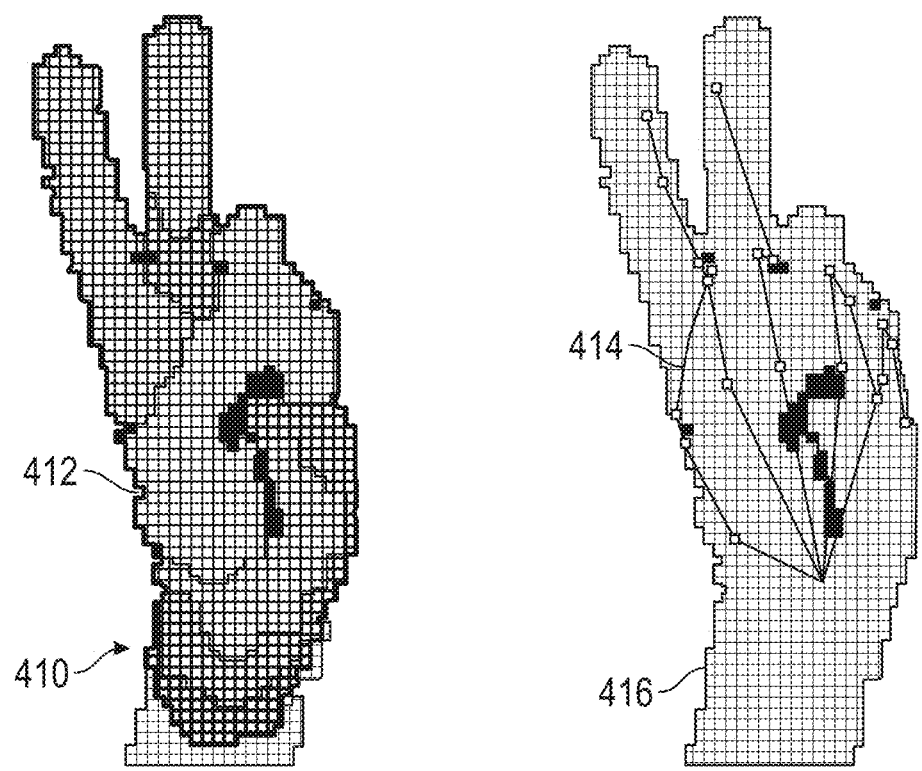

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
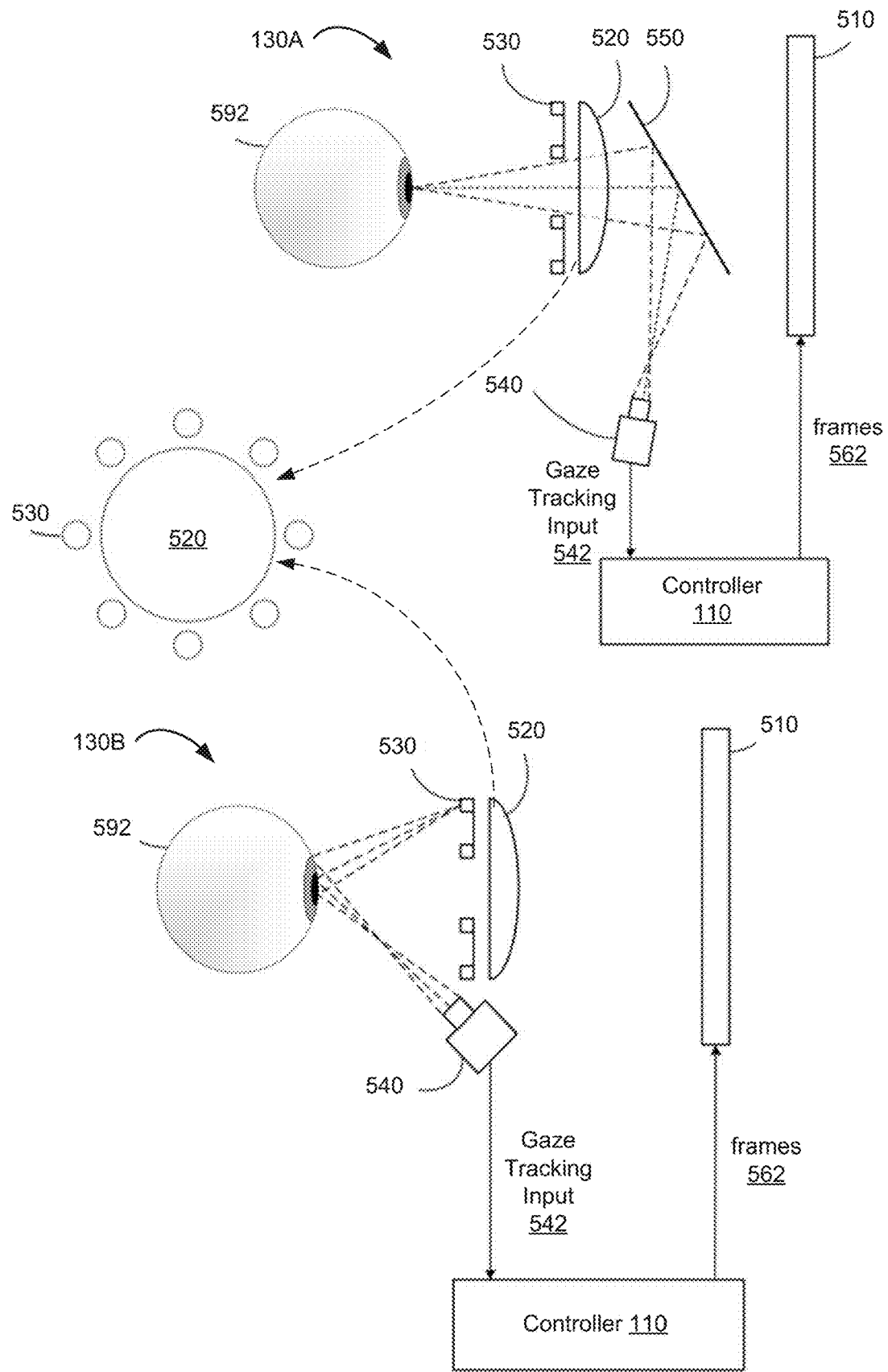
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
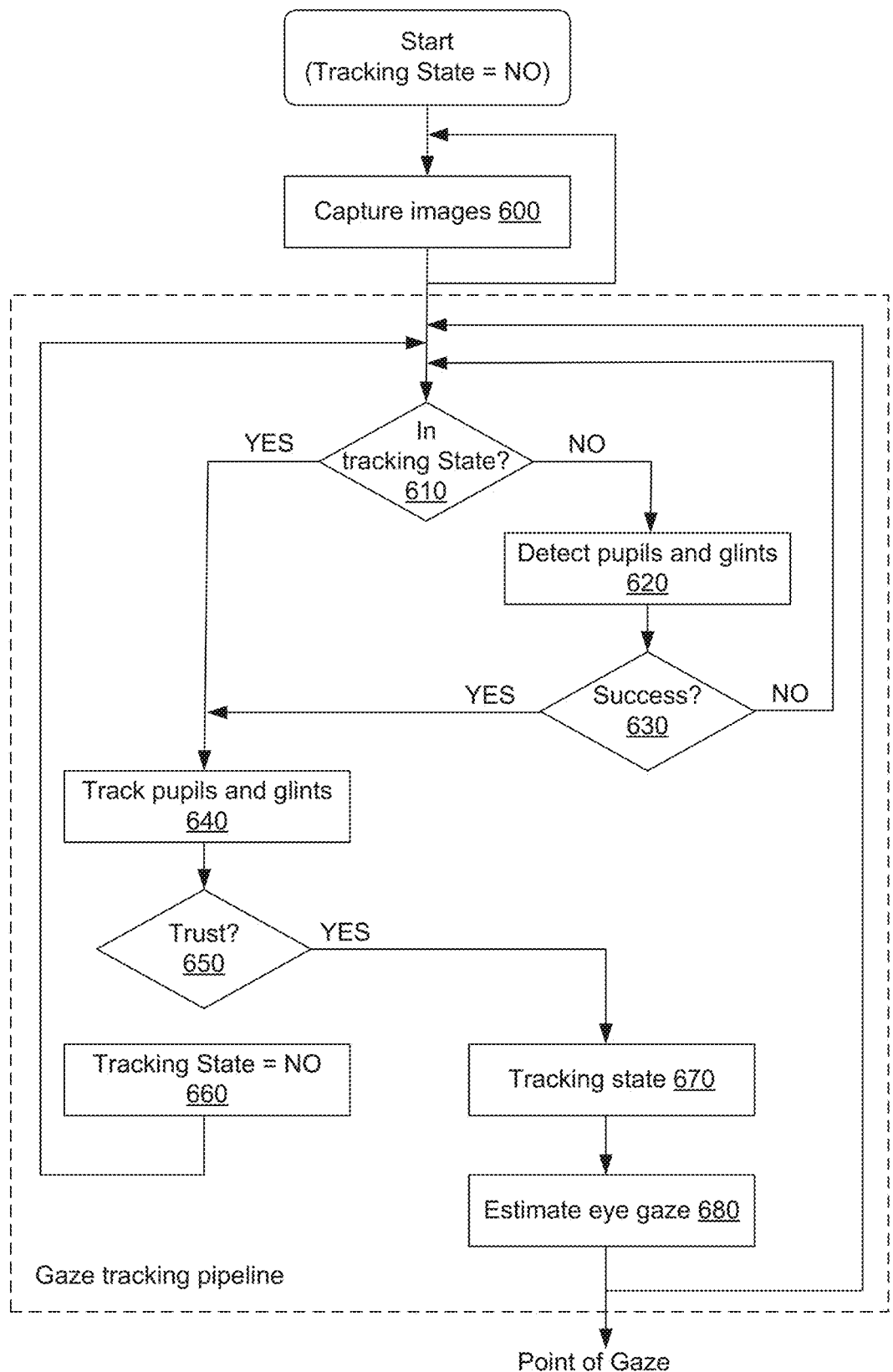
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7V illustrate three-dimensional environments displayed via a display generation component (e.g., a display generation component 7100, display generation component 7200, a display generation component 120, etc.) and interactions that occur in the three-dimensional environment caused by user inputs directed to the three-dimensional environment and/or inputs received from other computer systems and/or sensors. In some embodiments, the inputs are directed to a virtual object within the three-dimensional environment by a user's gaze detected at the positions of the virtual object, by a hand gesture performed at a location in the physical environment that corresponds to the position of the virtual object, by a hand gesture that is performed at a location in the physical environment that is independent of the position of the virtual object while the virtual object has input focus (e.g., selected by a concurrently and/or previously detected gaze input, selected by a concurrently or previously detected pointer input, selected by a concurrently and/or previously detected gesture input, etc.), by a input device that has positioned a focus selector object (e.g., a pointer object, selector object, etc.) at the position of the virtual object, etc. In some embodiments, the inputs are directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.). In some embodiments, the computer system displays changes the three-dimensional environment (e.g., displaying additional virtual content, or ceasing to display existing virtual content, transitioning between different levels of immersion with which visual content is being displayed, etc.) in accordance with inputs from sensors (e.g., image sensors, temperature sensors, biometric sensors, motion sensors, proximity sensors, etc.) and contextual conditions (e.g., location, time, presence of others in the environment, etc.). In some embodiments, the computer system displays changes the three-dimensional environment (e.g., displaying additional virtual content, or ceasing to display existing virtual content, transitioning between different levels of immersion with which visual content is being displayed, etc.) in accordance with inputs from other computers used by other users that are sharing the computer-generated environment with the user of the computer system (e.g., in a shared computer-generated experience, in a shared virtual environment, in a shared virtual or augmented reality environment of a communication session, etc.). In some embodiments, the computer system displays changes the three-dimensional environment (e.g., displaying movement, deformation, changing in visual characteristics, etc. of a user interface, a virtual surface, a user interface object, virtual scenery, etc.) in accordance with inputs from sensors that detects movement of other persons and objects and movement of the user that may not quality as a recognized gesture input for triggering an associated operation of the computer system.

In some embodiments, the three-dimensional environment that is displayed via the display generation component is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion, adjusting the relative prominence of audio/visual sensory inputs from the virtual content and from the representation of the physical environment, etc.) based on user inputs and/or contextual conditions.

In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., in a virtual reality environment, a mixed reality environment, an augmented reality environment, etc.), at least some of the virtual objects are displayed in placed of (e.g., replacing display of) a portion of the live view (e.g., a portion of the physical environment captured in the live view) of the cameras. In some embodiments, at least some of the virtual objects and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that changes the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, gestures performed by movement of one portion of the hand relative to another portion of the hand, etc.) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD, etc.), etc., relative to the physical environment causes corresponding movement of the viewpoint (e.g., with corresponding movement direction, movement distance, movement speed, and/or change in orientation, etc.) relative to the three-dimensional environment, resulting in corresponding change in the currently displayed view of the three-dimensional environment. In some embodiments, when a virtual object has a preset spatial relationship relative to the viewpoint, movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement (e.g., the display generation component and/or other location sensing component of the computer system rotating around a fixed location of the user in the physical environment).

In some embodiments, as shown in FIGS. 7A-7V, the views of the three-dimensional environment do not include representation(s) of a user's hand(s), arm(s), and/or wrist(s). In some embodiments, the representation(s) of a user's hand(s), arm(s), and/or wrist(s) are included in the views of the three-dimensional environment. In some embodiments, the representation(s) of a user's hand(s), arm(s), and/or wrist(s) are included in the views of the three-dimensional environment as part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view or transparent pass-through portion), real-time visual representations (e.g., stylize representations or segmented camera images) of one or both arms, wrists, and/or hands of the user may still be displayed in the virtual environment. In some embodiments, if a representation of the user's hand is not provided in the view of the three-dimensional environment, the position that corresponds to the user's hand may still be indicated in the three-dimensional environment, e.g., by the changing appearance of the virtual content (e.g., through a change in translucency, simulated reflective index, etc.) at positions that correspond to the location of the user's hand.

FIGS. 7A-7D are block diagrams that illustrate altering an appearance (e.g., deforming, changing one or more visual properties, etc.) of a surface of a user interface object in a three-dimensional environment in response to movement of a user in a physical environment (e.g., e.g., movement of a hand of the user, movement of one or more fingers, movement in a spatial region that is separate from a location corresponding to the position of the user interface object, etc.), in accordance with some embodiments.

In some embodiments, a computer system displays a first user interface object 7046 (e.g., a virtual button, a control object, a virtual switch, a multifunction control, a user interface element, a check box, a selectable item, etc.) that has a first surface (e.g., a surface that displays content, graphics, visual feedback indicating a value and/or state of the user interface object or corresponding function(s), etc.) in a three-dimensional environment (e.g., a virtual three-dimensional environment, a mixed reality environment, an augmented reality environment, etc.). The position of the first surface of the first user interface object 7046 in the three-dimensional environment corresponds to a location in a physical environment of a user (e.g., user 7002, or another user, etc.) that views the three-dimensional environment via a display generation component (e.g., display generation component 7100, or another type of display generation component, such as a projector, an HMD, etc.). In some embodiments, the first user interface object 7046 causes the computer system to perform a respective operation, when activated in accordance with first criteria (e.g., by a hand gesture, a gaze input, a voice command, a touch gesture on a touch-sensitive surface, by an input provided via a controller, etc.). When the computer system detects a movement of a portion of the user (e.g., the user's hand 7102, the user's fingers, etc.) in the physical environment that does not meet the first criteria (e.g., as shown in FIG. 7D following FIG. 7B), the computer does not perform the first operation, but changes the appearance of the first surface of the first user interface object 7046 (e.g., deforms the first surface in accordance with the movement 7047 of the user's hand 7102 in FIG. 7D). The computer system deforms the first surface of the first user interface object 7046 in response to the movement of the portion of the user, even if the movement is confined in a spatial region in the physical environment that is at least a threshold distance away from the location that corresponds to the position of the user interface object 7046 in the three-dimensional environment (e.g., the position that corresponds to the location of the portion of the user (e.g., user's hand, finger, etc.) does not touch or intersect with the first surface of the first user interface object 7046 in the three-dimensional environment, is away from the first surface of the user interface object 7046, etc.). In FIGS. 7C-7D, the virtual position of the user's hand 7102 is separate from the virtual position of the user interface object 7046 by the virtual position of the display generation component 7100 in the three-dimensional environment, for example. In some embodiments, the representation of the hand 7102 may visible in the view 7202 of the three-dimensional environment provided via the display generation component at a position that corresponds to the location of the hand in the physical environment, but the representation of the hand would be separate from the first surface of the first user interface object 7046 by at least a threshold distance throughout the movement of the hand 7102 in the physical environment. In other words, the first surface of the first user interface object 7046 reacts to the movement of the user's hand even when the movement does not correspond to a movement in the vicinity of the first surface of the first user interface object 7046.

In FIG. 7A, a user 7002 and a display generation component 7100 are present in a physical environment 105. The user 7002 is in a position relative the display generation component 7100 that enables the user to view a computer-generated environment presented via the display generation component. As described herein, the display generation component 7100 is a non-limiting example of any of multiple types of displays, such as a heads-up display, a head-mounted display (HMD), a LED display, a touchscreen, a projector, etc. In some embodiments, the physical environment 105 is a room or is part of a room in a building (e.g., is an environment that includes one or more walls 7004 and 7006 and/or a floor 7008) in various locations. In some embodiments, the physical environment 105 is an outdoor environment (e.g., outside of a building, in nature, in a park, etc.). In some embodiments, the physical environment 105 includes one or more physical objects (e.g., object 7044, objects such as a piece of furniture (e.g., a table, a chair, a cabinet, an appliance, a drawer, an electronic device, a wall, a window, a display screen, the user's hand, etc.), a part of the scenery (e.g., a rock, a tree, a body of water, etc.), etc.) at various locations. In some embodiments, the physical objects in the physical environment include one or more devices (e.g., appliance, thermostat, lights, locks, camera, doorbell, etc.) that are controlled by the computer system in accordance with user inputs provided in the three-dimensional environment. In some embodiments, the display generation component 7100 is held by the user 7002 in a hand of the user. In some embodiments, the display generation component 7100 is not held by the user 7002 in the user's hand. In some embodiments, the display generation component is fixed and/or supported by a structure in the physical environment that is not part of the user. In some embodiments, the display generation component is fixed and/or supported by a portion of the user (e.g., head, ears, nose, etc.), such that the display generation component is maintained at a fixed position relative to the user's face or eyes that enables the user to view the content presented via the display generation component.

Figure 7B:
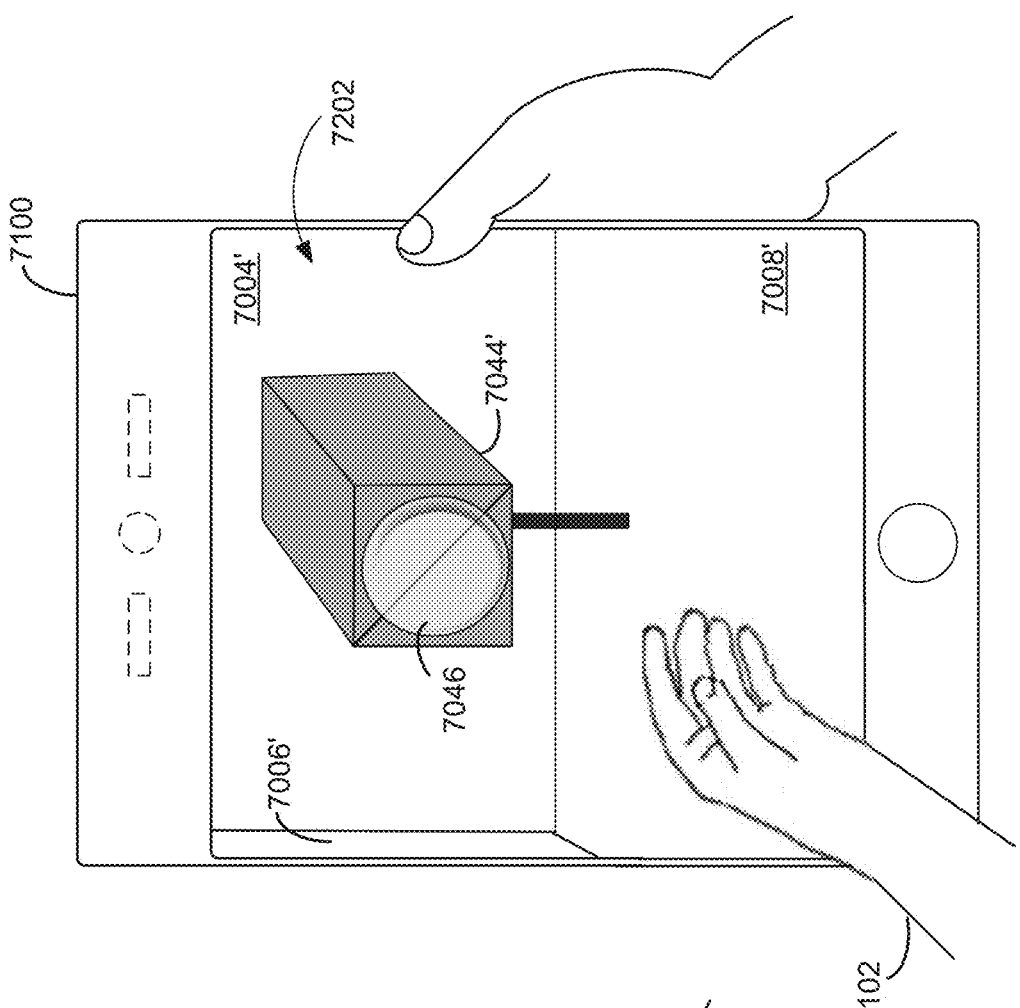
FIGS. 7A-7D are block diagrams that illustrate altering an appearance (e.g., deforming, changing one or more visual properties, etc.) of a surface of a user interface object in a three-dimensional environment in response to movement of a user in a physical environment (e.g., e.g., movement of a hand of the user, movement of one or more fingers, movement in a spatial region that is separate from a location corresponding to the position of the user interface object, etc.), in accordance with some embodiments.
Figure 7A:
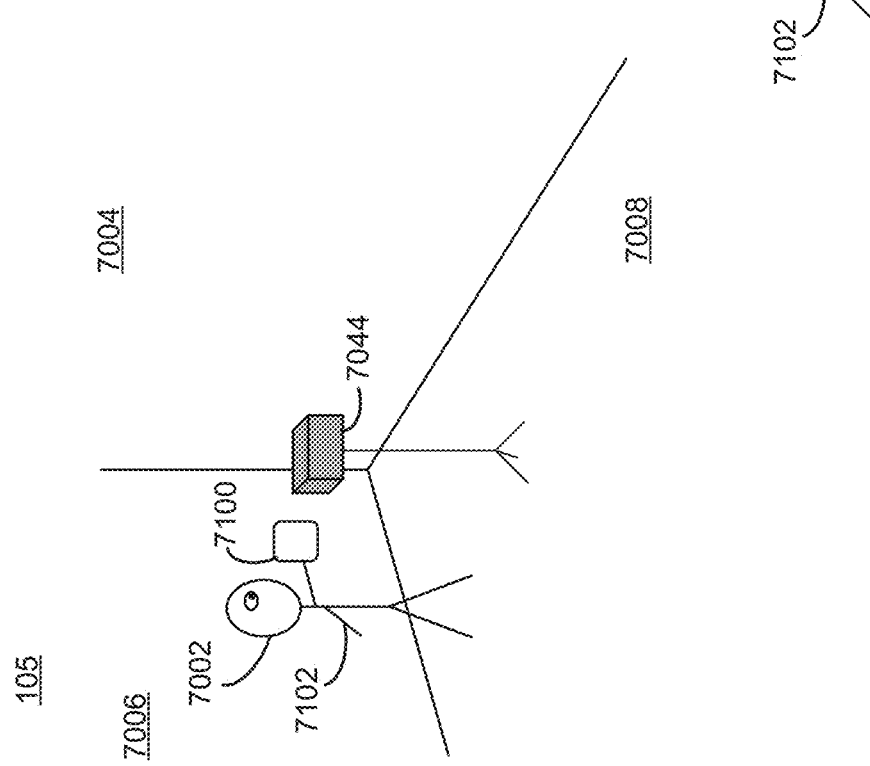
Figure 7D:
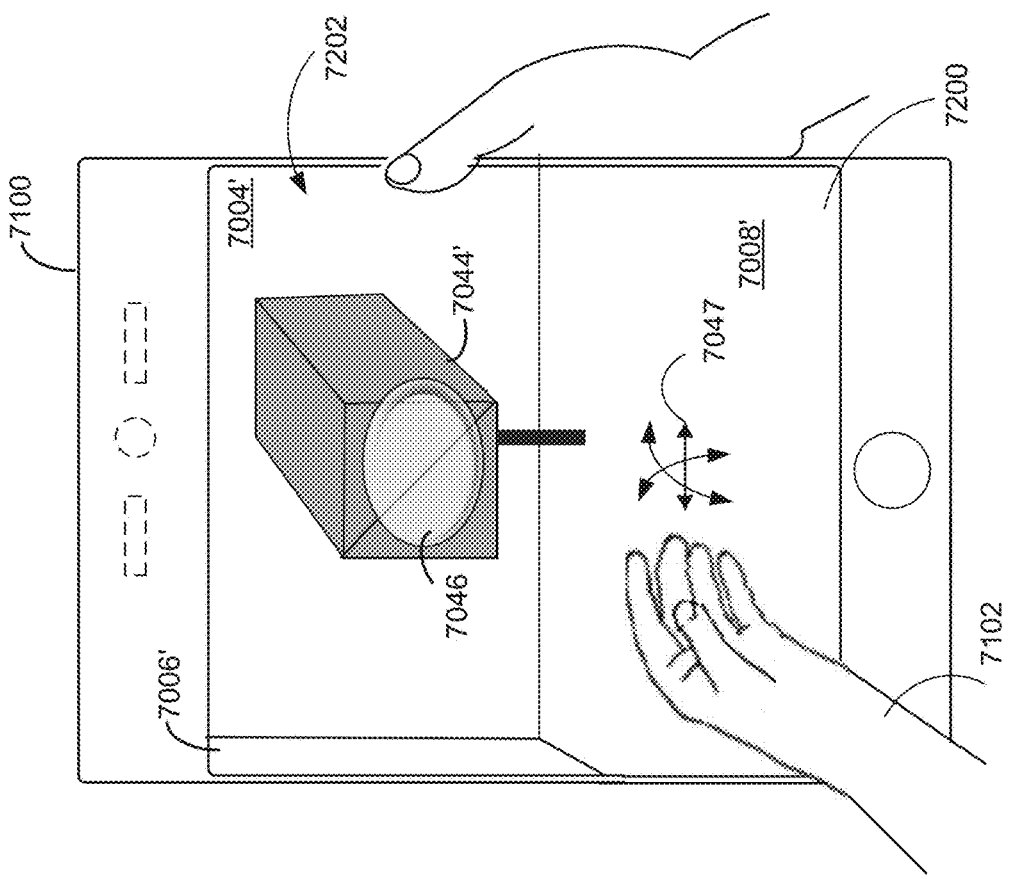
Figure 7C:
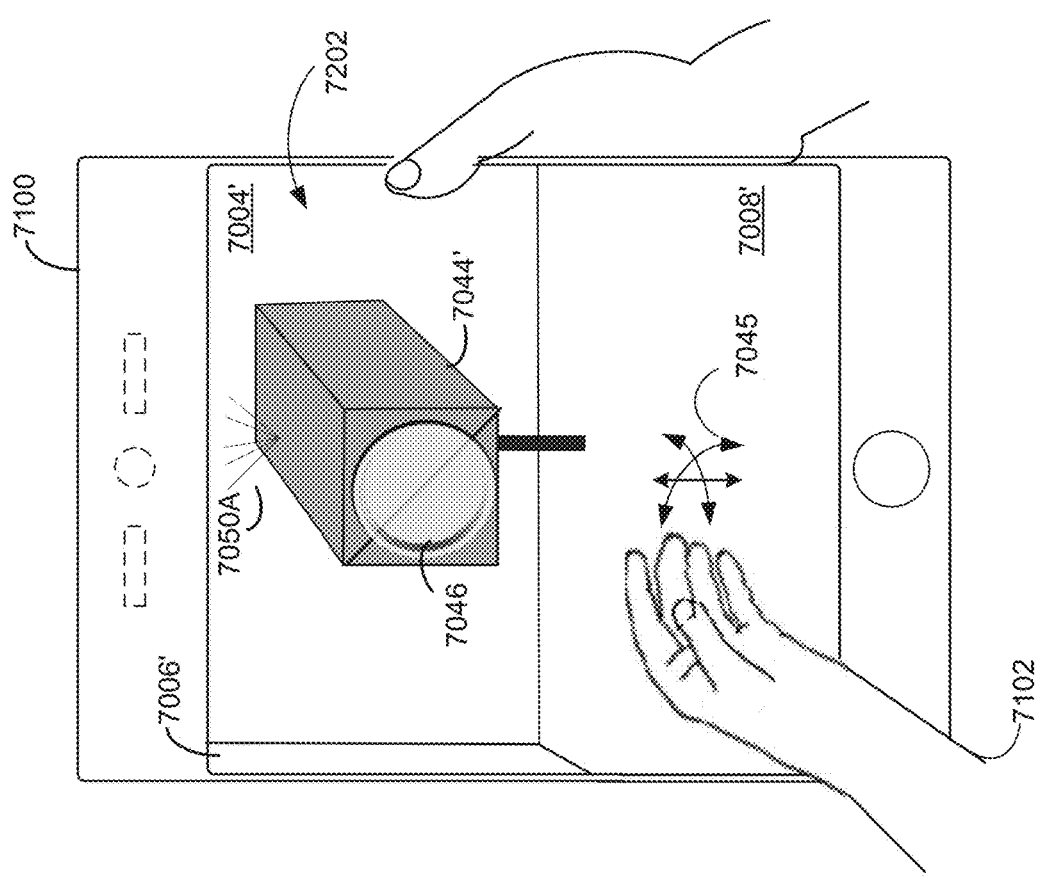

FIGS. 7B-7D illustrate performance of an operation and deformation of a surface of the user interface surface object 7046 in the three-dimensional environment in response to movement of the user's hand 7102 in the physical environment, in accordance with some embodiments. In this example, FIGS. 7B-7C show changes in the appearance of the surface of the user interface object 7046 and performance of an operation (e.g., turning on a light associated with physical object 7044 in the physical environment, turning on virtual illumination 7052 in the three-dimensional environment, etc.) in response to movement 7045 of the user's hand 7102 that meets first criteria. FIG. 7D following 7B shows changes in the appearance of the first surface of the user interface object 7046 in response to movement 7047 of the user's hand that does not meet the first criteria, and the operation is not performed.

In FIG. 7B, the computer system displays a first view 7202 of a three-dimensional environment via the display generation component (e.g., the display generation component 7100, or another display generation component such as an HMD, etc.). In some embodiments, the three-dimensional environment is an augmented reality environment that includes a representation of the physical environment and virtual content at various positions in the three-dimensional environment that correspond to different locations in the physical environment. For example, in FIG. 7B, the first view 7202 provided by the display generation component includes a representation of a portion of the physical environment 105. The first view 7202 of the three-dimensional environment includes representations of physical surfaces (e.g., representations 7004' and 7006' of the walls 7004 and 7006, representation 7008' of the floor 7008, etc.) and representations of physical objects (e.g., representation 7044' of the physical object 7044, representations of other physical objects, etc.). In some embodiments, the first user interface object 7046 is displayed at a position that corresponds to the location of a physical object, and, optionally, provides control functions related to the physical object (e.g., turn on the physical object, adjust an operation parameter of the physical object, etc.). In some embodiments, the first user interface object 7046 is displayed at a position that corresponds to the location of a first physical object, and, optionally, provides control functions related to a second physical object (e.g., turn on the second physical object, adjust an operation parameter of the second physical object, etc.). In some embodiments, the first user interface object 7046 is displayed at a position that is independent of a physical object, and, optionally, provides control functions related to the three-dimensional environment. In some embodiments, the three-dimensional environment is a virtual three-dimensional environment that does not include a representation of the physical environment. For example, the representations 7004', 7006', 7008' and 7044 optionally represent virtual surfaces and virtual objects present in the virtual three-dimensional environment.

In some embodiments, the user interface object 7046 is a standalone user interface object (e.g., a button, a switch, a selectable control, an application icon, a notification, etc.), and is not part of another user interface object that includes one or more other user interface objects. In some embodiments, the user interface object 7046 is part of another larger user interface object (e.g., a user interface, a dock, a control panel, etc.) that includes one or more other user interface objects, with the different user interface objects occupying different portions of the larger user interface object. In some embodiments, the user interface object 7046 is a user interface object (e.g., a user interface, a dock, a control panel, etc.) that includes multiple smaller user interface objects occupying different sub-portions of the user interface object, and each of the smaller user interface objects may be individually activated by an input directed to a respective sub-portion of the user interface object to perform different operations associated with the user interface object 7046.

In some embodiments, the user interface object 7046 in the first view 7202 of the three-dimensional environment is an application icon, an application user interface of a respective application, a selectable avatar of another user, a selectable menu item, a device control, a content item, a slider control, a button, a multifunction control object, a control panel that includes multiple controls (e.g., corresponding to different functions or operations), a media item, a notification, a window, etc. In some embodiments, the user interface object 7046 has a default, steady state appearance with a corresponding set of display properties, including one or more of a first shape, a first size, a first color, a first spatial extent, a first thickness, a first level of transparency, a first level of opacity, a first blur radius, a first simulated refractive index, a first luminosity, a first color saturation, a first set of values and/or spatial distribution of values for one or more of the display properties, etc. across the first surface of the user interface object 7046. In FIG. 7B, before movement of the user's hand 7102 is detected by the computer system, the first user interface object 7046 is displayed with the default, steady state appearance. In some embodiments, the first user interface object 7046 has more than one default steady state appearances, and a respective one of the steady state appearances is selectively shown depending on a respective steady state of multiple steady states that the first user interface object 7046 currently has.

In some embodiments, the user interface object 7046 is associated with one or more operations (e.g., the production of light, production of audio, performance of one or more operations within the three-dimensional environment, etc.). The computer system performs a respective operation of the one or more operations in accordance with a user's input directed to the user interface object 7046 that meets the criteria for triggering the respective operation. In some embodiments, the first user interface object 7046 can be moved within the three-dimensional environment (e.g., by the user, or by the system, etc.). In some embodiments, at least some of the operations associated with the user interface object 7046 have an effect (e.g., are performed) in the physical environment (e.g., the performance of an operation associated with the first user interface object 7046 may cause a light to be turned on in the physical environment, or cause a media player to be turned off, etc.). In some embodiments, at least some of the operations associated with the user interface object 7046 have an effect (e.g., are performed) in the three-dimensional environment (e.g., the performance of an operation associated with the first user interface object 7046 may cause additional virtual content to be displayed, existing virtual content to be changed, and/or removal of existing content in the three-dimensional environment, exiting the three-dimensional environment, etc.).

In FIG. 7C, the computer system detects movement 7045 of the hand 7102 of the user. In this example, the movement 7045 of the hand 7102 meets the first criteria for triggering the performance of the first operation associated with the first user interface object 7046. In response to detecting the movement 7045 of the hand 7102 and in accordance with a determination that the movement 7045 of the hand 7102 meets the first criteria, the computer system performs a first operation (e.g., turning on a first light 7050A in the physical environment, turning on a first virtual light represented as 7050A in the three-dimensional environment, etc.) associated with the first user interface object 7046. The computer system further deforms the first surface of the first user interface object 7046. For example, as shown in FIGS. 7B and 7C, the surface of the first user interface object 7046 is pressed into a different shape (e.g., from a convex shape to a concave shape, depressed inward, flattened, etc.) and remains in the different shape, to indicate that the first user interface object 7046 has been activated in accordance with the first criteria being met and/or the first operation will be/has been performed.

In FIG. 7D, the computer system detects movement 7047 of the hand 7102 in the physical environment that meets second criteria but does not meet the first criteria. In some embodiments, the second criteria include a requirement that at least a portion of the movement 7047 of the hand corresponds to a movement of a representation of the hand 7102 in the three-dimensional environment that occurs within a respective distance threshold from the first user interface object 7046 while remaining outside of the vicinity of the user interface object 7046. In some embodiments, the second criteria include a requirement that the movement 7047 of the hand 7102 has a movement speed that is greater than a preset threshold speed, has a preset movement direction, in a preset hand posture, etc. (e.g., different threshold speed, movement direction, hand posture, etc., from those required by the first criteria). In response to detecting the movement 7047 of the hand 7102 that meets the second criteria and does not meet the first criteria, the computer system deforms the first surface of the first user interface object 7046 and does not perform the first operation. As shown in FIG. 7D, the first surface of the first user interface object 7046 is altered (e.g., reshaped, stretched, warped, bent, and/or with one portion shifted relative to another portion, etc.), and the real or virtual light 7050A is not turned on. In some embodiments, deforming the first surface of the first user interface object includes moving a first portion of the first surface relative to a second portion of the first surface that is different from the first portion of the first surface, optionally, while maintaining a connection between the first portion of the first surface and the second portion of the first surface (e.g., by stretching and/or compressing one or more portions of the first surface).

In some embodiments, the computer system performs the first operation with one or more characteristic values (e.g., intensity, brightness, magnitude, speed, direction, etc.) in accordance with one or more characteristics of the movement of the user's hand. In some embodiments, the computer system deforms the first surface of the first user interface object with one or more characteristic values (e.g., magnitude, direction, speed, etc.) in accordance with one or more characteristics of the movement of the user's hand.

In some embodiments, the deformation of the first surface of the first user interface object 7046 is affected by the manner of the hand movement. For example, in some embodiments, the first surface is deformed to a first extent in response to movement of a hand meeting the first criteria and to a second extent in response to movement of the hand meeting the second criteria. In some such embodiments, the first extent of deformation is greater than the second extent (e.g., the first surface is stretched, bent, twisted, etc. more when the movement of the hand meets the first criteria). In some embodiments, the deformation is a change in shape and appearance of the first surface. In some embodiments, deformation does not include translation and/or rotation movement of the first surface from its respective position in the three-dimensional environment (e.g., the simulated center of mass and/or edges of the first surface remain or substantially remain in the respective position during the deformation).

In some embodiments, the first criteria require that the hand 7102 remain at least a threshold distance from a spatial region in the physical environment that correspond to the first surface in the three-dimensional environment (e.g., the representation of the hand does not touch the first surface in the three-dimensional environment, or pass through the first user interface object, etc.) throughout the movement of the hand in the physical environment. Thus, in some embodiments, deformation of the first surface is effected without having any portion of the representation of the hand of the user appearing to touch or pass through the first surface in the three-dimensional environment, and while the representation of the hand remains at a distance from the vicinity of the first user interface object and/or the first surface. In some embodiments, the extent of the deformation is the same whether the location of the hand 7102 in the physical environment 105 is a first distance or a second distance from a location in the physical environment that corresponds to the position of the first surface in the three-dimensional environment, where the second distance is less than the first distance (e.g., the deformation of the first surface is the same for the same movement of the hand whether the movement occurs at a location that is near or far from the location that corresponds to the position of the first surface in the three-dimensional environment). In some embodiments, the computer system will still deform the first surface if the hand is detected within the threshold distance from a location that corresponds to the position of the first surface in the three-dimensional environment, in response to detecting movement of the hand in the physical environment. In some embodiments, if the hand movement meets the first criteria while at least a portion of the movement is detected within the threshold distance from a location that corresponds to the position of the first surface in the three-dimensional environment, the computer system will still deform the first surface and perform the first operation.

In some embodiments, the operation is performed without deforming the first surface. In some embodiments, the computer system provides other types of visual feedback to indicate that the first criteria are met and that the first operation will be/has been performed. In some embodiments, a start of movement of the hand (e.g., raising the hand, raising a single finger without raising the hand, raising a finger while the hand is raised, etc.) causes some deformation of the first surface (e.g., prior to a determination that movement of the hand meets the first or the second criteria).

In some embodiments, deformation of the first surface is determined at least in part based on a speed, a direction, an amount, etc. of the movement of the first hand (e.g., the extent and/or type of deformation depends on characteristics of the movement of the hand). In some embodiments, the first surface continues to deform after the movement of the hand has ended (e.g., the first surface ripples (e.g., there is an appearance of one or more waves passing through the first surface), vibrates, oscillates, catches up, etc. even after the hand is no longer moving in the physical environment).

In some embodiments, the movement 7045 of the hand is movement of one or more fingers (e.g., two fingers, a single finger, etc.) or a portion of a finger (e.g., first phalange, first two phalanges, etc.) relative to another part of the hand connected to the finger or portion of finger. In some embodiments, the finger(s) or portion(s) of finger(s) extend out or away from another portion of the hand (e.g., the fingers moves away from another portion (e.g., the palm, another finger, etc.) of the hand). In some embodiments, when the computer system detects extension of one or more fingers away from the palm of the same hand, the computer system shows the first surface of the user interface object 7046 flexing in response to the movement of the one or more fingers. In some embodiments, the movement of the hand includes movement of the one or more fingers in a first plane (e.g., a vertical plane of the physical environment, up and down, etc.) in the physical environment. In some embodiments, the computer system distorts the first surface of the first user interface object in response to the movement of the one or more fingers in the first plane (e.g., the vertical movement of the finger(s), the upward movement, the downward movement, the up and down movement, etc.). In some embodiments, in response to detecting the movement of the finger(s) in a respective plane (e.g., horizontal plane, vertical plane, etc.), in accordance with determination that movement of the finger(s) meets the first criteria, the computer system performs the first operation and dynamically changes one or more of the characteristic values of the first operation in accordance with continued movement of the finger(s) (e.g., as the finger continues to move upwards, a characteristic value of the first operation dynamically (e.g., smoothly and/or continuously) increases; as the finger continues to move downwards, a characteristic value of the first operation dynamically (e.g., smoothly and/or continuously) decreases, etc.).

In some embodiments, the movement 7045 of the finger(s) exceeds a predetermined threshold speed (e.g., the finger movement is a quick motion such as a flick, a tap, etc.). In some embodiments, when the computer system detects movement of the finger(s) exceeding the predetermined threshold speed, the computer system shows the first surface moving (e.g., vibrating, rippling, etc.) in response to the movement of the finger(s) even after the movement of the finger(s) have stopped. In some embodiments, in response to detecting the movement 7045 of the finger(s) exceeding the predetermined threshold speed, the computer system performs the first operation and discretely changes a first characteristic of the first user interface object 7046 and/or a function associated with the first user interface object 7046 (e.g., by predetermined intervals or discrete points of the characteristic value).

In some embodiments, the compute system detects a user's gaze directed to the three-dimensional environment. The computer system allows the user to interact with the first user interface object by directing the user's gaze to the position of the first user interface object 7046 in the three-dimensional environment. In some embodiments, the computer system determines which user interface object in the three-dimensional environment has input focus based on where the gaze input is directed. For example, when there are a first user interface object and a second user interface object in the first view 7202 of the three-dimensional environment, the hand movement of the user will affect a respective user interface object (e.g., cause performance of a corresponding operation, and/or deformation of the surface of the respective user interface object, etc.) when the user's gaze is detected at a position of the respective user interface object with sufficient stability and/or duration. In some embodiments, the computer system visually distinguishes the respective user interface object that is the focus of the user's gaze (e.g., by outlining, highlighting, offsetting, animating, and/or altering the surrounding environment, etc.) in the first view 7202 of the three-dimensional environment.

In some embodiments, as shown in FIGS. 7B-7D, the representation of the first surface of the first user interface object 7046 is transparent, translucent, etc. such that the portion of the three-dimensional environment behind the first surface is visible in the first view 7202 of the three-dimensional environment (e.g., is visible through the first surface, provides some of the basis for the visual appearance of the first surface, etc.). In some embodiments, as the first surface is deformed, the appearance of the portion of the three-dimensional environment behind the first surface is shown in a different manner in the first view of the three-dimensional environment, e.g., due to changes in the simulated optical properties (e.g., translucency, thickness, shape, surface profile and texture, structure, refractive index, simulated diffusion coefficient, etc.) as a result of the deformation of the first surface.

FIGS. 7E-7J are block diagrams that illustrate performing different operations associated with a user interface object in a three-dimensional environment in response to movement of a user's hand (e.g., e.g., movement of a hand of the user, movement of one or more fingers, movement of a portion of the hand that meets different movement thresholds, etc.) in a physical environment, in accordance with some embodiments.

Figure 7F:
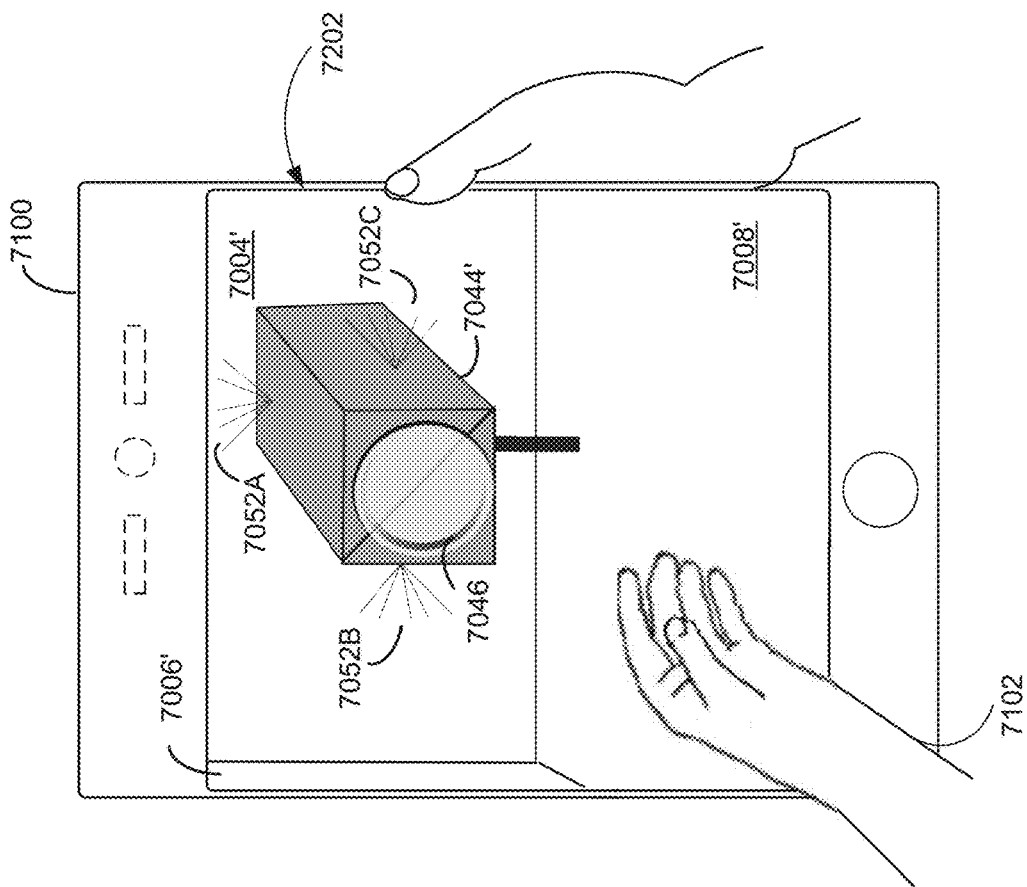
Figure 7E:
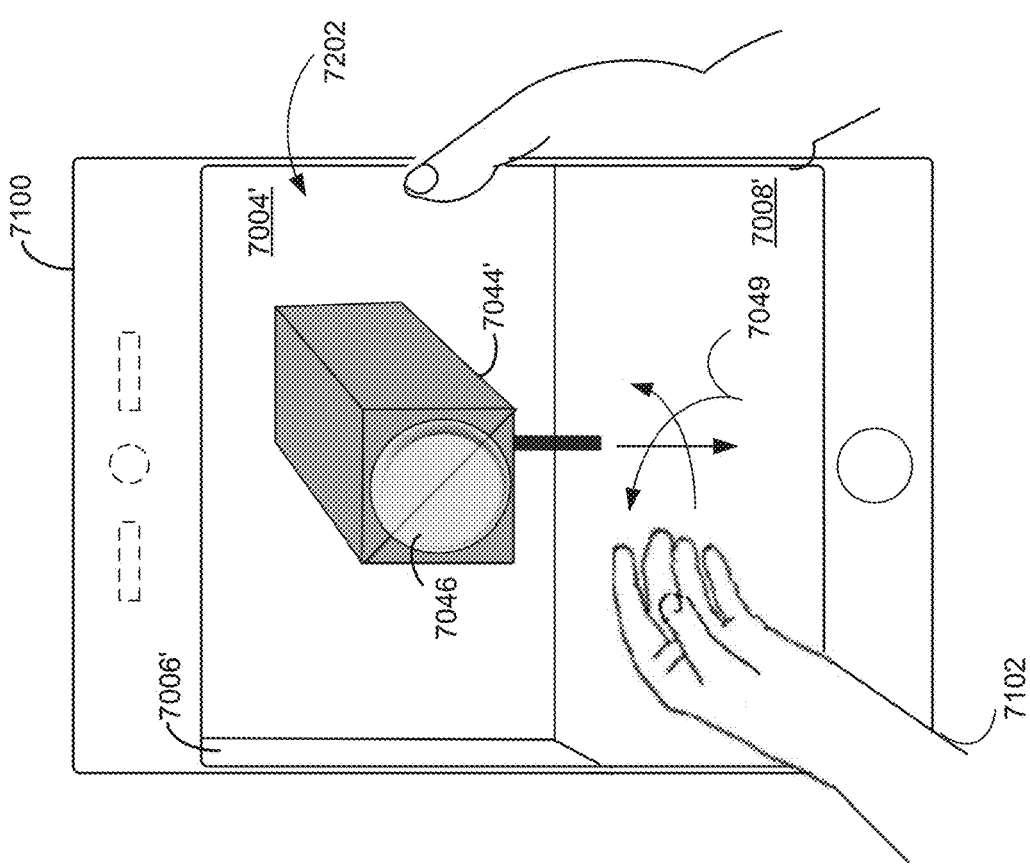
Figure 7H:
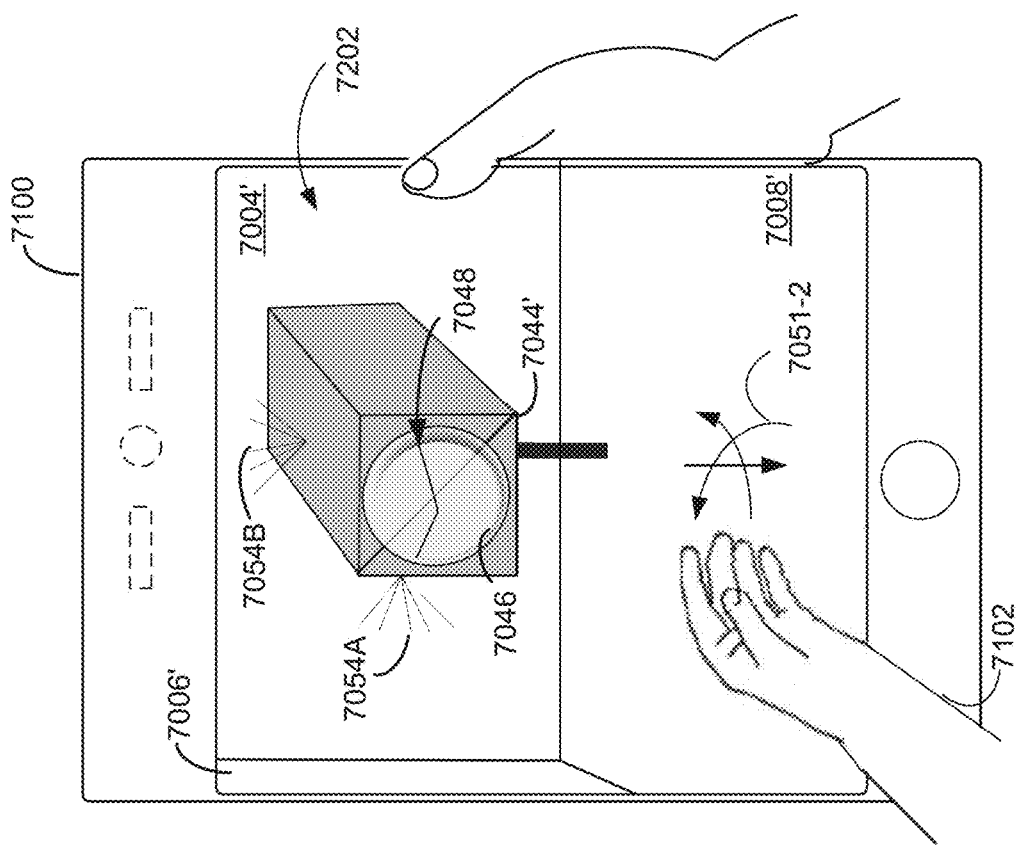

In some embodiments, a computer system displays a user interface object (e.g., the user interface object 7046, or another user interface object, etc.) in a three-dimensional environment. The user interface object is associated with multiple operations that can be respectively triggered in response to different movements of a user's hand (e.g., hand 7102, or another hand, etc.) in the physical environment when the user interface object has input focus (e.g., concurrently or previously selected by a gaze input, a gesture input, a selector object, etc.). The computer system determines which operation to perform by evaluating the movement of the hand (e.g., movement 7049 in FIG. 7E, movement 7051 in FIGS. 7G-7J, etc.) against different sets of criteria associated with the different operations. In some embodiments, the different sets of criteria associated with two different operations include different requirements on a characteristic movement speed of a first set of fingers (e.g., an index finger, an index finger and a middle finger, a thumb, etc.) relative to the portion of the hand connected to the first set of fingers. The computer performs a first operation in accordance with a determination that the movement of the user's hand meets first criteria that require the characteristic movement speed of the first set of fingers to exceed a threshold speed (e.g., as shown in FIGS. 7E-7F, three lights 7052A-C are turned on in response to the movement 7049); and the computer performs a second operation in accordance with a determination that the movement of the user's hand does not meet the first criteria, but meets second criteria that do not require the characteristic movement speed of the first set of fingers to exceed the threshold speed (e.g., as shown in FIGS. 7G-7J, lights 7052A-C are gradually turned on and off one by one in response to the movement 7051 and in accordance with the movement magnitude and movement directions of the movement 7051). In some embodiments, the first operation and the second operation are related operations (e.g., turning on lights, or other related operations, etc.), and one corresponds to a discrete change (e.g., turn on all lights, in FIG. 7F) and the other corresponds to a gradual change corresponding to the user interface object (e.g., turning on or off lights one by one, in FIG. 7G-7J, or other gradual changes related to other operations, etc.). In some embodiments, the computer system deforms the first surface in various manners throughout the movement of the first set of fingers, where the deformation of the first surface provides visual feedback regarding the detection and progress of the user's input and corresponding operations that will be performed (e.g., different manners of deformation of the first surface of the first user interface object 7046 are shown in FIGS. 7F-7J, relative to the default steady state shown in FIG. 7E and the state in FIG. 7B). In some embodiments, the descriptions made with respect to FIGS. 7A-7D and FIG. 8 also apply to the user interface object 7064 and movement of the hand 7102 described with respect to FIGS. 7E-7J and FIG. 9, and are not repeated in the interest of brevity. Similarly, aspects of the first user interface object 7046 and movement of the user's hand 7102 described with respect to FIGS. 7E-7J and FIG. 9 are applicable to the first user interface object 7046 and movement of the user's hand 7102 described with respect to FIGS. 7A-7D and FIG. 8.

FIG. 7E illustrates that the computer system is displaying the first view 7202 of the three-dimensional environment (e.g., a virtual three-dimensional environment, an augmented reality environment, a mixed reality environment, etc.) via the display generation component (e.g., the display generation component 7100, another display generation component such as an HMD, etc.). The first user interface object 7046 is displayed at a respective position in the three-dimensional environment. The first user interface object 7046 is associated with two or more operations, a respective operation of the two or more operations are activated in accordance with movement of the hand meeting a respective set of criteria. In some embodiments, the first user interface object 7046 is optionally associated with other operations that are activated in accordance with other types of inputs. In some embodiments, the descriptions of changes in appearance of the first user interface object 7046 and performance of a first operation associated with the user interface object 7046 in accordance with the movement of the user's hand 7102 meeting the first criteria in FIG. 7C are applicable to the change in appearance of the first user interface object 7046 and performance of either or both of the first operation (e.g., in FIGS. 7E-7F) and the second operation (e.g., in FIGS. 7G-7J) described in FIGS. 7E-7J. In some embodiments, the descriptions of changes in appearance of the first user interface object 7046 without performance of a first operation associated with the user interface object 7046 in accordance with the movement of the user's hand 7102 that does not meet the first criteria in FIG. 7D are applicable to the change in appearance of the first user interface object 7046 without performance of the first operation and the second operation described in FIGS. 7E-7J, e.g., in response to movement of the hand before the criteria for performing the first operation or the second operation are met by the movement of the hand.

In FIG. 7E, the computer system displays the first view 7202 of the three-dimensional environment via the display generation component (e.g., the display generation component 7100, or another display generation component such as an HMD, etc.). In some embodiments, the three-dimensional environment is an augmented reality environment that includes a representation of the physical environment and virtual content at various positions in the three-dimensional environment that correspond to different locations in the physical environment. For example, in FIG. 7B, the first view 7202 provided by the display generation component includes a representation of a portion of the physical environment 105. The first user interface object 7046 is placed relative to the position of the representation 7044' of a physical object 7044, and appears to overlay a front surface of the physical object 7044. In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component).

In some embodiments, when displaying the user interface object 7046 at a position that corresponds to the location of the physical object 7044 in the physical environment (e.g., in a virtual reality environment, a mixed reality environment, an augmented reality environment, etc.), the user interface object 7046 is displayed in placed of (e.g., replacing display of) a portion of the live view (e.g., a portion of the physical environment captured in the live view) of the cameras. In some embodiments, the first user interface object 7046 is projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, the first user interface object is displayed to overlay a portion of the display and blocks the view of at least a portion of the physical environment visible through the transparent or semi-transparent portion of the display generation component.

In some embodiments, the user interface object 7046 is a standalone user interface object (e.g., a button, a switch, a selectable control, an application icon, a notification, etc.), and is not part of another user interface object that includes one or more other user interface objects. In some embodiments, the user interface object 7046 is part of another larger user interface object (e.g., a user interface, a dock, a control panel, etc.) that includes one or more other user interface objects, with the different user interface objects occupying different portions of the larger user interface object. In some embodiments, the user interface object 7046 is a user interface object (e.g., a user interface, a dock, a control panel, etc.) that includes multiple smaller user interface objects occupying different sub-portions of the user interface object, and each of the smaller user interface objects may be individually activated by an input directed to a respective sub-portion of the user interface object 7046 to perform different operations associated with the user interface object 7046.

In some embodiments, the user interface object 7046 in the first view 7202 of the three-dimensional environment is an application icon, an application user interface of a respective application, a selectable avatar of another user, a selectable menu item, a device control, a content item, a slider control, a button, a multifunction control object, a control panel that includes multiple controls (e.g., corresponding to different functions or operations), a media item, a notification, a window, etc. In some embodiments, the user interface object 7046 has a default, steady state appearance with a corresponding set of display properties, including one or more of a first shape, a first size, a first color, a first spatial extent, a first thickness, a first level of transparency, a first level of opacity, a first blur radius, a first simulated refractive index, a first luminosity, a first color saturation, a first set of values and/or spatial distribution of values for one or more of the display properties, etc. across the first surface of the user interface object 7046. In FIG. 7E, before movement of the user's hand 7102 is detected by the computer system, the first user interface object 7046 is displayed with the default, steady state appearance. In some embodiments, the first user interface object 7046 has more than one default steady state appearances, and a respective one of the steady state appearances is selectively shown depending on a respective steady state of multiple steady states that the first user interface object 7046 currently has.

In some embodiments, the user interface object 7046 is associated with two or more operations (e.g., the production of light, production of audio, performance of two or more operations within the three-dimensional environment, etc.). The computer system performs a respective operation of the two or more operations in accordance with a user's input directed to the user interface object 7046 that meets the criteria for triggering the respective operation. In some embodiments, the first user interface object 7046 can be moved within the three-dimensional environment (e.g., by the user, or by the system, etc.). In some embodiments, at least some of the operations associated with the user interface object 7046 have an effect (e.g., are performed) in the physical environment (e.g., the performance of an operation associated with the first user interface object 7046 may cause a light to be turned on in the physical environment, cause a volume of a speaker to be adjusted, or cause a media player to be turned off, etc.). In some embodiments, at least some of the operations associated with the user interface object 7046 have an effect (e.g., are performed) in the three-dimensional environment (e.g., the performance of an operation associated with the first user interface object 7046 may cause additional virtual content to be displayed, existing virtual content to be changed, and/or removal of existing content in the three-dimensional environment, exiting the three-dimensional environment, etc.).

In FIG. 7E, the computer system detects movement 7049 of the hand 7102 of the user 7002 in the physical environment. In this example, the movement 7049 of the hand 7102 meets the first criteria for triggering the performance of a first operation out of two or more operations associated with the first user interface object 7046. In some embodiments, the movement 7049 of the hand includes movement of a first set of fingers (e.g., a single finger, two or more fingers, index finger, thumb, index finger and middle finger, etc.) relative to a portion of the hand that is connected to the first set of fingers (e.g., the palm, the root of the fingers, the knuckles, an adjacent phalange, etc.). In some embodiments, the first criteria require the movement 7049 of the first set of fingers relative to another portion of the hand to exceed a first threshold speed. In some embodiments, the characteristic movement speed of the first set of fingers include rotational speed(s) of the tip(s) of the first set of fingers around the finger joint(s) connected to the first set of fingers (e.g., joints are the base of the fingers, middle of the fingers, and/or tip of the fingers, etc.). In some embodiments, the movement of the first set of fingers corresponds to movement of a single finger (e.g., an index finger, a thumb, etc.). In some embodiments, the movement of a first set of fingers corresponds to movement of at least two adjacent fingers (e.g., an index finger and a middle finger, pinky finger and ring finger, middle finger and ring finger, etc.). In some embodiments, the movement of the first set of fingers that meets the first criteria corresponds to an upward flick movement, a downward flick movement, a sideways flick movement, etc.

In FIG. 7F, in response to detecting the movement 7049 of the hand 7102 and in accordance with a determination that the movement 7049 of the hand 7102 meets the first criteria for triggering the performance of the first operation out of two or more operations associated with the first user interface object 7046, the computer system performs the first operation (e.g., turning on all three lights 7050A-7050C in the physical environment, turning on all three virtual lights represented by 7050A-7050C in the three-dimensional environment, performing another type of operation, etc.) associated with the first user interface object 7046. In FIG. 7F, the computer system further changes the appearance of the first surface of the first user interface object 7046, e.g., deforming the first surface of the first user interface object 7046 and, optionally changing other visual characteristics of the first surface of the first user interface object. For example, as shown in FIGS. 7E and 7F, the surface of the first user interface object 7046 is pressed into a different shape (e.g., from a convex shape to a concave shape, depressed inward, flattened, etc.) and remains in the different shape, to indicate that the first user interface object 7046 has been activated in accordance with the first criteria being met and/or the first operation will be/has been performed. In some embodiments, the first operation corresponds to a toggle or switch (e.g., an on/off button, a multistate switch, etc.) of a particular characteristic and/or function (e.g., a binary operation is performed, a discrete change in states is performed, etc.).

Figure 7G:
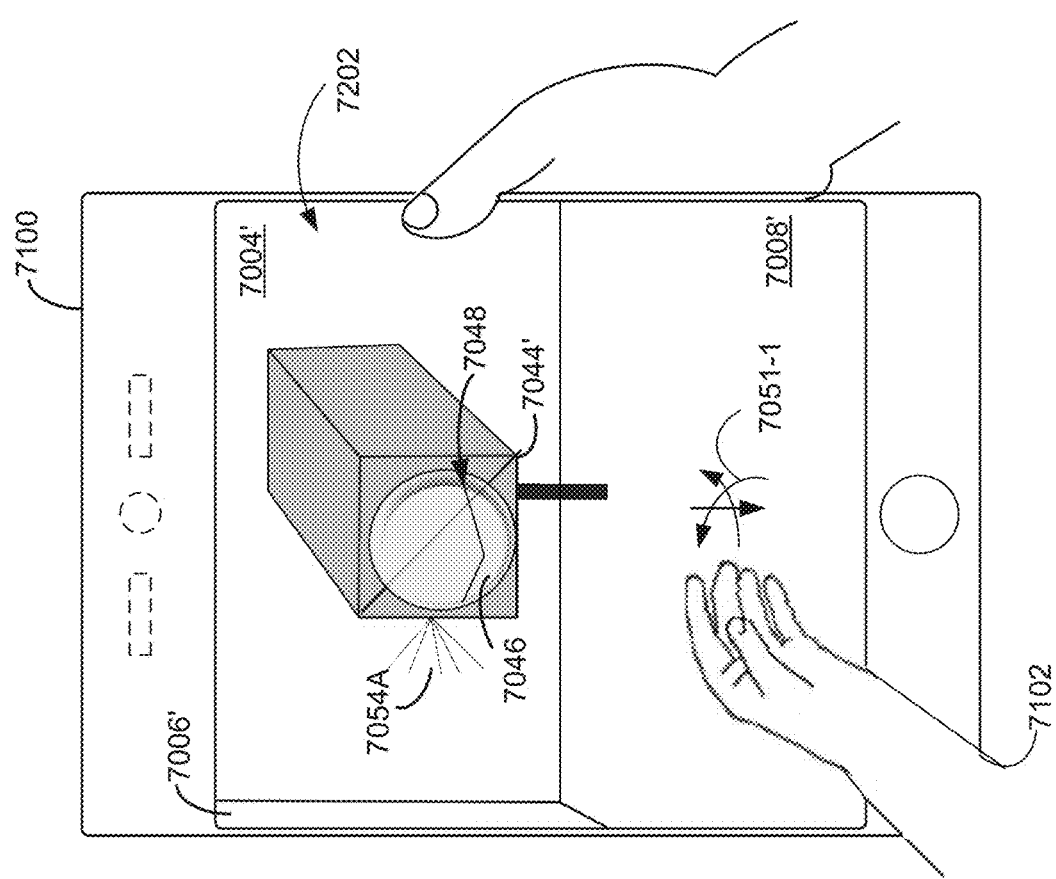

In contrast, in some embodiments, as shown in FIG. 7E followed by FIG. 7G, the computer system detects movement 7051 of the hand 7102 in the physical environment. In this example, the movement 7051 of the hand 7102 does not meet the first criteria for triggering the performance of the first operation out of two or more operations associated with the first user interface object 7046, but meets second criteria for triggering the performance of a second operation out of the two or more operations associated with the first user interface object 7046. In some embodiments, the movement 7051 of the hand includes movement of the same first set of fingers (e.g., a single finger, two or more fingers, index finger, thumb, index finger and middle finger, etc.) relative to the same portion of the hand that is connected to the first set of fingers (e.g., the palm, the root of the fingers, the knuckles, an adjacent phalange, etc.) as those for meeting the first criteria. In some embodiments, the movement 7051 of the hand includes movement of the a modified first set of fingers (e.g., with fewer fingers, with at least one finger that is different, etc.) relative to the portion of the hand that is connected to the modified first set of fingers (e.g., the palm, the root of the fingers, the knuckles, an adjacent phalange, etc.) as compared to those for meeting the first criteria. In some embodiments, the second criteria do not require that the movement 7051 of the first set of fingers relative to another portion of the hand to exceed the first threshold speed. In some embodiments, the second criteria require that the movement 7051 of the first set of fingers relative to another portion of the hand does not exceed the first threshold speed for at least a portion of the movement of the first set of fingers (e.g., for an initial portion of the movement up to a threshold time, distance, angular extent, etc., for the entirety of the movement, etc.). In some embodiments, the characteristic movement speed of the first set of fingers include rotational speed(s) of the tip(s) of the first set of fingers around the finger joint(s) connected to the first set of fingers (e.g., joints are the base of the fingers, middle of the fingers, and/or tip of the fingers, etc.). In some embodiments, the movement of the first set of fingers corresponds to movement of a single finger (e.g., an index finger, a thumb, etc.). In some embodiments, the movement of the first set of fingers corresponds to movement of at least two adjacent fingers (e.g., an index finger and a middle finger, pinky finger and ring finger, middle finger and ring finger, etc.). In some embodiments, the movement of the first set of fingers that meets the first criteria corresponds to a slow rotational and/or translational movement in a respective plane (e.g., vertical plane, horizontal plane, a plane defined relative to the orientation of the hand, a plane defined relative to the user interface object, a plane defined relative to the physical environment, etc.), in a respective direction (e.g., up and down, sideways, etc.), etc.

As shown in FIG. 7G, in response to detecting the movement 7051 of the hand 7102 and in accordance with a determination that the movement 7051 of the hand 7102 meets the second criteria and does not meet the first criteria, the computer system performs the second operation out of the multiple operation associated with the first user interface object 7046. In some embodiments, as shown in FIGS. 7G-7J, the computer system performs the second operation in accordance with the characteristics of the movement 7051 (e.g., movement magnitude, movement direction, etc.). In some embodiments, the second operation corresponds to a graduated operation (e.g., a dimmer switch, a slider control, etc.). For example, in some embodiments, performing the second operation includes causing a dynamic change in the amount of illumination output by the physical object 7044, or by the virtual object represented by the representation 7044' in the three-dimensional environment. In some embodiments, the movement magnitude and movement direction of the movement 7051 is determined based on an amount (e.g., absolute amount, percentage of a full range of motion, etc.) and direction of a rotational movement of a first set of finger(s) to respective joint(s) connected to those finger(s).

FIGS. 7G-7I illustrate a graduated increase in the amount of illumination (e.g., the gradual performance of the second operation) of the physical object 7044, in accordance with some embodiments. For example, as the movement 7051 of the user's hand progresses in a first direction and/or with increasing magnitude, the computer system turns on one real or virtual light 7054A (e.g., in FIG. 7G), turns on both real or virtual lights 7054A and 7054B (e.g., in FIG. 7H), and then turns on all three real or virtual lights 7054A-7054C (e.g., in FIG. 7I). In FIG. 7I-7J, the computer system detects that the movement 7051 of the user's hand has reversed in direction and/or reduced in magnitude, and in response, the computer system reduces the number of real or virtual lights that are turned on (e.g., from three real or virtual lights 7054A-7054C in FIG. 7I to two real or virtual lights 7054A and 7054B in FIG. 7J).

In some embodiments, in conjunction with performing the second operation in accordance with the movement characteristics of the movement 7051 of the user's hand, the computer system also changes the appearance of the first surface of the first user interface object 7046, optionally, in accordance with the movement characteristics of the movement 7051 of the user's hand and/or progress of the performance of the second operation. As shown in FIGS. 7G-7J, the gradual performance of the second operation (e.g., the gradual adjustment of the performance parameter of the second operation, progress of the second operation, etc.) is indicated by the changing appearance of the first surface of the first user interface object 7046 (e.g., by the changing position of an indication 7048, such as a ridge, a dent, or a visual indicator on the first surface of the first user interface object, by the amount and positions of deformation on the first surface of the first user interface object, etc.). For example, in FIG. 7G-7I, the location of the indication 7048 relative to a first reference position on the first surface of the first user interface object 7046 (e.g., a first edge, a simulated center of mass, or another fixed or anchored position on the first surface, a peripheral portion of the first surface, a center of the first surface, etc.) changes (e.g., moves in a first direction that corresponds to an increasing direction of a controlled value corresponding to the second operation), in accordance with the increasing characteristic value of the movement 7051 of the hand. In contrast, in FIG. 7I-7J, the location of the indication 7048 relative to the first reference position on the first surface of the first user interface object 7046 changes (e.g., moves in a second direction that corresponds to a decreasing direction of the controlled value corresponding to the second operation), in accordance with the decreasing characteristic value of the movement 7051 of the hand. In FIGS. 7G-7J, the indication 7048 moves and/or changes in accordance with the movement of the first set of fingers of the hand, while other portions of the first surface of the first user interface object 7046 outside of the indication 7048 may be stationary, may move in a way that does not correspond to the movement of the first set of fingers, lag the movement of the indication 7048, and/or compressed or stretched as a result of the change in the indication 7048 and other portions of the first surface.

In some embodiments, in accordance with a determination that the movement 7049 of the first set of fingers meets the first criteria, the computer system generates a first sound in conjunction with performing the first operation. In some embodiments, in accordance with a determination that the movement 7051 of the first set of fingers meets the second criteria, the computer system generates a second sound (e.g., different from the first sound) in conjunction with performing the second operation. In some embodiments, respective characteristics of the first and/or second sounds depend at least in part on characteristic movement speed (and/or direction, angular speed, etc.) of the movement of the first set of fingers. In some embodiments, respective characteristics of the first and/or second sounds depend at least in part on the type of control associated with the first user interface object (e.g., the first and/or second sounds differ when the first user interface object correspond to different types of controls (e.g., buttons vs. sliders vs. switches, etc.).

In some embodiments, in response to detecting movement of the first set of fingers relative to the portion of the hand connected to the first set of fingers (e.g., prior to a determination whether the movement meets either the first criteria or the second criteria), the computer system changes the appearance (e.g., blurring, opacity, color, brightness, shape, size, etc.) of the first user interface object 7046 in a first manner. In some embodiments, in accordance with a determination that the movement of the first set of fingers meets the first criteria, the computer system changes the appearance of the first user interface object in a second manner, different from the first manner. In some embodiments, in accordance with a determination that the movement of the first set of fingers meets the second criteria, the computer system changes the appearance of the first user interface object in a third manner, different from the first and/or second manners. The changes in appearance of the first surface provide visual feedback to the user regarding which operation is to be performed and/or is being performed.

In some embodiments, the compute system detects a user's gaze directed to the three-dimensional environment. The computer system allows the user to interact with the first user interface object by directing the gaze to the position of the first user interface object 7046 in the three-dimensional environment. In some embodiments, the computer system determines which user interface object in the three-dimensional environment has input focus based on where the gaze input is directed. For example, when there are a first user interface object and a second user interface object in the first view 7202 of the three-dimensional environment, the hand movement of the user will affect a respective user interface object (e.g., cause performance of a corresponding operation, and/or deformation of the surface of the respective user interface object, etc.) when the user's gaze is detected at a position of the respective user interface object with sufficient stability and/or duration. In some embodiments, the computer system visually distinguishes the respective user interface object that is the focus of the user's gaze (e.g., by outlining, highlighting, offsetting, animating, and/or altering the surrounding environment, etc.) in the first view of the three-dimensional environment. In some embodiments, the lack of a gaze input directed to the first user interface object 7046 can prevent the first and second operations from being performed, even when the first or second criteria, respectively, are met by the movement of the user's hand.

In some embodiments, in response to detecting movement of the first set of fingers relative to the portion of the hand connected to the first set of fingers (e.g., prior to making a determination whether the movement meets either the first or the second criteria (e.g., at the beginning of a motion), the computer system moves and/or changes the appearance of the first user interface object 7046 in a fourth manner. In some embodiments, these changes is applied in accordance with a determination that a user gaze input is detected by the computer system on the first user interface object 7046.

In some embodiments, in response to detecting movement of the first set of fingers relative to the portion of the hand connected to the first set of fingers (e.g., before the first criteria or the second criteria are met, in response to the first criteria or the second criteria being met, etc.), the computer system reveals one or more user interface objects (e.g., objects not previously displayed in the first view 7202) from the position of the first user interface object 7046. The one or more objects pop out of the first user interface object 7046, or slide from underneath the first user interface object 7046, etc. In some embodiments, the one or more user interface objects are one or more avatars of other users that the user can connect with using one or more communication applications. In some embodiments, characteristics of the movement (e.g., distance, speed, rotation, angular speed, and/or duration, etc. of the movement) of the first set of fingers relative to the portion of the hand connected to the first set of fingers are used by the computer system to determine a number or extent of the one or more user interface objects to be revealed.

FIGS. 7K-7N are block diagrams that illustrate causing a change in appearance of a user interface object in different manners in response to movement of a portion of a user (e.g., movement of the whole hand, movement of one or more fingers, etc.), including performing an operation corresponding to the user interface object in conjunction with changing the appearance of the user interface object, or moving the first user interface object away from a position that corresponds to the location of the movement of the portion of the user, in accordance with some embodiments.

Figure 7L:
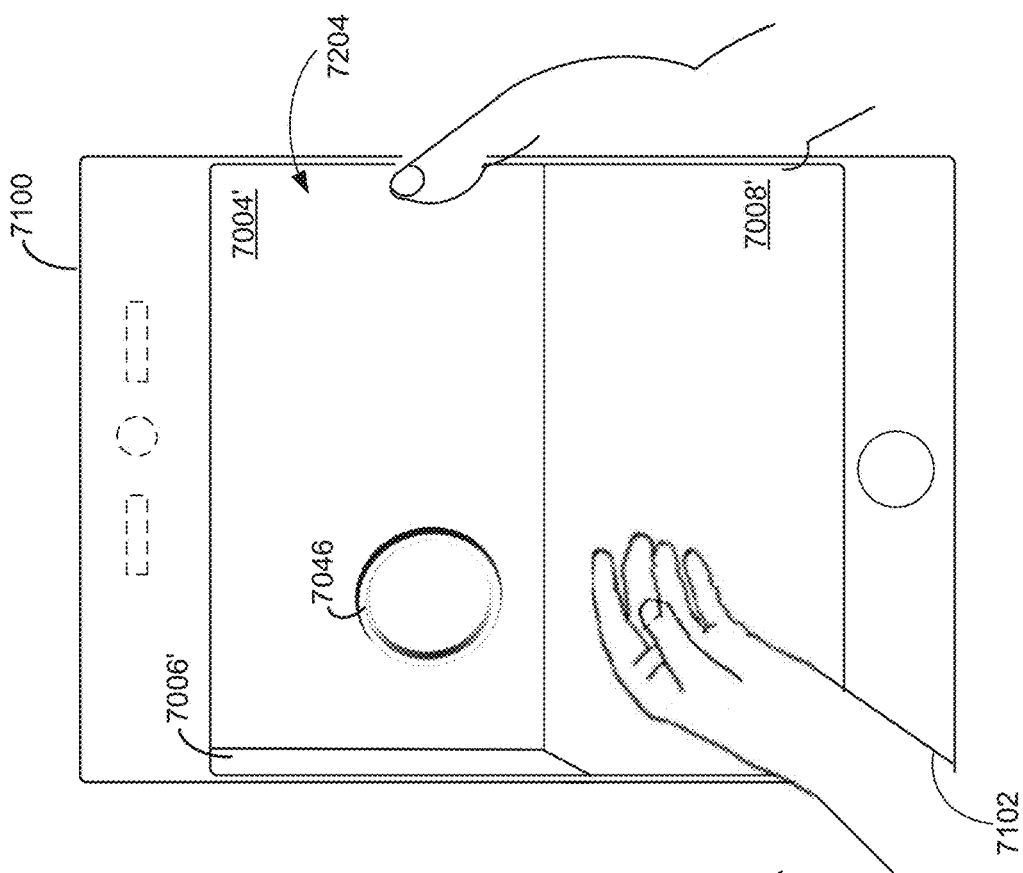
FIGS. 7K-7N are block diagrams that illustrate causing a change in appearance of a user interface object in different manners in response to movement of a portion of a user (e.g., movement of the whole hand, movement of one or more fingers, etc.), including performing an operation corresponding to the user interface object in conjunction with changing the appearance of the user interface object, or moving the first user interface object away from a position that corresponds to the location of the movement of the portion of the user, in accordance with some embodiments.
Figure 7K:
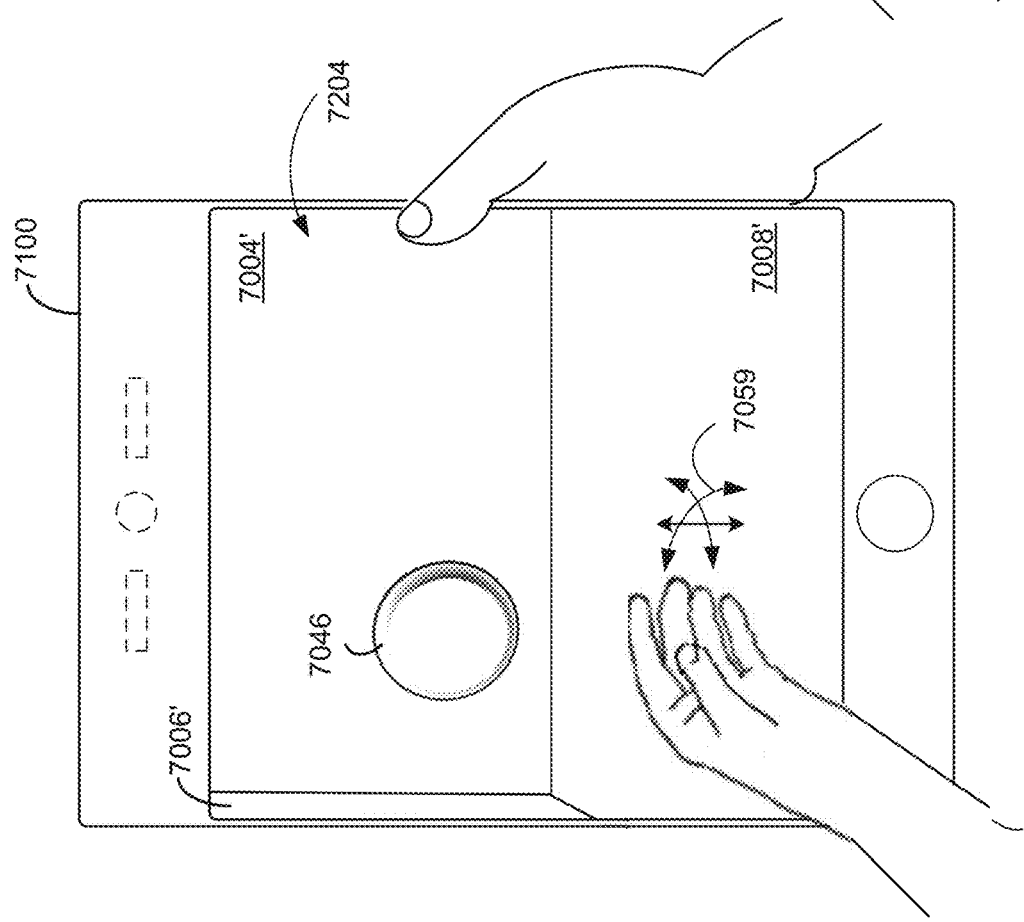
Figure 7N:
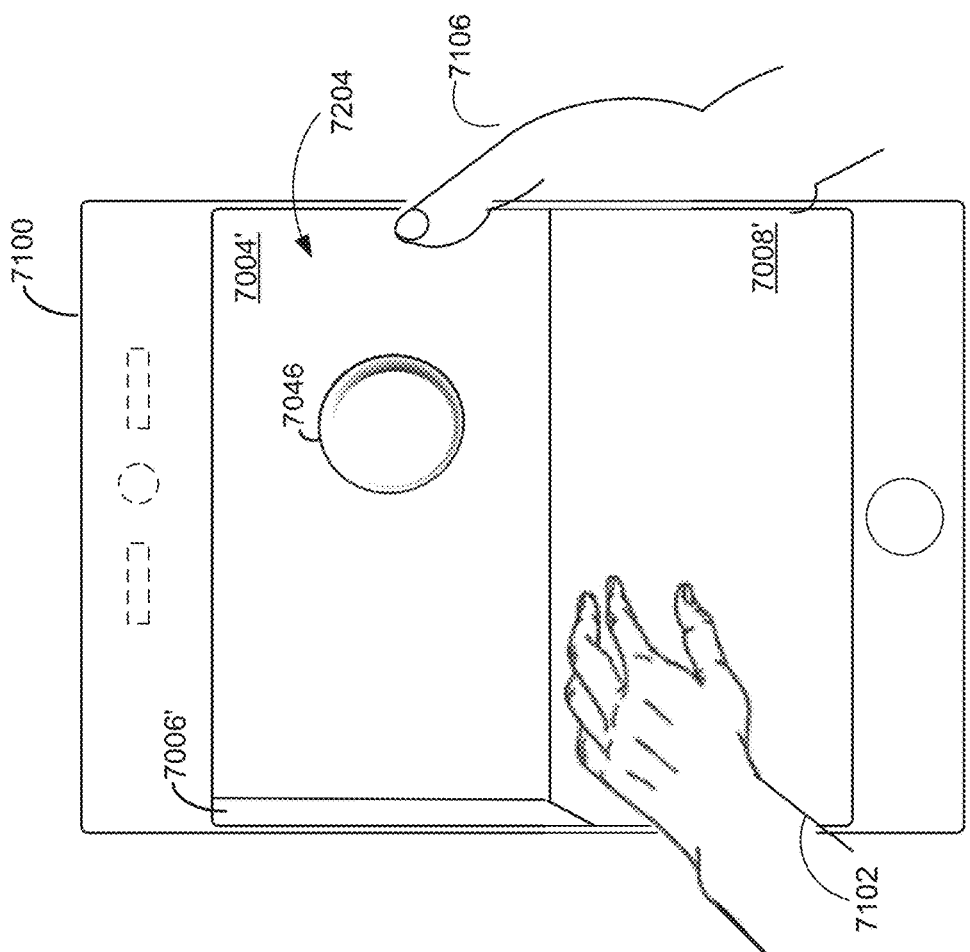
Figure 7M:
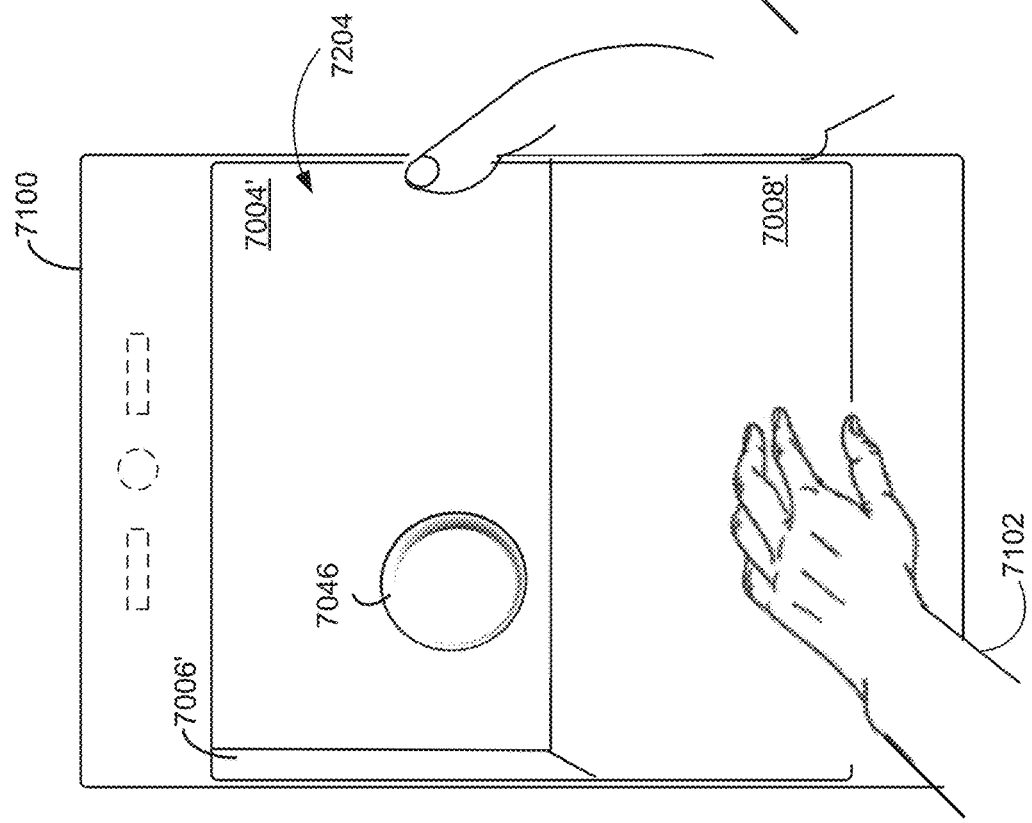

In some embodiments, a computer system displays a user interface object (e.g., the user interface object 7046, or another user interface object, etc.) in a three-dimensional environment (e.g., a virtual environment, an augmented reality environment, a mixed reality environment, an environment such as that shown in FIGS. 7A-7J and that shown in FIGS. 7K-7N, etc.). The user interface object (e.g., the user interface object 7046, or another user interface object, etc.) responds to a movement of a user (e.g., user 7002, or another user, etc.) in the physical environment in different manners depending on whether the movement meets preset criteria. For example, when the movement of a portion of the user meets first criteria (e.g., an only set of criteria, or one of multiple sets of criteria corresponding to different operations associated with the user interface object 7046, etc.) corresponding to a first operation associated with the user interface object (e.g., an only operation, or one of multiple operations associated with the user interface object 7046, etc.), the computer system performs the first operation and changes the appearance of the user interface object to indicate performance of the first operation (e.g., as illustrated in FIGS. 7K-7L, as also illustrated in FIGS. 7B-7C, FIGS. 7E-7F, FIGS. 7G-7J, etc.). When movement of the portion of the user does not meet the first criteria, the compute system moves the user interface object 7046 (e.g., the user interface object is moved away from a region that corresponds to the location of the user's hand in the physical environment) but does not perform the first operation (e.g., as shown in FIGS. 7M-7N, where the computer system moves the first user interface object 7046 without performing an operation associated with the first user interface object, optionally, without changing the appearance of the first user interface object (e.g., without deforming, or changing other characteristics of the first surface, etc.)).

In some embodiments, the descriptions made with respect to FIGS. 7A-7D and FIG. 8, and FIGS. 7E-7J and FIG. 9, also apply to the user interface object 7064 and movement of the hand 7102 described with respect to FIGS. 7K-7N and FIG. 10, and are not repeated in the interest of brevity. Similarly, aspects of the first user interface object 7046 and movement of the user's hand 7102 described with respect to FIGS. 7K-7N and FIG. 10 are applicable to the first user interface object 7046 and movement of the user's hand 7102 described with respect to FIGS. 7A-7D and FIG. 8, and FIGS. 7E-7J and FIG. 9.

FIG. 7K illustrates a first view 7204 of a three-dimensional environment, including the first user interface object 7046 at a first position with a first appearance (e.g., a default stead state appearance, a respective one of multiple steady state appearances, etc.).

In FIG. 7K, the user 7002 and the display generation component 7100 are present in a physical environment (e.g., scene 105 or another physical environment, etc.). The user 7002 is in a position relative the display generation component 7100 that enables the user to view a computer-generated environment presented via the display generation component. FIGS. 7K-7L illustrate performance of an operation and deformation of a surface of the user interface surface object 7046 in the three-dimensional environment in response to movement 7059 of the user's hand 7102 in the physical environment, in accordance with some embodiments. In this example, FIGS. 7K-7L show changes in the appearance of the surface of the user interface object 7046 and performance of an operation (e.g., operating a physical device in the physical environment, displaying a virtual experience, displaying a media object, selecting a menu item, etc.) in response to movement 7059 of the user's hand that meets the preset criteria for triggering performance of the operation.

In FIGS. 7K-7N, the computer system displays a view 7202 of a three-dimensional environment via the display generation component (e.g., the display generation component 7100, or another display generation component such as an HMD, etc.), which may be the same view or a different view from that shown in FIGS. 7A-7J, in accordance with various embodiments. In some embodiments, the three-dimensional environment is an augmented reality environment that includes a representation of the physical environment and virtual content at various positions in the three-dimensional environment that correspond to different locations in the physical environment. For example, in FIG. 7K, the first view 7204 provided by the display generation component includes a representation of a portion of the physical environment 105. The first view of 7204 of the three-dimensional environment includes representations of physical surfaces (e.g., representations 7004' and 7006' of the walls 7004 and 7006, representation 7008' of the floor 7008, etc.) and optionally representations of physical objects. In some embodiments, the first user interface object 7046 is displayed at a position that corresponds to the location of a physical surface or a physical object. In some embodiments, the first user interface object 7046 is displayed at a position that is independent of a physical object. In some embodiments, the three-dimensional environment is a virtual three-dimensional environment that does not include a representation of the physical environment. For example, the representations 7004', 7006', and 7008' optionally represent virtual surfaces and virtual content (e.g., virtual scenery, user interfaces, virtual window, virtual screen for displaying media content, etc.) present in the virtual three-dimensional environment.

In some embodiments, the user interface object 7046 is a standalone user interface object (e.g., a button, a switch, a selectable control, an application icon, a notification, etc.), and is not part of another user interface object that includes one or more other user interface objects. In some embodiments, the user interface object 7046 is part of another larger user interface object (e.g., a user interface, a dock, a control panel, etc.) that includes one or more other user interface objects, with the different user interface objects occupying different portions of the larger user interface object. In some embodiments, the user interface object 7046 is a user interface object (e.g., a user interface, a dock, a control panel, etc.) that includes multiple smaller user interface objects occupying different sub-portions of the user interface object, and each of the smaller user interface objects may be individually activated by an input directed to a respective sub-portion of the user interface object 7046 to perform different operations associated with the user interface object.

In some embodiments, the user interface object 7046 in the first view 7204 of the three-dimensional environment is an application icon, an application user interface of a respective application, a selectable avatar of another user, a selectable menu item, a device control, a content item, a slider control, a button, a multifunction control object, a control panel that includes multiple controls (e.g., corresponding to different functions or operations), a media item, a notification, a window, etc. In some embodiments, the user interface object 7046 has a default, steady state appearance with a corresponding set of display properties, including one or more of a first shape, a first size, a first color, a first spatial extent, a first thickness, a first level of transparency, a first level of opacity, a first blur radius, a first simulated refractive index, a first luminosity, a first color saturation, a first set of values and/or spatial distribution of values for one or more of the display properties, etc. across the first surface of the user interface object 7046. In FIGS. 7K and 7M, before movement of the user's hand 7102 is detected by the computer system, the first user interface object 7046 is displayed with the default, steady state appearance. In FIG. 7N, after movement of the user's hand 7102 is detected by the computer system, the first user interface object 7046 is still displayed with the default, steady state appearance at a different position in the three-dimensional environment (e.g., away from the representation of the user's hand 7102, away from the position that corresponds to the location of the hand 7102, etc.). In some embodiments, the first user interface object 7046 has more than one default steady state appearances, and a respective one of the steady state appearances is selectively shown depending on a respective steady state of multiple steady states that the first user interface object 7046 currently has.

In some embodiments, the user interface object 7046 is associated with one or more operations (e.g., the production of light, production of audio, performance of one or more operations within the three-dimensional environment, etc.). The computer system performs a respective operation of the one or more operations in accordance with a user's input directed to the user interface object 7046 that meets the criteria for triggering the respective operation. In some embodiments, the first user interface object 7046 can be intentionally repositioned from one position to another position within the three-dimensional environment (e.g., by the user, or by the system, etc.). In some embodiments, the repositioning of the user interface object 7046 in accordance with user inputs that meets preset criteria for repositioning the user interface object 7046 (e.g., a pinch and drag gesture directed to the first user interface object, a configuration input that repositions the first user interface object, etc.) is distinguished from the movement of the user interface object that avoids the position that corresponds to the location of the user's hand (e.g., the behavior shown and described with respect to FIGS. 7M-7N).

In some embodiments, at least some of the operations associated with the user interface object 7046 have an effect (e.g., are performed) in the physical environment (e.g., the performance of an operation associated with the first user interface object 7046 may cause a light to be turned on in the physical environment, or cause a media player to be turned off, etc.). In some embodiments, at least some of the operations associated with the user interface object 7046 have an effect (e.g., are performed) in the three-dimensional environment (e.g., the performance of an operation associated with the first user interface object 7046 may cause additional virtual content to be displayed, existing virtual content to be changed, and/or removal of existing content in the three-dimensional environment, exiting the three-dimensional environment, etc.).

In FIG. 7K, the computer system detects movement 7059 of the hand 7102 of the user 7002. In this example, the movement 7059 of the hand meets the preset criteria for triggering the performance of an operation associated with the first user interface object 7046 (e.g., a first operation, a second operation, etc.). In response to detecting the movement 7059 of the hand 7102 and in accordance with a determination that the movement 7059 of the hand 7102 meets the respective criteria for triggering the performance of the operation associated with the first user interface object (e.g., the operation that corresponds to a control function of the first user interface object, not an operation that just changes the appearance or position of the first user interface object, etc.), the computer system performs the operation (e.g., start a communication session with another user, launching an application, exiting an application, turn on/off a control, start/stop playing media content, etc. etc.) associated with the first user interface object 7046. The computer system further deforms the first surface of the first user interface object 7046. For example, as shown in FIGS. 7K and 7L, the surface of the first user interface object 7046 is pressed into a different shape (e.g., from a convex shape to a concave shape, depressed inward, flattened, etc.) and remains in the different shape, to indicate that the first user interface object 7046 has been activated in accordance with the first criteria being met and/or the first operation will be/has been performed. After the movement of the hand 7102 that caused performance of the operation associated with the first user interface object 7046, the first user interface object optionally ceases to be displayed, or changes its content or appearance without further input from the user (e.g., a movie or experience is started, a program is set in motion, etc.).

In FIGS. 7M-7N, the computer system detects a movement of the user's hand 7102 in the physical environment that does not meet the criteria for triggering performance of an operation associated with the user interface object 7046 (e.g., movement does not have the correct posture, does not have sufficient speed, not in the required direction, not having sufficient duration, etc.). In response to detecting movement of the user's hand that does not meet the criteria for triggering performance of an operation associated with the user interface object 7046, the computer system moves the first user interface object and does not perform an operation associated with the user interface object 7046 (e.g., does not perform the first operation, does not perform any operation of the first user interface that can be triggered by the movement of the hand, etc.). In some embodiments, the computer system moves the first user interface object 7046 away from a respective position in the three-dimensional environment that corresponds to a location of the hand in the physical environment (e.g., the location to which the hand moved in the physical environment based on the movement of the hand) without performing an operation associated with the first user interface object, and, optionally, without changing the appearance of the first user interface object (e.g., to indicate that an operation has not been performed).

In some embodiments, the movement of the first user interface object 7046 in the three-dimensional environment is determined based at least on the movement of the user's hand 7102. In some embodiments, the movement of the first user interface object 7046 in response to the movement of the user's hand is a continuous and fluid movement (e.g. translation, rotation, etc.) that can be dynamically changed in speed, direction, and/or acceleration during the movement of the user's hand through the physical environment, in accordance with the changes in speed, direction, and/or acceleration of the hand. In some embodiments, the computer system outputs different types of sounds in conjunction with the movement of the first user interface object based on the characteristics of the movement of the first user interface object. In some embodiments, the sounds that are output during the movement of the first user interface object is different from the sounds output in conjunction with performance of the operation associated with the user interface object (e.g., different in pitch, baseline wave pattern, frequency range, sound type (e.g., continuous vs. discrete, etc.), etc.).

FIGS. 7O-7R are block diagrams that illustrate moving (e.g., animating, deforming, translating, rotating, etc.) a surface of a user interface object in a three-dimensional environment in response to movement in a physical environment of a person who is not a user of the computer system, in accordance with some embodiments.

In some embodiments, a computer system displays a user interface object (e.g., user interface object 7200, or another user interface object (e.g., user interface object 7046, a user interface object that presents content and does not trigger performance of a corresponding operation in the three-dimensional environment or the physical environment when activated by user input, etc.), etc.) with a first surface at a first position in a three-dimensional environment (e.g., a surface that extends laterally or with a respective orientation in front of a viewpoint of a currently displayed view of the three-dimensional environment, a surface that spans a sub-portion of the currently displayed view of the three-dimensional environment, a surface that spans an entirety of, or beyond the currently displayed view of the three-dimensional environment, etc.). In some embodiments, the user interface object includes a virtual screen, a virtual curtain, a virtual surface, virtual wallpaper, and/or virtual scenery, etc., that includes visual content (e.g., movie, images, scenery, etc.). In some embodiments, the user interface object includes one or more interactive user interface elements (e.g., controls, selectable options, user interfaces, etc.). A user of the computer system (e.g., user 7002 in FIG. 7O, another user, etc.) views the three-dimensional environment via a display generation component (e.g., display generation component 7100, another type of display generation component such as an HMD, etc.) and interacts with the three-dimensional environment via one or more input devices that are in communication with the computer system. The computer system moves the first surface of the user interface object (e.g., the first use interface object 7200, as shown in FIG. 7R) in accordance with movement and/or presence of a person (e.g., person 7300 in FIG. 7Q, or another person, etc.) in the same physical environment as the user (e.g., user 7002 in FIG. 7Q), even when the person is not a user of the computer system or a participant of the experience provided in the three-dimensional environment. In some embodiments, the computer system also alters the display property of the first surface (e.g., making it more transparent, thinner, etc.) to reveal a representation of the presence and movement of the person in the physical environment (e.g., as show in FIG. 7R, the representation 7300' of the person 7300 is visible from behind the user interface object 7200, as the person 7300 moves in a spatial region that corresponds to a position behind the user interface object 7200 relative to the viewpoint).

As described above with regards to some embodiments, FIGS. 7O and 7Q illustrate a physical environment (e.g., a scene 105, or another indoor or outdoor environment, etc.) that surrounds the user 7002. In FIGS. 7O and 7Q, the user 7002 and the display generation component 7100 are present in the physical environment. The user 7002 is in a position relative the display generation component 7100 that enables the user 7002 to view a first view 7206 of a computer-generated environment presented via the display generation component 7100. As described herein, the display generation component 7100 is a non-limiting example of any of multiple types of displays, such as a heads-up display, a head-mounted display (HMD), a LED display, a touch-screen, a projector, etc. In some embodiments, the physical environment 105 is a room or is part of a room in a building (e.g., is an environment that includes one or more walls 7004 and 7006 and/or a floor 7008) in various locations. In some embodiments, the physical environment 105 is an outdoor environment (e.g., outside of a building, in nature, in a park, etc.). In some embodiments, the physical environment 105 includes one or more physical objects (e.g., pieces of furniture (e.g., a table, a chair, a cabinet, an appliance, a drawer, an electronic device, a wall, a window, a display screen, the user's hand, etc.), a part of the scenery (e.g., a rock, a tree, a body of water, etc.), etc.), one or more physical surfaces (e.g., walls 7004 and 7006, floor 7008, surfaces of roads, buildings, etc.), and open space and scenery, etc. at various locations. In some embodiments, the display generation component 7100 is held by the user 7002 in a hand of the user. In some embodiments, the display generation component 7100 is not held by the user 7002 in the user's hand. In some embodiments, the display generation component is fixed and/or supported by a structure in the physical environment that is not part of the user 7002. In some embodiments, the display generation component is fixed and/or supported by a portion of the user 7002 (e.g., head, ears, nose, etc.), such that the display generation component is maintained at a fixed position relative to the user's face or eyes that enables the user to view the content presented via the display generation component.

Figure 7P:
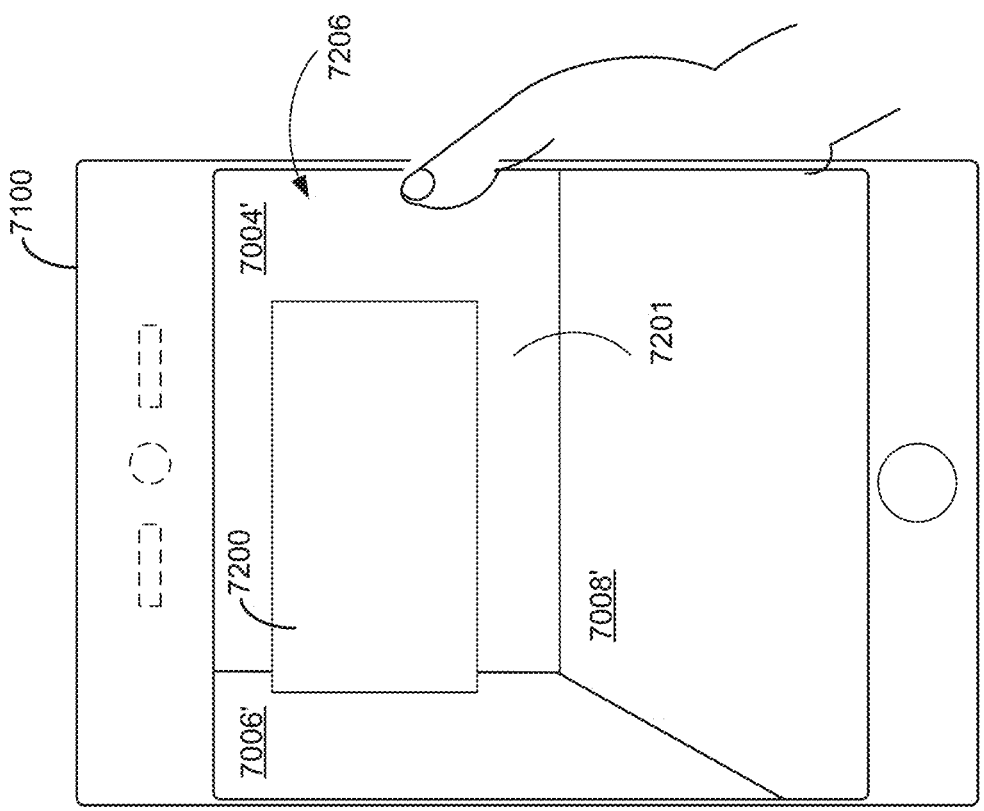
FIGS. 7O-7R are block diagrams that illustrate moving (e.g., animating, deforming, translating, rotating, etc.) a surface of a user interface object in a three-dimensional environment in response to movement in a physical environment of a person who is not a user of the computer system, in accordance with some embodiments.
Figure 7O:
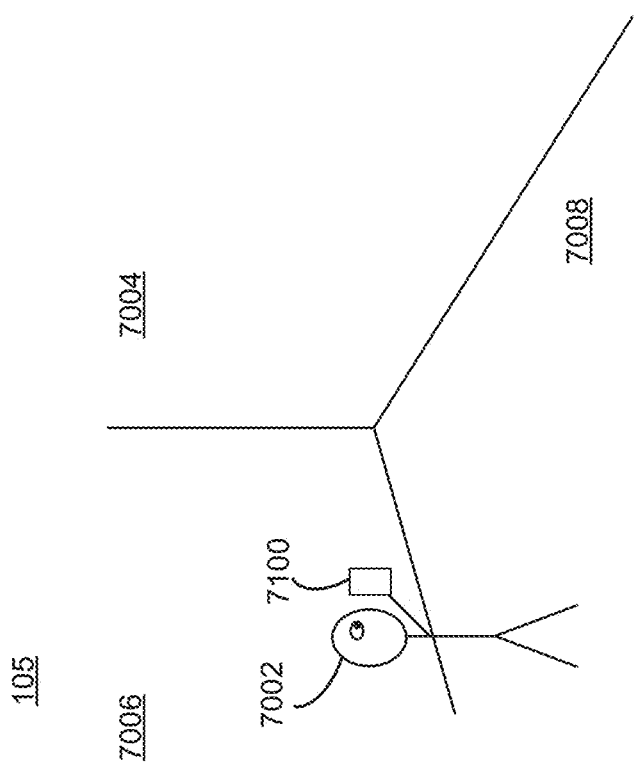
Figure 7R:
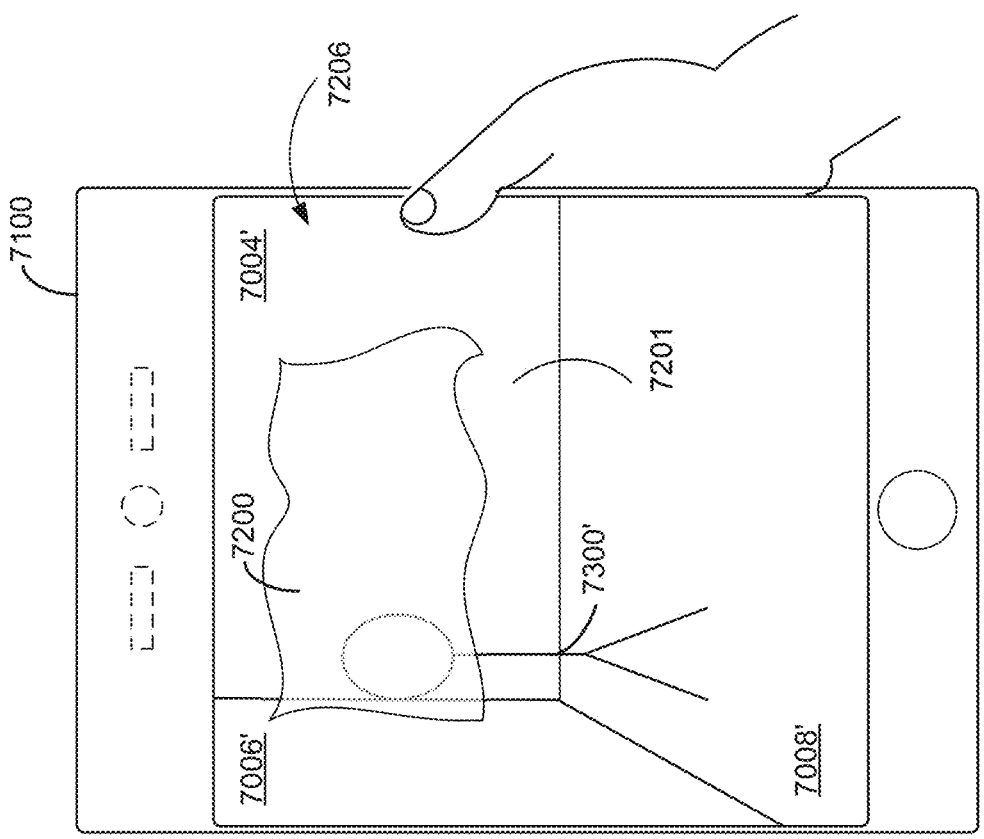
Figure 7Q:
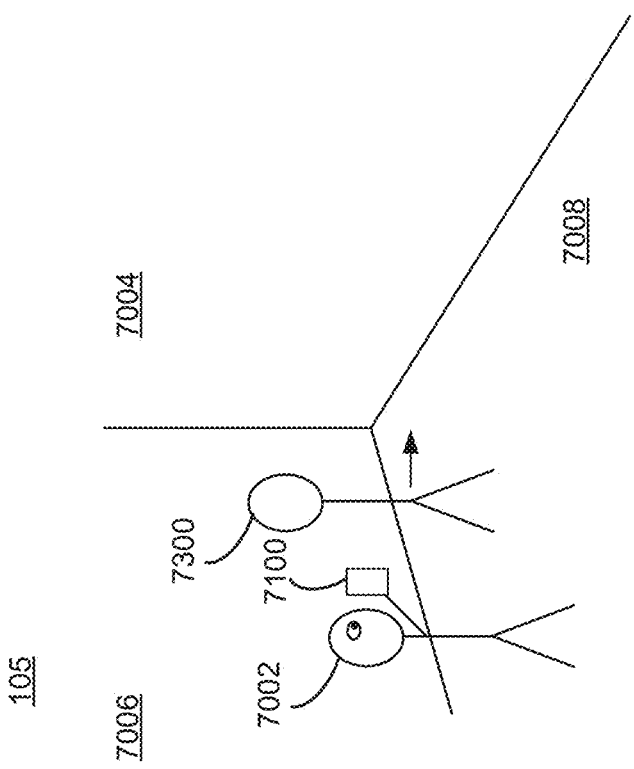

In FIG. 7P, the computer system displays a first view 7206 of a three-dimensional environment via the display generation component (e.g., the display generation component 7100, or another display generation component such as an HMD, etc.). In some embodiments, the three-dimensional environment is an augmented reality environment that includes a representation of the physical environment (e.g., the physical environment 105, another physical environment of the user 7002 and the display generation component 7100, etc.) and virtual content (e.g., virtual surfaces, virtual scenery, virtual light, virtual reflection, virtual shadows, visual effects that alter the appearances of the representation of the physical environment, virtual objects, etc.) at various positions in the three-dimensional environment that corresponds to different locations in the physical environment. For example, in FIGS. 7P and 7R, the first view 7206 provided by the display generation component includes a representation of a portion of the physical environment 105 (e.g., the portion of the physical environment that is in front of the user, the portion of the physical environment that is in front of the display generation component, the portion that is captured by a camera of the computer system, etc.). The first view 7206 of the three-dimensional environment includes representations of physical surfaces (e.g., representations 7004' and 7006' of the walls 7004 and 7006, representation 7008' of the floor 7008, etc.), and, optionally, representations of physical objects and representations of open space and scenery in the physical environment. In some embodiments, the first user interface object 7200 is displayed at a position that corresponds to the location of a physical object or a physical surface. In some embodiments, the first user interface object 7200 is displayed at a position that corresponds to an unoccupied location that free from a physical object or surface. In some embodiments, the three-dimensional environment is a virtual three-dimensional environment that does not include a representation of the physical environment. For example, the representations 7004', 7006', and 7008' optionally represent virtual surfaces and virtual objects present in the virtual three-dimensional environment. In some embodiments, the compute system displays a representation 7201 of a virtual optical effect (e.g., a virtual shadow, virtual illumination, etc.) at one or more positions in the three-dimensional environment based on the spatial relationships between the first user interface object 7200 and the surrounding virtual objects and surfaces and/or representations of physical objects and surfaces in the three-dimensional environment.

In some embodiments, the user interface object 7200 is a user interface object (e.g., user interface object 7046, or another user interface object, etc.) that is associated with one or more operations (e.g., a button, a switch, a selectable control, an application icon, a notification, a user interface, a dock, a control panel, a selectable avatar of another user, a selectable menu item, a device control, a content item, a slider control, a multifunction control object, a media item, a window, a viewport, etc.). In some embodiments, the user interface object 7200 displays media content, virtual scenery, a virtual scene or setting, or is virtual wallpaper, virtual curtain, virtual material (e.g., virtual fabric, virtual threads, virtual cobwebs, etc.) or simulated elements (e.g., rain, fog, fire, smoke, cloud, etc.) etc. In some embodiments, the user interface object 7200 has a default, steady state appearance with a corresponding set of display properties, including one or more of a first shape, a first size, a first color, a first spatial extent, a first thickness, a first level of transparency, a first level of opacity, a first blur radius, a first simulated refractive index, a first luminosity, a first color saturation, a first set of values and/or spatial distribution of values for one or more of the display properties, etc. across the first surface of the user interface object 7046. In some embodiments, the first user interface object 7200 displays changing content (e.g., movie, virtual ocean waves, a preview of a three-dimensional experience, virtual flames, animations, etc.) while in its default steady state, and/or has movements that correspond to the inputs from or corresponding to the user 7002 (e.g., gesture inputs, hand movement, biometric data of the user 7002, etc.) (e.g., inputs such as the movement and biometric data described with respect to FIGS. 7A-7N and 7S-7V, and FIGS. 8,9, 10, and 12, etc.). In FIG. 7P, before the presence and movement of the person 7003 is detected in the physical environment of the user 7002, the first user interface object 7200 is displayed with the default, steady state appearance, optionally, with a representation 7201 of a virtual optical effect caused by the presence of the first user interface object 7200 in the three-dimensional environment. In some embodiments, the representation 7201 is a simulated shadow displayed at a position that overlays, replaces display of, or blocks the view of a physical surface in the physical environment (e.g., a pass-through view, a camera view, a displayed representation, an actual physical surface seen through the display generation component, etc.). In some embodiments, the user interface object 7200 is displaying changing visual content, such as a movie or a live video, etc.

In some embodiments, when displaying the first user interface object 7200 at a position that corresponds to a location of one or more physical objects or surfaces in the physical environment, the first user interface object 7200 is displayed in placed of (e.g., replacing display of) a portion of the live view (e.g., a portion of the physical environment captured in the live view) of the cameras. In some embodiments, the first user interface object 7200 is projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, the user interface object 7200 is displayed to overlay a portion of the display and blocks the view of at least a portion of the physical environment visible through the transparent or semi-transparent portion of the display generation component. In some embodiments, when displaying the user interface object 7200, the display properties of the user interface object 7200 are optionally altered in accordance with the appearance of the portion of the physical environment that corresponds to a portion of the three-dimensional environment that is behind the user interface object 7200 relative to the viewpoint of the currently displayed view of the three-dimensional environment, to simulate a translucent or semi-transparent appearance of the first user interface object 7200.

In some embodiments, when displaying the user interface object 7200, the display properties of the user interface object 7200 are optionally altered in accordance with the appearance of the portion of the physical environment that corresponds to a portion of the three-dimensional environment that surrounds (e.g., is above, is below, is next to, etc.) the user interface object 7200 in the three-dimensional environment, to simulate a reflection, illumination, shadow and/or diffusion, etc., on the first user interface object 7200 caused by the light or light source in the physical environment. In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 modifies the display properties of a portion of the live view (e.g., a portion of the physical environment captured in the live view) of the cameras. In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 is projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 is displayed to overlay a portion of the display and modifies the view of at least a portion of the physical environment visible through the transparent or semi-transparent portion of the display generation component.

FIG. 7Q illustrates the physical environment 105 surrounding the user 7002, where the person 7300 who is not the user of the computer system and not a participant of the experience provided in the three-dimensional environment (e.g., is not sharing the three-dimensional environment with the user through another computer system in communication with the computer system, is not controlling a user input device in communication with the computer system, etc.) has entered the physical environment 105. In FIG. 7Q, the person 7300 is at a respective location in the physical environment that has a first spatial relationship with a location that corresponds to the position of the first user interface object 7200 in the three-dimensional environment. In some embodiments, having the first spatial relationship with the location that corresponds to the position of the first user interface object 7200 includes being within a threshold distance of the location, moving toward the location, in a spatial region behind the location (e.g., relative to the user 7002 or the display generation component), in a spatial region that intersects with the location, etc. In some embodiments, the threshold distance is dynamically determined based on a movement characteristic (e.g., movement speed, movement direction, acceleration, a combination of multiple movement characteristics, etc.) of the movement of the person 7003 in the physical environment of the user 7002.

FIG. 7R illustrates the first view 7206 of the three-dimensional environment in which a representation 7300' of the person 7300 is visible. The position of the representation 7300' of the person 7300 corresponds to the location of the person 7300 in the physical environment, in accordance with some embodiments. In some embodiments, the representation 7300' of the person only includes the representation of only a sub-portion of the portion of the person 7300 that is within the field of view provided by the display generation component. In some embodiments, the sub-portion is the person's head or upper body. In some embodiments, the sub-portion does not include the person's legs or feet, etc. In some embodiments, at least a sub-portion of the representation 7300' of the person 7300 (e.g., a sub-portion of the representation of the person 7300 that is not replaced or blocked by the virtual content in the three-dimensional environment, etc.) is part of the representation of the physical environment (e.g., a camera view, a view through a transparent portion of the display generation component, etc.) visible in the first view 7206 of the three-dimensional environment.

In FIGS. 7Q-7R, the computer system detects movement of the person 7300 in the physical environment (e.g., toward, in front of, behind, and/or through the spatial region in the physical environment that corresponds to the region occupied the first user interface object 7200 in the three-dimensional environment). In response to detecting movement of the person 7300 and in accordance with a determination that the person 7300 has a spatial relationship to the location that corresponds to the position of the first user interface object 7200 that meets preset criteria (e.g., a directional requirement, a distance requirement, a speed requirement, a combination of the above, etc.), the computer system moves the first surface of the first user interface object 7200 in the first view 7206 of the three-dimensional environment in accordance with the movement of the person 7300 in the physical environment. In some embodiments, characteristics of the presence and/or movement of the person 7300 (e.g., proximity, speed, direction, position, hand motion, etc.) are used to calculate a simulated force or energy (e.g., force or energy of virtual wind, virtual waves, etc.) that causes corresponding movement of the first surface of the first user interface object 7300 (e.g., the first surface responds to motion and/or proximity of the person 7300). In some embodiments, the computer system uses preset criteria to determine whether or not the person 7300 is a person of significant to the user 7002, and alters the appearance of the first user interface object 7200 in accordance with a determination that the person 7300 is a person of significance to the user 7002 based on the preset criteria. In some embodiments, the preset criteria are met in accordance with a determination that the person 7300 is a contact in a list of contacts (e.g., friends, roommates, family members, etc.) of the user 7002. In some embodiments, the preset criteria are met in accordance with a determination that the person 7300 is wearing a device that transmits a preset signal (e.g., a signal corresponding to a preset identity, a signal corresponding to a preset important level, etc.). In some embodiments, the preset criteria are met in accordance with a determination that the person 7300 has facial features and/or appearances matching a preset set of facial features and appearances (e.g., facial features of the user's family members, supervisor, etc.; appearances of a policeperson, a train conductor, etc.). In some embodiments, in accordance with a determination that the person 7300 does not meet the preset criteria, the computer system does not move the first surface of the first user interface object 7200 in accordance with the presence and/or movement of the person 7300 in the physical environment.

In some embodiments, the computer system moves the first surface of the first user interface object 7200 in accordance with a spatial relationship (e.g., the distance and/or orientation) between the person 7300 and the location that corresponds to the first surface. For example, the spatial relationship between the first person and the location that corresponds to the position of the first surface is optionally used to determine the extent of the movement of the first surface. In some embodiments, the first surface moves more (e.g., with a greater spatial extent, with a greater movement speed and fluctuation frequency, etc.) when the location of the person 7300 is closer to the location that corresponds to the position of the first surface in the three-dimensional environment; and the first surface moves less (e.g., with a lesser spatial extent, with a smaller movement speed and fluctuation frequency, etc.) when the location of the person 7300 is farther away from the location that corresponds to the position of the first surface in the three-dimensional environment.

In some embodiments, the movement of the first surface includes translation and/or rotation of the first surface in the three-dimensional environment. In some embodiments, the movement of the first surface includes deformation of the first surface, e.g., moving a first portion of the first surface relative to a second portion of the first surface, and, optionally, stretching, compressing, bending, etc. a third portion of the first surface that connects the first portion to the second portion of the first surface. For example, in response to detecting the presence and movement of the person 7300 (e.g., when the person 7300 has moved to a location that corresponds to a position in the vicinity of the first surface, when the person 7300 is moving in a region that corresponds to a region behind the first surface toward the user 7200, etc.), the computer system moves the first surface out of the way of the person 7300 (e.g., revealing the representation 7300' of the user 7300, separating at a position that corresponds to a location in the movement path of the person 7300, etc.). In some embodiments, the movement of the first surface of the first user interface object 7200 includes changing a shape, size, thickness, etc. of the first user interface object, thereby changing the shape, size, and thickness of the first surface. In some embodiments, the computer system changes one or more visual characteristics of the first surface (e.g., translucency, opacity, simulated refractive index, color, blur radius, simulated diffusion coefficient, thickness, density, etc.). For example, in response to detecting the presence and movement of the person 7300 (e.g., when the person 7300 has moved to a location that corresponds to a position behind the first surface, when the person 7300 is moving in a region that corresponds to a region behind the first surface toward the user 7200, etc.), the computer system changes the first surface from having a first translucency level to having a second translucency level (e.g., a greater translucency level than the first translucency, a smaller translucency level than the first translucency level, etc.). In some embodiments, only a sub-portion of the first surface moves and/or is displayed with a changed appearance (e.g., having a greater or lesser translucency level than before, having a different simulated diffusion coefficient than before, etc.), while another portion of the first surface remains stationary and/or retains its original steady state appearance (e.g., with the same translucency level, with the same opacity, the same simulated diffusion coefficient, etc. as before the detection of the movement of the person 7300). In some embodiments, a combinations of characteristics may be changed, and different amounts of changes may be applied to different portions of the first surface. In some embodiments, the changes in the visual characteristics of the first surface are a gradual change temporally and/or spatially across the first surface.

In some embodiments, as the person 7300 continues to move (e.g., moves from a location corresponding to the respective position of a first portion of the first surface to another location corresponding to the respective position of the second portion of the first surface), the movement and/or changes in visual characteristics described above are applied to the second portion of the first surface, while the movement and/or changes in visual characteristics applied to the first portion of the first surface gradually subsides and/or are restored to their previous state. In some embodiments, in response to detecting that the person 7300 has moved to a location that does not correspond to a position of a portion of the first surface (e.g., the location of the person 7300 is outside of the field of view of the display generation component, the spatial relationship between the person 7300 and the location that corresponds to the position of the first user interface object 7200 no longer meets the preset criteria, etc.), the computer system ceases to move the first surface and restores the appearance of the first user interface object to its steady state appearance before detection of the presence and/or movement of the person 7300. In some embodiments, during the movement of the first surface and the changes of the visual characteristics of the first surface of the first user interface object 7200, if dynamic visual content (e.g., a movie, a live video, an animated virtual object, etc.) is displayed on the first surface of the first user interface object 7200, the appearance of the dynamic visual content is altered in accordance with the movement and/or changes in the visual characteristics of the first surface of the first user interface object; and when the movement and/or changes in the visual characteristics of the first surface has subsided and/or have been restored, the dynamic visual content displayed on the first surface of the first user interface object 7200 continues with no more alterations due to the movement or change in visual characteristics of the first surface.

In some embodiments, in response to detecting that the person 7300 has moved to a location that does not correspond to a position of a portion of the first surface (e.g., the location of the person 7300 is outside of the field of view of the display generation component, the spatial relationship between the person 7300 and the location that corresponds to the position of the first user interface object 7200 no longer meets the preset criteria, etc.), the computer system continues to move the first surface with gradually decreasing amplitudes for a period of time (e.g., the movement or virtual energy of the first surface slowly dissipates as the distance between the location of the person 7300 and the location that corresponds to the position of the first surface increases). In some embodiments, in response to detecting that the person 7300 has moved to a location that does not correspond to a position of a portion of the first surface (e.g., the location of the person 7300 is outside of the field of view of the display generation component, the spatial relationship between the person 7300 and the location that corresponds to the position of the first user interface object 7200 no longer meets the preset criteria, etc.), the computer system gradually decreases the changes in visual characteristics made in the first surface over a period of time (e.g., the surface gradually returns to its original opacity, clarity, etc. as the distance between the location of the person 7300 and the location that corresponds to the position of the first surface increases).

In some embodiments, the computer system outputs an audio output (e.g., a sound effect, a music clip, etc.) in response to detecting movement of the person 7300 in a spatial region that is in the vicinity of (e.g., intersects, within a threshold distance of, in front of, behind, runs through, etc.) the location corresponding to the position of the first surface. In some embodiments, the computer system outputs different sounds when different persons with different recognized identities and/or characteristics are detected to be present and/or moving in the physical environment of the user 7002. In some embodiments, the computer system outputs a respective sound that corresponds to movement of the user 7002, and the respective sound is different from the sound that is output in response to the movement of the person 7300.

FIGS. 7S-7V are block diagrams that illustrate altering an appearance (e.g., changing one or more visual properties, moving, etc.) of a surface of a user interface object in a three-dimensional environment in response to changes of biometric data of a user and movement of the user, in accordance with some embodiments.

Figure 7T:
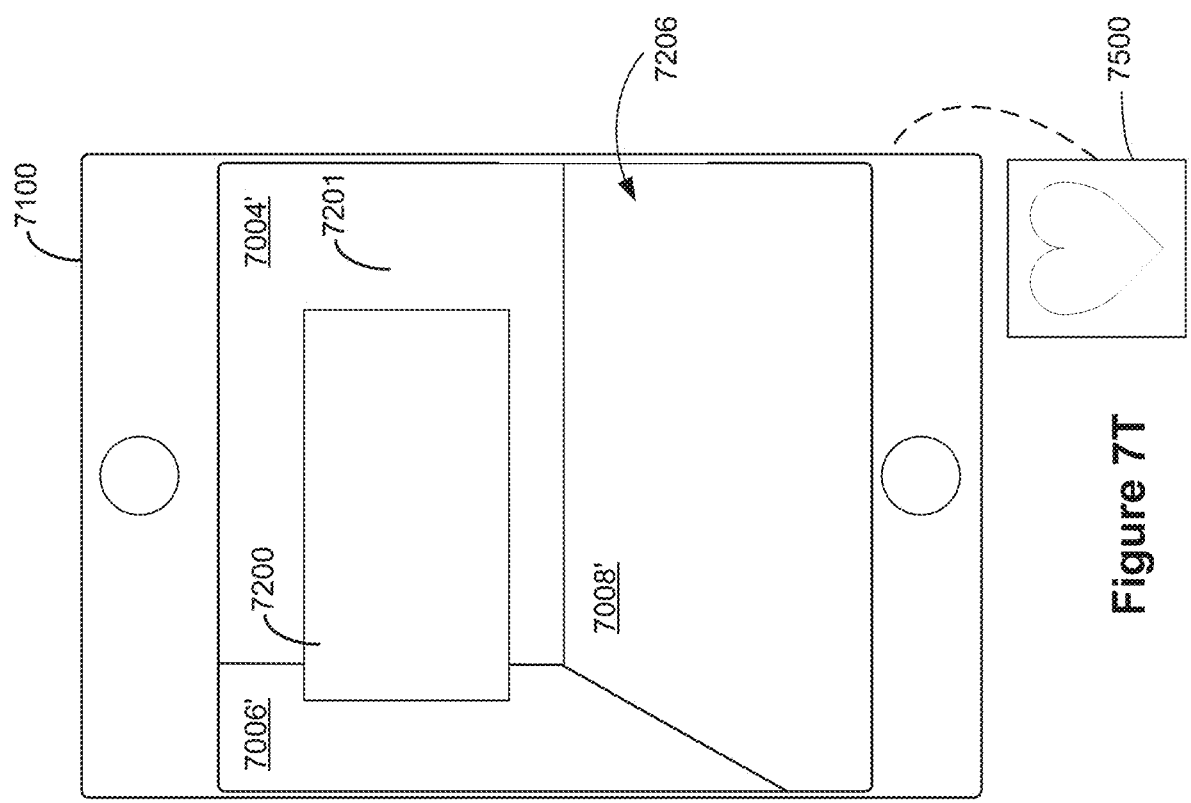
FIGS. 7S-7V are block diagrams that illustrate altering an appearance (e.g., changing one or more visual properties, moving, etc.) of a surface of a user interface object in a three-dimensional environment in response to changes of biometric data of a user and movement of the user, in accordance with some embodiments.
Figure 7S:
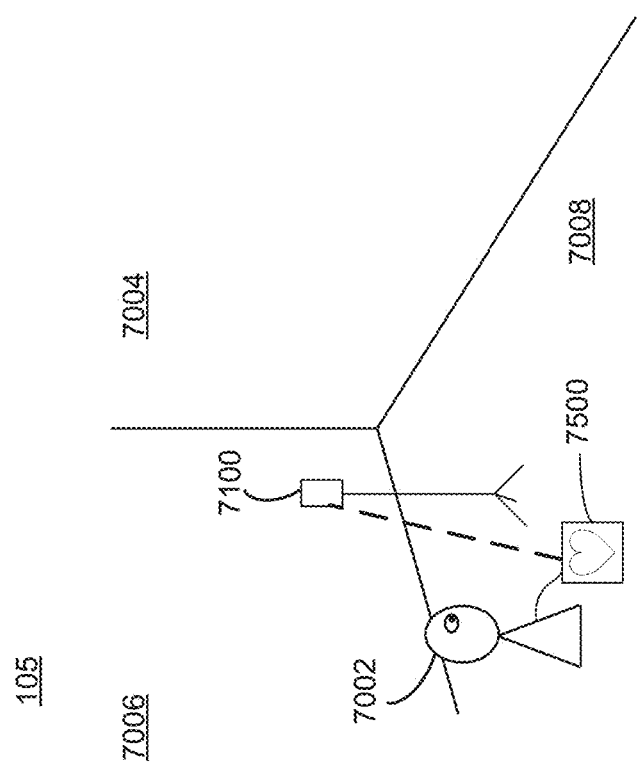
Figure 7V:
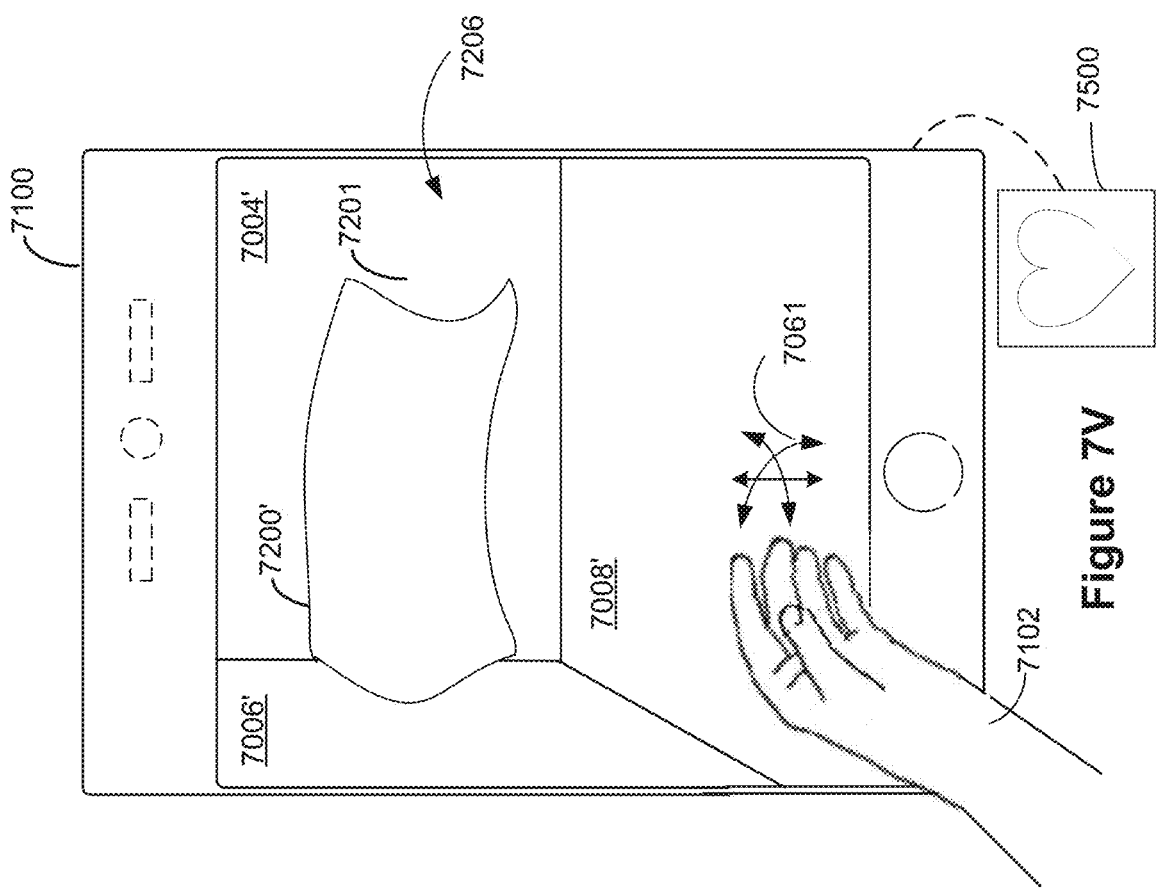
Figure 7U:
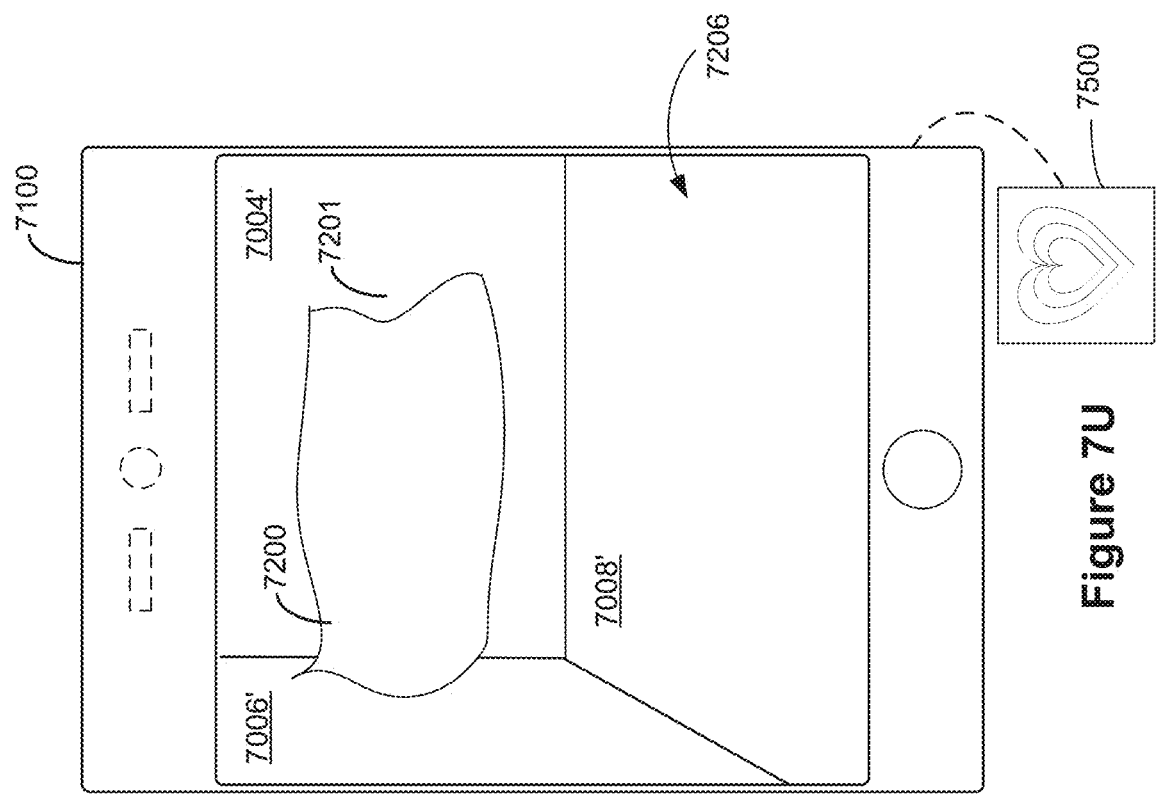

In some embodiments, a computer system displays a user interface object (e.g., user interface object 7200 in FIGS. 7T, 7U, and 7V, a user interface object described with respect to FIGS. 7A-7R, and FIGS. 8-11, another user interface object, etc.) (e.g., a user interface object with a first surface, a user interface object that does not have a defined surface or shape, etc.) in a three-dimensional environment. In some embodiments, the user interface object includes a virtual screen, a virtual curtain, a virtual surface, virtual wallpaper, virtual cloud, virtual element (e.g., virtual rain, virtual fog, virtual fire, etc.), virtual material (e.g., virtual fabric, virtual cobweb, etc.) or virtual scenery, etc. In some embodiments, the first surface serves as a means to help the user regulate his/her physiological and emotional state and provides temporary mental separation from the physical environment (e.g., scene 105 in FIGS. 7S and 7U). The computer system receives biometric data corresponding to the user (e.g., via a device 7500 in communication with the computer system, via one or more sensors coupled to or pointing at the user 7002, etc.), and provide visual feedback to the user in accordance with the values and changes in the biometric data. For example, the computer system changes the appearance (e.g., through motion, deformation, animated changes in color, transparency, blur radius, size, shape, etc.) of the user interface object in accordance with the change in biometric data of the user. The computer system also changes the appearance of the user interface object (e.g., user interface object 7200, another user interface object, etc.) in accordance with movement of the user in the physical environment.

As described above with regards to other embodiments, FIG. 7S illustrates a physical environment (e.g., a scene 105, or another indoor or outdoor environment, etc.) that surrounds the user 7002. In FIG. 7S, the user 7002 and the display generation component 7100 are present in the physical environment. The user 7002 is in a position relative the display generation component 7100 that enables the user 7002 to view a first view 7206 of a computer-generated environment presented via the display generation component 7100 (e.g., the first view 7206 as shown in FIGS. 7O-7R, another view, etc.). As described herein, the display generation component 7100 is a non-limiting example of any of multiple types of displays, such as a heads-up display, a head-mounted display (HMD), a LED display, a touchscreen, a projector, etc. In some embodiments, the physical environment 105 is a room or is part of a room in a building (e.g., is an environment that includes one or more walls 7004 and 7006 and/or a floor 7008) in various locations. In some embodiments, the physical environment 105 is an outdoor environment (e.g., outside of a building, in nature, in a park, etc.). In some embodiments, the physical environment 105 includes one or more physical objects (e.g., pieces of furniture (e.g., a table, a chair, a cabinet, an appliance, a drawer, an electronic device, a wall, a window, a display screen, the user's hand, etc.), a part of the scenery (e.g., a rock, a tree, a body of water, etc.), etc.), one or more physical surfaces (e.g., walls 7004 and 7006, floor 7008, surfaces of roads, buildings, etc.), and open space and scenery, etc. at various locations. In some embodiments, the display generation component 7100 is held by the user 7002 in a hand of the user. In some embodiments, the display generation component 7100 is not held by the user 7002 in the user's hand. In some embodiments, the display generation component is fixed and/or supported by a structure in the physical environment that is not part of the user 7002. In some embodiments, the display generation component is fixed and/or supported by a portion of the user 7002 (e.g., head, ears, nose, etc.), such that the display generation component is maintained at a fixed position relative to the user's face or eyes that enables the user to view the content presented via the display generation component.

In FIG. 7T, the computer system displays the first view 7206 of the three-dimensional environment via the display generation component (e.g., the display generation component 7100, or another display generation component such as an HMD, etc.). In some embodiments, the three-dimensional environment is an augmented reality environment that includes a representation of the physical environment (e.g., the physical environment 105, another physical environment of the user 7002 and the display generation component 7100, etc.) and virtual content (e.g., virtual surfaces, virtual scenery, virtual material, virtual elements (e.g., virtual fog, virtual fire, virtual rain, etc.), virtual light, virtual reflection, virtual shadows, visual effects that alter the appearances of the representation of the physical environment, virtual objects, etc.) at various positions in the three-dimensional environment that correspond to different locations in the physical environment. For example, in FIGS. 7T-7V, the first view 7206 provided by the display generation component includes a representation of a portion of the physical environment 105 (e.g., the portion of the physical environment that is in front of the user, the portion of the physical environment that is in front of the display generation component, the portion that is captured by a camera of the computer system, etc.). The first view 7206 of the three-dimensional environment includes representations of physical surfaces (e.g., representations 7004' and 7006' of the walls 7004 and 7006, representation 7008' of the floor 7008, etc.), and, optionally, representations of physical objects and representations of open space and scenery in the physical environment. In some embodiments, the first user interface object 7200 is displayed at a position that corresponds to the location of a physical object or a physical surface. In some embodiments, the first user interface object 7200 is displayed at a position that corresponds to an unoccupied location that free from a physical object or surface. In some embodiments, the three-dimensional environment is a virtual three-dimensional environment that does not include a representation of the physical environment. For example, the representations 7004', 7006', and 7008' optionally represent virtual surfaces and virtual objects present in the virtual three-dimensional environment. In some embodiments, the compute system displays a representation 7201 of a virtual optical effect (e.g., a virtual shadow, virtual illumination, virtual reflection, virtual diffusion, etc.) at one or more positions in the three-dimensional environment based on the spatial relationships between the first user interface object 7200 and the surrounding virtual objects and surfaces and/or representations of physical objects and surfaces in the three-dimensional environment.

In some embodiments, the user interface object 7200 is a user interface object (e.g., user interface object 7046, or another user interface object, etc.) that is associated with one or more operations (e.g., a button, a switch, a selectable control, an application icon, a notification, a user interface, a dock, a control panel, a selectable avatar of another user, a selectable menu item, a device control, a content item, a slider control, a multifunction control object, a media item, a window, a viewport, etc.). In some embodiments, the user interface object 7200 displays media content, virtual scenery, a virtual scene or setting, or is virtual wallpaper, virtual curtain, virtual material (e.g., virtual fabric, virtual threads, virtual cobwebs, etc.) or simulated elements (e.g., rain, fog, fire, smoke, cloud, etc.) etc. In some embodiments, the user interface object 7200 displays no content, and is a blank material (e.g., has a respective color, tone, opacity, translucency, blur radius, etc. across a spatial span of the material). In some embodiments, the user interface object 7200 has a first surface that has a defined contour and, optionally, finite spatial extent, in the three-dimensional environment. In some embodiments, the user interface object 7200 is a volume that does not have a defined contour or boundary (e.g., like rain, fog, fire, light, etc.) in the three-dimensional environment. In some embodiments, the user interface object 7200 has a default, steady state appearance with a corresponding set of display properties, including one or more of a first shape, a first size, a first color, a first spatial extent, a first thickness, a first level of transparency, a first level of opacity, a first blur radius, a first simulated refractive index, a first luminosity, a first color saturation, a first set of values and/or spatial distribution of values for one or more of the display properties, etc. across the first surface of the user interface object 7200. In some embodiments, the first user interface object 7200 displays changing content (e.g., movie, virtual ocean waves, virtual flames, animations of changing colors and/or other display properties, etc.) while in its default steady state. In some embodiments, the first user interface object 7200 has movements that correspond to the movement of other persons in the physical environment (e.g., as described with respect to FIGS. 7O-7R and FIG. 11) and/or environmental conditions (e.g., wind, heat, etc.) in the physical environment. In some embodiments, the first user interface object 7200 also moves, deforms, or changes its appearance in response to input received from the user 7002 (e.g., gesture inputs, hand movement, etc.) (e.g., inputs such as the movement described with respect to FIGS. 7A-7R, and FIGS. 8, 9, 10, and 11, etc.).

In FIG. 7T, before a change in biometric data corresponding to the user 7002 is detected (e.g., by the device 7500 or other sensors, etc.), the first user interface object 7200 is displayed with the default, steady state appearance, optionally, with a representation 7201 of a virtual optical effect caused by the presence of the first user interface object 7200 in the three-dimensional environment. In some embodiments, the representation 7201 is a simulated shadow displayed at a position that overlays, replaces display of, or blocks the view of a physical surface in the physical environment (e.g., a pass-through view, a camera view, a displayed representation, an actual physical surface seen through the display generation component, etc.). In some embodiments, the user interface object 7200 is displaying changing visual content, such as a movie or a live video, an animation, etc. In some embodiments, when displaying the first user interface object 7200 at a position that corresponds to a location of one or more physical objects or surfaces in the physical environment, the first user interface object 7200 is displayed in placed of (e.g., replacing display of) a portion of the live view (e.g., a portion of the physical environment captured in the live view) of the cameras. In some embodiments, the first user interface object 7200 is projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, the user interface object 7200 is displayed to overlay a portion of the display and blocks the view of at least a portion of the physical environment visible through the transparent or semi-transparent portion of the display generation component. In some embodiments, when displaying the user interface object 7200, the display properties of the user interface object 7200 are optionally altered in accordance with the appearance of the portion of the physical environment that corresponds to a portion of the three-dimensional environment that is behind the user interface object 7200 relative to the viewpoint of the currently displayed view of the three-dimensional environment, to simulate a translucent or semi-transparent appearance of the first user interface object 7200. In some embodiments, when displaying the user interface object 7200, the display properties of the user interface object 7200 is optionally altered in accordance with the appearance of the portion of the physical environment that corresponds to a portion of the three-dimensional environment that surrounds (e.g., is above, is below, is next to, etc.) the user interface object 7200 in the three-dimensional environment, to simulate a reflection, illumination, shadow and/or diffusion, etc., on the first user interface object 7200 caused by the light or light source in the physical environment. In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 modifies the display properties of a portion of the live view (e.g., a portion of the physical environment captured in the live view) of the cameras in the view of the three-dimensional environment. In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 is projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, when displaying the representation 7201 of virtual optional effect (e.g., simulated reflection, shadow, illumination, diffusion, etc.) of the first user interface object 7200 at a position that corresponds to a location of one or more physical objects or surfaces in the physical environment, the representation 7201 is displayed to overlay a portion of the display and modifies the view of at least a portion of the physical environment visible through the transparent or semi-transparent portion of the display generation component.

In some embodiments, a respective set of sensors or devices 7500 (e.g., a biometric tracker, a blood pressure meter, a heart rate monitor, a breathing monitor, etc.) is coupled to the user 7002 and monitors biometric data of the user over a period of time (e.g., periodically, continuously, etc.). In some embodiments, the set of sensors and devices 7500 includes a smart watch, a fitness tracker, a health monitoring device, a wearable device, a camera, etc. that is connected to (e.g., worn by) or pointed at the user 7002. In some embodiments, the computer system receives the biometric data from the sensors and devices 7500 as the biometric data is obtained or generated by the sensors and devices 7500. In some embodiments, the computer system directly monitors the biometric data of user 7002 without an intermediary device. In some embodiments, the biometric data of user 7002 includes a breathing rate, a breathing volume, a heart rate, a blood pressure, a skin temperature, a body temperature (e.g., skin temperature, core temperature), a serum concentration of certain chemical, medication, hormones, etc., brain waves, a focus level, a pupil size, a metabolic rate, a blood sugar level, an amount of movement, a stress level, etc. of the user 7002.

FIGS. 7T-7V illustrate changes in the appearance of the first user interface object 7200 in response to changes in the biometric data and in response to movement of the user 7002, in accordance with some embodiments.

As shown in FIG. 7T, the first user interface object 7200 has a first appearance (e.g., is in an initial steady state). In FIG. 7U, the computer system detects a change in the biometric data of user 7002 (e.g., receives information regarding a change in the biometric data of user 7002 via the device 7500 or other sensors, etc.). In some embodiments, in response to detecting the change in the biometric data of user 7002, the computer system changes (e.g., by translating, rotating, deforming (e.g., bending, twisting, stretching, compressing, warping, etc.) and/or by modifying one or more display properties (e.g., shape, size, opacity, color saturation, luminescence, brightness, etc.), etc.) the appearance of the first user interface object 7200 in accordance with the change in the biometric data of the user 7002. In some embodiments, the extent and/or manner of the change in the appearance of the first user interface object 7200 is determined based on the extent and/or type of the change in the biometric data of the user 7002 (e.g., by the values of the vital statistics of the user, by the type of vital statistics that changed, etc.). For example, the extent and/or type of the change in the biometric data of the user are used to calculate or determine how the appearance of the first user interface object is changed (e.g., the values of the vital statistics of the user and/or the types of vital statistics that are changed are used to determine the type, amount, timing, and/or locations, etc. of the modifications made to the appearance of the first user interface object). In some embodiments, as the appearance of the first user interface object 7200 is changed, the computer system also changes the representation 7201 of the one or more virtual optical effects (e.g., simulated reflection, shadow, illumination, diffusion, etc.) of the first user interface object 7200 in the three-dimensional environment (e.g., by translating, rotating, deforming (e.g., bending, twisting, stretching, compressing, warping, etc.) and/or by modifying one or more display properties (e.g., shape, size, opacity, color saturation, luminescence, brightness, etc.), etc. of the representation 7201). The representation 7201 optionally includes a representation of representations of multiple types of simulated optical effects applied to different portions of the three-dimensional environment, and/or multiple representations or aggregated representations of multiple types of simulated optical effects applied to the same portion of the three-dimensional environment.

In some embodiments, in response to detecting the change in the biometric data of user 7002, the computer system generates an audio output (e.g., a sound effect, an audio alert, a chime, etc.) in accordance with the change in the biometric data of the user. In some embodiments, the audio output is generated in accordance with a determination that the change in biometric data of the user meets preset criteria. For example, in some embodiments, in response to detecting that the user 7002 has fallen asleep (e.g., that breathing rate and heart rate have decreased below preset threshold levels, etc.), the computer system provides an audio output such as a chime or alarm to gently return the user 7002 to the meditative experience (e.g., to awaken the first user or refocus the user's attention on the first user interface object). In some embodiments, in response to detecting that the user 7002 is agitated or anxious (e.g., that breathing rate, blood pressure, and/or heart rate are above preset threshold levels, etc.), the computer system provides an audio output such as soothing sounds or music, or verbal guidance for breathing and meditation, etc., to help the user to calm down.

In some embodiments, in response to detecting movement of another person (e.g., a person who is not a user of the computer system, person 7300 described with respect to FIGS. 7O-7R and FIG. 11, etc.) in the physical environment, the appearance of the first user interface object 7200 is changed in accordance with the movement of the person (e.g., person 7300 or another person, etc.) in the physical environment (e.g., as described above with regards to FIGS. 7O-7R and FIG. 11). In some embodiments, the computer system detects changes in one or more characteristics of the physical environment (e.g., where the one or more characteristics are environmental conditions such as humidity, temperature, wind speed, precipitation, etc.). In some embodiments, in response to detecting the change in one or more characteristics of the physical environment, the computer system changes the appearance of the first user interface object in accordance with the changes in the one or more characteristics of the physical environment. For example, when the wind speed increases in the physical environment, the first user interface object 7200 moves to a greater extent (e.g., flutters to a greater extent in response to the increased wind, moves more randomly or pseudo-randomly in response to the increased wind, etc.).

In some embodiments, the appearance of the first user interface object 7200 is changed in response to user movements, optionally, in aggregation to the changes made due to the changes in the biometric data of the user 7002. For example, in FIG. 7V, the computer system detects movement 7061 of the user 7002 (e.g., a movement of the user's arm, head, limb, any body part, any combination of body parts, and/or the user as a whole in the physical environment). In some embodiments, in response to detecting the first movement of the user 7002, the computer system further changes the appearance of the first user interface object 7200 in accordance with the movement 7061 of the user 7002. For example, one or more characteristics of the movement 7061 of the user 7002 (e.g., the amount, speed, direction, path, etc.) are used to determine the characteristics of the change in the appearance of the first user interface object 7200 (e.g., determines the extent, direction, type, speed, etc. of the movement (e.g., translation, rotation, deformation, etc.) of the first surface of the first user interface object, and/or determines the amount, type, and spatial distribution of the changes in the display properties (e.g., color, translucency, opacity, diffusion coefficient, blur radius, simulated refractive index, optical thickness, luminance, etc.) of the first user interface object 7200, etc.).

In some embodiments, the change in the appearance of the first user interface object 7200 performed in response to changes in the biometric data of the user 7002 is performed prior to the change in appearance of the first user interface object 7200 performed in response to the movement of the user 7002. In some embodiments, the change in the appearance of the first user interface object 7200 performed in response to changes in the biometric data of the user 7002 is performed after the change in appearance of the first user interface object 7200 performed in response to the movement of the user 7002. In some embodiments, the change in the appearance of the first user interface object 7200 performed in response to changes in the biometric data of the user 7002 is performed concurrently with the change in appearance of the first user interface object 7200 performed in response to the movement of the user 7002.

In some embodiments, the computer system detects changes in the biometric data of user 7002 that meet preset criteria (e.g., above or below a biometric threshold (e.g., a threshold such as a predetermined number of breaths per minute, a predetermined heart rate, etc.) (e.g., one or more vital statistics of the user fall below a first biometric threshold, one or more metrics of the biometric data are above preset thresholds, etc.). In some embodiments, in response to detecting changes in the biometric data of the user meets the preset criteria, the computer system transitions (e.g., a continuous and gradual transition, an abrupt transition, etc.) from the first view 7206 of the three-dimensional environment to a different view of the three-dimensional environment (e.g., a view that is displayed with a different level of immersion, a view with less visual prominence of the representation of the physical environment, from an augmented reality view to a virtual reality view, etc. In some embodiments, displaying the different view with reduced visual prominence of the representation of the physical environment includes displaying a modified representation of the physical environment that is dimmer, less saturated, blurred, diffused, etc. or that is visually obscured, blocked, replaced, overlaid, etc. by virtual content and/or visual effects. In some embodiments, the first user interface object 7200 grows more opaque and/or expands in spatial extent to obscure the view of the representation of the physical environment to provide a more immersive virtual environment and/or to shield the user 7002 from the visual stimuli from the physical environment. In some embodiments, with the increasing visual prominence of the virtual content and/or reduced visual prominence of the physical environment, the computer system also activates or increases a level of activate noise cancelation or shielding to block out more of the ambient sound from the surrounding physical environment.

In some embodiments, input gestures used in the various examples and embodiments described herein (e.g., with respect to FIGS. 7A-7V, and FIGS. 8-12) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7V are provided below in references to methods 8000, 9000, 10000, 11000, and 12000 described with respect to FIGS. 8-12 below.

Figure 8:
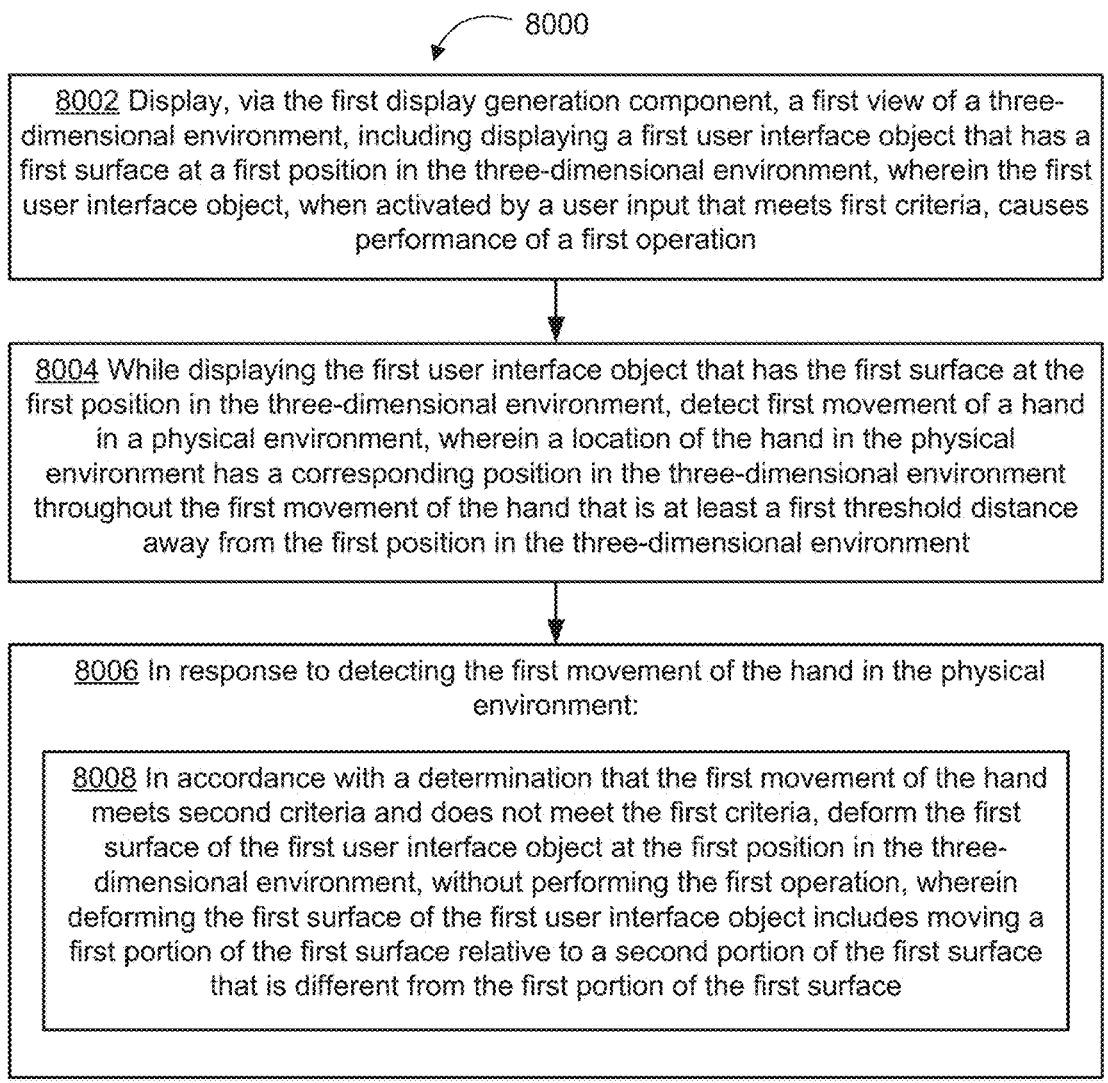
FIG. 8 is a flowchart of a method of altering an appearance of a surface of a user interface object in a three-dimensional environment in response to movement of a user in a physical environment, in accordance with some embodiments.

FIG. 8 is a flowchart of a method 8000 of altering an appearance of a surface of a user interface object in a three-dimensional environment in response to movement of a user in a physical environment, in accordance with some embodiments. Method 8000 relates to altering an appearance of a surface of a user interface object (e.g., by deforming a surface of the user interface object) in response to movement of a user in a physical environment (e.g., at a distance from the user interface object), which provides real-time visual feedback as the user moves in the physical environment (e.g., real-time visual feedback that the user is interacting with the user interface object, real-time visual feedback that an operation (e.g., activating a control, opening an application, etc.) will be performed if the user continues the movement, etc.), thereby providing improved visual feedback to the user. Providing improved feedback enhances the operability of the device, which, additionally, reduces power usage and improves battery life of the device by enabling the user to use the device more quickly and efficiently.

In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing.

The computer system displays (8002), via the first display generation component, a first view (e.g., view 7202 in FIG. 7B, or another view, etc.) of a three-dimensional environment (e.g., a virtual three-dimensional environment without a representation of a physical environment, a mixed reality environment that is a virtual environment that is augmented by sensor data corresponding to the physical environment, an augmented reality environment that includes one or more virtual objects and a representation of at least a portion of a physical environment surrounding the first display generation component (e.g., a camera view or a view through a transparent or semitransparent portion of the first display generation component), etc.), including displaying a first user interface object (e.g., a first user interface object 7046 in FIGS. 7A-7D) (e.g., a representation of an application, a selectable avatar, a selectable menu item, a selectable device controls, a content item, a slider control, a button, a virtual three-dimensional object, a multifunction control object, a control panel that includes multiple controls corresponding to different functions or operations, an information item, a media item, etc.) that has a first surface (e.g., a surface of a button or selection affordance with a first appearance, a surface of a control object, a surface of a virtual screen displaying virtual content, a surface of a user interface, a surface of a virtual three-dimensional object, etc.) at a first position in the three-dimensional environment (e.g., occupying a first spatial portion, surface, or plane, etc. of the three-dimensional environment), where the first user interface object, when activated by a user input that meets first criteria (e.g., activation occurs in response to a determination that preset movement of the user's hand that meets first movement criteria is detected, preset movement of a portion of the user's hand relative to another portion of the user's hand without movement of the hand as a whole relative to the physical environment is detected, etc.), causes performance of a first operation (e.g., selecting the first user interface object, changing a state of the first user interface object, activating a function associated with the first user interface object, changing a value associated with the first user interface object, etc.). In the method 8000, while displaying the first user interface object that has the first surface at the first position in the three-dimensional environment, the computer system detects (8004) first movement of a hand (e.g., movement 7045 in FIG. 7C, movement 7047 in FIG. 7D, etc.) (e.g., the user's hand or hands, another person's hand, etc.) in a physical environment (e.g., where detecting the first movement of the hand includes detection of the hand moving from a first location in the physical environment to a second location in the physical environment (where the first and second locations in the physical environment correspond to respective positions in the three-dimensional environment), and/or detecting movement of a portion of the user's hand relative to another portion of the user's hand (e.g., with or without movement of the hand as a whole relative to the physical environment), etc.), where a location of the hand in the physical environment has a corresponding position in the three-dimensional environment (e.g., occupying a second spatial portion, surface, or plane, etc. of the three-dimensional environment) throughout the first movement of the hand that is at least a first threshold distance (e.g., a non-zero distance, a non-zero distance away from a boundary of the first user interface object, etc.) away from the first position in the three-dimensional environment (e.g., the position of the representation of the hand in the three-dimensional environment is spaced apart from the first surface in the three-dimensional environment throughout the first movement of the hand in the physical environment, the region of virtual space occupied by the representation of the hand in the three-dimensional environment does not overlap with and is separated from the region of virtual space occupied by the first user interface object, etc.). In the method 8000, in response to detecting (8006) the first movement of the hand in the physical environment, and in accordance with a determination that the first movement of the hand meets second criteria (e.g., the second criteria requiring that at least a portion of the first movement of the hand occurs within a respective distance threshold from the first user interface object that is greater than the first threshold distance (e.g., as shown in FIG. 7D), where the second criteria require the first movement of the hand to meet a second preset threshold speed, have a second preset direction, in a second preset hand posture, etc.) and does not meet the first criteria (e.g., requiring a first preset threshold speed, a first preset direction, in a first preset hand posture, a combination of multiple of the above, etc.) (e.g., as shown in FIG. 7D), the computer system deforms (8008) (e.g., in accordance with the first movement of the hand) the first surface of the first user interface object at the first position in the three-dimensional environment (e.g., deforming the first user interface includes reshaping, stretching, warping, bending, and/or shifting one portion relative to another portion, etc. of the first surface), without performing the first operation (e.g., because the first criteria are not met) (and, optionally, without performing any other operation associated with the first user interface object that involves more than deforming the first surface of the first user interface object), where deforming the first surface of the first user interface object includes moving a first portion of the first surface relative to a second portion of the first surface that is different from the first portion of the first surface (optionally while maintaining a connection between the first portion of the first surface and the second portion of the first surface (e.g., by stretching and/or compressing one or more portions of the first surface)). In FIG. 7D, for example, the first surface of the first user interface object 7046 is stretched in accordance with the movement 7047 of the hand 7102, and the first operation corresponding to the first user interface object is not performed. In some embodiments, when the first user interface object is deformed by the first movement of the hand away from the location corresponding to the position of the first user interface object, the position of the first user interface object as a whole does not change in the physical environment (e.g., the first user interface object remains anchored in the three-dimensional environment by one or more portions thereof (e.g., by its edges, by its center, etc.). In some embodiments, in addition to deforming the first user interface object, the computer system, optionally, translates and/or rotates the first user interface object as a whole relative to the physical environment in accordance with the first movement of the hand. In some embodiments, the characteristics and/or type of deformation, translation, and/or rotation, etc. of the first user interface object are selected based on characteristics of the first movement of the hand that meets the second criteria. In some embodiments, the first movement of the hand that meets the second criteria and cause the deformation of the first user interface object does not ultimately meet the first criteria, and does not cause performance of the first operation. In some embodiments, the first movement of the hand that meets the second criteria and cause the deformation of the first user interface object ultimately does meet the first criteria (e.g., when other aspects of the first criteria are met (e.g., when gaze is detected on the first user interface object, when the hand forms the proper posture required by the first criteria, etc.), when the first movement of the hand continues, etc.), and ultimately causes performance of the first operation. In some embodiments, the second criteria can be met by movement of the hand in any posture, such as a relaxed hand, a hand that is not in a required posture to meet the first criteria, etc. In some embodiments, the second criteria require that the hand is in a posture that is required for the first criteria to be met, but the first criteria are not met by the movement of the hand in that posture due to other factors (e.g., factors such as the speed of the movement, gaze, etc.).

In some embodiments, in response to detecting the first movement of the hand in the physical environment and in accordance with a determination that the first criteria are met in accordance with the first movement of the hand (e.g., as shown in FIG. 7C, the movement 7045 of the hand 7102 meets the first criteria) (e.g., the user input that meets the first criteria includes the first movement of the hand that meets first movement criteria requiring a first preset threshold speed, a first preset direction, in a first preset hand posture, a combination of multiple of the above, etc.), and, optional, a gaze, movement of another hand, etc. detected in conjunction with the first movement of the hand), the computer system performs the first operation (e.g., turning on the light 7050A in FIG. 7C) and the computer system deforms the first surface of the first user interface object (e.g., as shown in FIG. 7C, the surface of the first user interface object 7046 is pressed in), where deforming the first surface of the first user interface object includes moving a third portion (e.g., same as the first portion, different from the first portion, etc.) of the first surface relative to a fourth portion (e.g., same as the second portion, different from the second portion, etc.) of the first surface that is different from the third portion of the first surface (optionally while maintaining a connection between the third portion of the first surface and the fourth portion of the first surface (e.g., by stretching and/or compressing one or more portions of the first surface)). In some embodiments, performing the first operation cause the computer system to cease to display the first user interface object, and, optionally, replacing it with another user interface object or other virtual content. In some embodiments, performing the first operation includes maintaining display of the first user interface object with the changed appearance after the deformation. In some embodiments, the deformation of the first user interface object in accordance with the first criteria being met has a greater extent in one or more aspects than the deformation of the first user interface object in accordance with the second criteria being met. In some embodiments, the deformation of the first user interface object in accordance with the first criteria being met has a greater extent in one or more aspects than the deformation of the first user interface object in accordance with the second criteria being met. In some embodiments, the first movement of the hand that meets the second criteria and cause the deformation of the first user interface object does not ultimately meet the first criteria, and does not cause performance of the first operation.

These features are illustrated in FIGS. 7A-7D, for example, where a first view of a three-dimensional environment 7202 is displayed, where the first view of the three-dimensional environment 7202 (FIG. 7B). Movements of a user's hand 7102 in the physical environment 105 (FIGS. 7C and 7D) causes the computer system to change the appearance of a first surface of the first user interface object 7046 (e.g., the surface of the first user interface object 7046 is pressed in, as shown in FIG. 7C) and perform a first operation (e.g., turning on the light 7050A, as shown in FIG. 7C) when the movement of the hand 7102 meets preset criteria; and the movement of the hand 7102 causes the computer system to change the appearance of the first surface of the first user interface object 7046 (e.g., the surface of the first user interface object 7046 is deformed, as shown in FIG. 7D) when the movement of the hand does not meet the preset criteria. Performing the first operation and deforming the first surface, including moving a third portion of the first surface relative to a fourth portion of the first surface that is different from the third portion of the first surface, provides real-time visual feedback to the user (e.g., real-time visual feedback that the movement of the user's hand meets first criteria and/or that the first operation has been performed), thereby providing improved visual feedback to the user.

In some embodiments, deforming (e.g., in accordance with the first movement of the hand) the first surface of the first user interface object at the first position in the three-dimensional environment includes: in accordance with a determination that the second criteria are met in accordance with the first movement of the hand, moving the first portion of the first surface by a first amount (e.g., a first distance, a first amount of stretch, a first amount of rotation, a first amount of compression, etc.) relative to the second portion of the first surface in the three-dimensional environment; and in accordance with a determination that the first criteria are met in accordance with the first movement of the hand, moving the third portion of the first surface by a second amount (e.g., a second distance, a second amount of stretch, a second amount of rotation, a second amount of compression, etc.) relative to the fourth portion of the first surface in the three-dimensional environment, where the second amount is greater than the first amount. For example, in FIG. 7D, the amount of deformation that is applied is determined in accordance with a movement characteristics of the movement 7047. Moving the first surface, in accordance with the first movement of the hand, by a first amount relative to the second portion of the first surface, in accordance with a determination that the second criteria are met, and moving the first surface in accordance with the first movement of the hand, by a second amount relative to the fourth portion of the first surface, in accordance with a determination that the first criteria are met, provides real-time visual feedback as the user's hand moves (e.g., real-time visual feedback regarding whether the movement of the user's hand meets or does not meet first criteria), thereby providing improved visual feedback to the user.

In some embodiments, deforming the first surface of the first user interface object (e.g., in accordance with the first criteria being met, or in accordance with the second criteria being met, etc.) does not include translating the first user interface object as a whole from the first position to a second position in the three-dimensional environment (e.g., a center of mass (and/or a boundary) of the first user interface object remains in a fixed or substantially fixed position). As shown in FIGS. 7C and 7D, the characteristic position of first user interface object 7046 is not changed when the first user interface object is deformed. the In some embodiments, when the first user interface object is deformed by the first movement of the hand away from the location corresponding to the position of the first user interface object, the position of the first user interface object as a whole does not change in the physical environment (e.g., the first user interface object remains anchored in the three-dimensional environment by one or more portions thereof (e.g., by its edges, by its center, etc.) while other portions are moved, stretched, and/or compressed relative to the portions that are anchored. Deforming the first surface of the first user interface object without translating the first user interface object as a whole from the first position to a second position in the three-dimensional environment, provides real-time visual feedback as the user's hand moves (e.g., real-time visual feedback that continuing the movement of the user's hand will cause performance of an operation, such as activating a function associated with the first user interface, rather than moving the first user interface object in the three-dimensional environment), thereby providing improved visual feedback to the user.

In some embodiments, deforming the first surface of the first user interface object (e.g., in accordance with the first criteria being met, or in accordance with the second criteria being met, etc.) does not include moving at least a portion of the first user interface object from an original position of the portion of the first user interface object in response to the first movement of the hand to a location in the physical environment that corresponds to the original position of the portion of the first user interface object. For example, in FIGS. 7C-7D, the position that corresponds to the location of the hand 7102 is away from the position of the first user interface object 7046. For example, the representation of the hand in the three-dimensional environment does not reach or overlap with the original virtual region occupied the first user interface object in the three-dimensional environment during the first movement of the hand that meets the second criteria (and, optionally, during the first movement of the hand that meets the first criteria), so the first user interface object does not move away from the representation of the hand, and is broken up or poked through by the representation of the hand in the three-dimensional environment. In some embodiments, the virtual position of the representation of the hand remains at least the first threshold distance from the first surface of the first user interface object throughout the first movement of the hand that meets the second criteria (and optionally, the first criteria). Deforming the first surface of the first user interface object without moving at least a portion of the first user interface object from an original position of the portion of the first user interface object, in response to first movement of the hand to a location in the physical environment that corresponds to the original position of the portion of the first user interface object, provides real-time visual feedback as the user's hand moves (e.g., real-time visual feedback that the user is interacting with the first user interface object without the user's hand poking through the first user interface object), thereby providing improved visual feedback to the user.

In some embodiments, the computer system detects second movement of the hand in the physical environment that meets the second criteria (e.g., where detecting the second movement of the hand includes detection of the hand moving from a third location in the physical environment to a fourth location in the physical environment (where the third and fourth locations in the physical environment correspond to respective positions in the three-dimensional environment), and/or detecting movement of a portion of the user's hand relative to another portion of the user's hand (e.g., with or without movement of the hand as a whole relative to the physical environment), etc.), where a location of the hand in the physical environment has a corresponding position in the three-dimensional environment throughout the second movement of the hand that is at least the first threshold distance away from the first position in the three-dimensional environment, where the first movement of the hand is executed in a first region of the physical environment, and the second movement of the hand is executed in a second region of the physical environment that is separate from the first region of the physical environment (e.g., the first region and the second region have corresponding virtual positions that are at different distances from the first user interface object, and/or in different directions relative to the first user interface object, etc.). In response to detecting the second movement of the hand in the physical environment and in accordance with a determination that the second movement of the hand meets the second criteria and does not meet the first criteria, the computer system deforms the first surface of the first user interface object at the first position in the three-dimensional environment (e.g., deforming the first user interface includes reshaping, stretching, warping, bending, and/or shifting one portion relative to another portion, etc. of the first surface), without performing the first operation, where: deforming the first surface of the first user interface object in response to detecting the first movement of the hand includes deforming the first surface by an amount that is independent of a respective location of the first region of the physical environment (e.g., by a respective amount that is based on characteristics of the first movement (e.g., speed, magnitude, orientation, posture, etc.) that are different the location of the hand as a whole); and deforming the first surface of the first user interface object in response to detecting the second movement of the hand includes deforming the first surface by an amount (e.g., by a respective amount that is based on characteristics of the second movement (e.g., speed, magnitude, orientation, posture, etc.) that are different the location of the hand as a whole) that is independent of a respective location of the second region of the physical environment. Deforming the first surface of the first user interface object by an amount that is independent of a respective location of the first region of the physical environment, in response to detecting the first movement of the hand, and deforming the first surface of the first user interface object by an amount that is independent of a respective location of the second region of the physical environment, in response to detecting the second movement of the hand, provides consistent real-time feedback as the user's hand moves (e.g., consistent feedback regardless of whether the user's hand is moved close to, or far away from, the first user interface object), thereby providing improved visual feedback to the user.

In some embodiments, while deforming the first user interface object in response to detecting the first movement of the hand and in accordance with a determination that the first movement of the hand met the second criteria, the computer system detects that the first criteria are met (e.g., the first criteria are met in accordance with the continuation of the first movement, and/or detecting that other conditions in the first criteria are met in accordance with the first movement of the hand (e.g., movement path, movement direction, movement speed, etc.) and/or other accompanying inputs (e.g., gaze, hand posture, movement of another hand, etc.)), and in response to detecting that the first criteria are met, the computer system performs the first operation. For example, the movement 7045 of the hand 7102 causes real or virtual light 7050A to be turned on, in FIG. 7C. Performing the first operation in response to detecting that the first criteria are met, while deforming the first user interface object in response to detecting the first movement of the hand, provides real-time visual feedback to the user (e.g., real-time visual feedback that the first operation will be performed if the movement of the user's hand meets first criteria (e.g., by continuing the movement of the user's hand)), thereby providing improved visual feedback to the user.

In some embodiments, performing the first operation includes performing a first action associated with the first user interface object (e.g., displaying one or more projections of light, outputting a sound (e.g., from the first user interface object)) in the three-dimensional environment, where the first action causes one or more changes in the three-dimensional environment that is external to the first user interface object (e.g., causing display of additional virtual content or objects that were not displayed in the three-dimensional environment prior to the performance of the first action, causing changes to other user interface objects or virtual content that is separate and distinct from the first user interface object, causing a change in a control value, a state, a parameter value, etc., of a computer-generated experience, an output mode, a function, etc. to change in the three-dimensional environment, etc.). For example, the movement 7045 of the hand 7102 causes real or virtual light 7050A to be turned on, in FIG. 7C. Performing the first operation, including causing one or more changes in the three-dimensional environment external to the first user interface object, performs an operation (e.g., changes the three-dimensional environment) when a set of conditions has been met (e.g., first criteria are met) without requiring further user input.

In some embodiments deforming the first surface of the first user interface object (e.g., in accordance with the first criteria being met or the second criteria being met) includes moving the first portion of the first surface relative to the second portion of the first surface in a respective manner (e.g., with a corresponding magnitude, direction, movement speed, movement type, etc.) that is selected based on a characteristic movement speed of the hand (e.g., speed of movement (e.g., rotation, translation, etc.) of the hand as a whole in the physical environment, speed of movement (e.g., rotation, translation, etc.) of one portion of the hand relative to another portion of the hand (e.g., thumb relative to the side of the index finger, index finger relative to knuckle connecting the index finger to palm, etc.)) in the physical environment. This is illustrated in FIGS. 7E-7J, where a slow movement 7051 causes the first user interface object 7046 to deform in one manner, and a fast movement 7049 causes the first user interface object 7046 to deform in a different way. In some embodiments, the characteristics of the deformation are quantitatively correlated to the movement speed of the hand during the first movement of the hand. For example, in some embodiments, the magnitude of deformation (e.g., as reflected in the relative internal movement distance, amount of stretch, amount of compression, amount of twisting, bending, etc.) increases when a greater movement speed (or alternatively, a less movement speed) of the hand is detected. In some embodiments, the characteristics of the deformation are qualitatively correlated to the movement speed of the hand during the first movement of the hand. For example, in some embodiments, a first type of deformation (e.g., bending slightly with a curved surface, showing a rippling movement on the first surface, compressing in a first direction, etc.) is executed in accordance with a determination that the movement speed of the hand is below a first threshold speed, and a second type of deformation (e.g., bending with a discontinuity on the surface, showing random and chaotic movement on the first surface, expanding in a second direction, etc.) is executed in accordance with a determination that the movement speed of the hand is above the first threshold speed. Deforming the first surface of the first user interface object, including moving the first portion of the first surface relative to the second portion of the first surface in a respective manner that is selected based on a characteristic movement speed of the hand in the physical environment provides real-time visual feedback as the user's hand moves (e.g., real-time visual feedback regarding the speed of the user's hand movement), thereby providing improved visual feedback to the user.

In some embodiments, deforming the first surface of the first user interface object (e.g., in accordance with the first criteria being met or the second criteria being met) includes moving the first portion of the first surface relative to the second portion of the first surface in a respective manner (e.g., with a corresponding magnitude, direction, movement speed, movement type, etc.) that is selected based on a characteristic movement direction (e.g., direction of movement (e.g., rotation, translation, etc.) of the hand as a whole in the physical environment, direction of movement (e.g., rotation, translation, etc.) of one portion of the hand relative to another portion of the hand (e.g., thumb relative to the side of the index finger, index finger relative to knuckle connecting the index finger to palm, etc.)) of the hand (e.g., movement direction in the physical environment that corresponds to a movement away from the first user interface object, toward the first user interface object, upward, downward, leftward, rightward, clockwise, counterclockwise, etc., relative to the first user interface object, etc.) in the physical environment. For example, in FIGS. 7G-7J, the indication 7048 optionally have a different orientation in accordance with the movement direction of the movement 7051. In some embodiments, the first portion of the first user interface object moves in a direction relative to the second portion of the first user interface object that is selected in accordance with a characteristic movement direction of the hand in the physical environment during the first movement of the hand. For example, in some embodiments, the portion of the first user interface object in the movement direction of the representation of the hand moves relative to other portions of the first user interface object in a respective direction to retreat from the approaching representation of the hand, or in a respective direction to meet the approaching representation of the hand, etc. In some embodiments, the characteristics of the deformation are quantitatively correlated to the movement direction of the hand during the first movement of the hand. For example, in some embodiments, the magnitude of deformation (e.g., as reflected in the relative internal movement distance, amount of stretch, amount of compression, amount of twisting, bending, etc.) increases when the movement direction of the hand corresponds to a movement that is better aligned with (e.g., with a decreasing angle from, with a smaller distance from, etc.) a direction toward a preset portion of the first user interface object (e.g., center of the first user interface object, an upper portion of the first user interface object, etc.). In some embodiments, the characteristics of the deformation are qualitatively correlated to the movement direction of the hand during the first movement of the hand. For example, in some embodiments, a first type of deformation (e.g., bending slightly with a curved surface, showing a rippling movement on the first surface, compressing in a first direction, etc.) is executed in accordance with a determination that the movement direction of the hand is a first preset direction (e.g., in the horizontal direction relative to the first user interface object, in a direction that is a first direction relative to a preset portion of the hand, etc.), and a second type of deformation (e.g., bending with a discontinuity on the surface, showing random or pseudorandom and chaotic or pseudochaotic movement on the first surface, expanding in a second direction, etc.) is executed in accordance with a determination that the movement direction of the hand is a second preset direction (e.g., in the vertical direction relative to the first user interface object, in a direction that is a second direction relative to the preset portion of the hand, etc.) different from the first preset direction. Deforming the first surface of the first user interface object, including moving the first portion of the first surface relative to the second portion of the first surface in a respective manner that is selected based on a characteristic movement direction of the hand in the physical environment, provides real-time visual feedback as the user's hand moves (e.g., real-time visual feedback regarding the movement direction of the user's hand), thereby providing improved visual feedback to the user.

In some embodiments, deforming the first surface of the first user interface object (e.g., in accordance with the first criteria being met or the second criteria being met) includes moving the first portion of the first surface relative to the second portion of the first surface in a respective manner (e.g., with a corresponding magnitude, direction, movement speed, movement type, etc.) that is selected based on a characteristic movement amount of the hand (e.g., magnitude of movement (e.g., rotation, translation, etc.) of the hand as a whole in the physical environment, magnitude of movement (e.g., rotation, translation, etc.) of one portion of the hand relative to another portion of the hand (e.g., thumb relative to the side of the index finger, index finger relative to knuckle connecting the index finger to palm, etc.)) in the physical environment. In some embodiments, as shown in FIGS. 7G-7J, the indication 7048 has a respective position or size depending on the movement amount of the movement 7051. In some embodiments, the characteristics of the deformation are quantitatively correlated to the characteristic movement amount of the hand during the first movement of the hand. For example, in some embodiments, the magnitude of deformation (e.g., as reflected in the relative internal movement distance, amount of stretch, amount of compression, amount of twisting, bending, etc.) increases when a greater movement amount (or alternatively, a less movement speed) of the hand is detected. In some embodiments, the characteristics of the deformation are qualitatively correlated to the characteristic movement amount of the hand during the first movement of the hand. For example, in some embodiments, a first type of deformation (e.g., bending slightly with a curved surface, showing a rippling movement on the first surface, compressing in a first direction, etc.) is executed in accordance with a determination that the characteristic movement amount of the hand is below a first threshold amount, and a second type of deformation (e.g., bending with a discontinuity on the surface, showing random and chaotic movement on the first surface, expanding in a second direction, etc.) is executed in accordance with a determination that the characteristic movement amount of the hand is above the first threshold amount. Deforming the first surface of the first user interface object, including moving the first portion of the first surface relative to the second portion of the first surface in a respective manner that is selected based on a characteristic movement amount of the hand in the physical environment, provides real-time visual feedback as the user's hand moves (e.g., real-time visual feedback regarding the amount of movement of the user's hand), thereby providing improved visual feedback to the user.

In some embodiments, while displaying the first surface of the first user interface object in a deformed state (e.g., in accordance with the first movement of the hand having met the second criteria, and, optionally, the first criteria), the computer system detects cessation of the first movement of the hand in the physical environment, and in response to detecting the cessation of the first movement of the hand in the physical environment, the computer system restores the first surface of the first user interface object at the first position in the three-dimensional environment, including displaying oscillating movement of the first portion and the second portion of the first surface of the first user interface object over a period of time (e.g., with damped, reducing movement magnitudes over the period of time). In some embodiments, a rippling visual effect is shown on the first surface during the period of time that the deformation of the first surface gradually fades out across the first surface. In some embodiments, the deformation of the first surface of the first user interface object is restored with the rippling visual effect after the first user interface object having been activated by an input that meets the first criteria. In some embodiments, the deformation of the first surface of the first user interface object is restored without the rippling visual effect if the first user interface object has not been activated by an input that meets the first criteria. In some embodiments, the deformation of the first surface of the first user interface object is restored without the first user interface object having been activated by an input that meets the first criteria. In some embodiments, while displaying the oscillating movement of the first portion and the second portion of the first surface of the first user interface object (e.g., before the first surface is restored (or fully restored) to the state before the deformation had occurred), the computer system detects third movement of the hand that meets the second criteria without meeting the first criteria, and in response to the third movement of the hand that meets the second criteria without meeting the first criteria, the computer system deforms the first surface of the first user interface object in accordance with the third movement of the hand (e.g., the characteristics of the deformation is based on the various characteristics of the third movement of the hand in the same manner as for the first movement of the hand). Restoring the first surface of the first user interface object at the first position in the three-dimensional environment, including displaying oscillating movement of the first portion and the second portion of the first surface of the first user interface object over a period of time, in response to detecting the cessation of the first movement of the hand in the physical environment, provides real-time visual feedback to the user as the movement of the user's hand ceases (e.g., real-time visual feedback that the user's hand was in motion, but that motion has ceased), thereby providing improved visual feedback to the user.

In some embodiments, the second criteria (and/or the first criteria) include a first movement criterion that is met when the first movement of the hand includes movement (e.g., rotation, rotation in a direction away from the palm side, rotation in a direction toward the palm side, sideways movement, leftward movement, rightward movement, upward movement, downward movement, etc.) of a first finger (e.g., a pointing finger, a middle finger, a ring finger, a thumb, or a portion thereof, etc.) relative to a portion of the hand connected to the first finger (e.g., a knuckle, a first phalange, a second phalange, metacarpal, carpal, palm, etc.). Deforming the first surface of the first user interface object in accordance with a determination that the first movement of the hand meets second criteria and does not meet first criteria, wherein the second criteria include a first movement criterion that is met when the first movement of the hand includes movement of a first finger relative to a portion of the hand connected to the first finger, provides additional control options (e.g., based on movement of a finger of the user's hand) without cluttering the UI with additional displayed controls.

In some embodiments, deforming the first surface of the first user interface object (e.g., in accordance with the first criteria being met or the second criteria being met) includes moving the first portion of the first surface relative to the second portion and a fifth portion of the first surface in a respective direction (e.g., bending the first surface to create a curve, bend, kink, angle, buckle, fold, etc. in the first surface at the location of the first portion of the first surface), where the second portion and the fifth portion of the first surface are connected to different sides of the first portion of the first surface. In some embodiments, the peripheral regions of the first surface experience less movement (e.g., are anchored, appear more stiff and resistant to deformation, etc.) than the central portion of the first surface in response to the movement of the hand that meets the second criteria. In some embodiments, a respective peripheral region of the first surface is deformed in response to the deformation of the first surface of the first user interface object, where deforming the respective peripheral region includes bending the respective peripheral region to create a curve, bend, kink, angle, buckle, fold, bulge, etc. in the respective peripheral region (e.g., as one surface of the first user interface object bends is deformed to a first extent, another respective peripheral region is deformed to a second extent, where the second extent is the inverse or substantially the inverse of the first extent). In some embodiments, the deformation of the first surface simulates how a flexible surface filled with a fluid (e.g., gas, water, a viscous fluid, etc.) would react to touch (e.g., pushing on one portion of the surface might cause another portion to pop out or shift, etc.), even though position that corresponds to the location of the user's hand is separated from the position of the first surface. Deforming the first surface of the first user interface object, including moving the first portion of the first surface relative to the second portion and a fifth portion of the first surface in a respective direction, wherein the second portion and the fifth portion of the first surface are connected to different sides of the first portion of the first surface, provides real-time visual feedback to the user (e.g., real-time visual feedback regarding the movement of the user's hand and/or finger(s)), thereby providing improved visual feedback to the user.

In some embodiments, the second criteria (and/or the first criteria) include a second movement criterion that is met when the first movement of the hand includes movement of a first finger in the physical environment in a first direction. In some embodiments, the movement criterion is met when the first movement of the hand includes movement of a first finger upward, downward, leftward, rightward, etc., in the physical environment. In some embodiments, the movement of the first finger is substantially vertical (e.g., up and down), substantially horizontal (e.g., left and right), etc., and the distance between first user interface object and the position of the hand (and the position of the first finger) is maintained during the first movement of the hand (and the first finger). Deforming the first surface of the first user interface object in accordance with a determination that the first movement of the hand meets second criteria and does not meet first criteria, wherein the second criteria include a second movement criterion that is met when the first movement of the hand includes movement of a first finger in the physical environment in a first direction, provides additional control options (e.g., based on specific movement of a finger of the user's hand) without cluttering the UI with additional displayed controls.

In some embodiments, deforming the first surface of the first user interface object (e.g., in accordance with the first criteria being met or the second criteria being met) includes moving the first portion of the first surface relative to the second portion of the first surface in a respective direction corresponding to a characteristics movement direction of the first movement of the hand, while maintaining a connection between the first portion of the first surface and the second portion of the first surface (e.g., while stretching and/or compressing one or more additional portions of the first surface are positioned between the first and second portions on the first surface of the first user interface object). In some embodiments, the central region of the first surface experience less movement (e.g., is anchored, appears more stiff and resistant to deformation, etc.) than the peripheral portions of the first surface in response to the movement of the hand that meets the second criteria. Deforming the first surface of the first user interface object, including moving the first portion of the first surface relative to the second portion of the first surface in a respective direction corresponding to a characteristics movement direction of the first movement of the hand, while maintaining a connection between the first portion of the first surface and the second portion of the first surface, provides real-time visual feedback as the user's hand moves, thereby providing improved visual feedback to the user.

In some embodiments, deforming the first surface of the first user interface object (e.g., in accordance with the first criteria being met or the second criteria being met) includes displaying oscillating movement of the first portion and the second portion of the first surface of the first user interface object during the first movement of the hand. In some embodiments, the oscillating movement of the first portion and the second portion of the first surface simulates a virtual rippling effect that propagates across the first surface from an origin on the first surface that is selected in accordance with the location of the user's finger or hand that is moving in the physical environment, to other surrounding portions of the first surface. In some embodiments, the propagation direction of the oscillating movement across the first surface is selected based on the characteristic movement direction of the user's finger or hand. In some embodiments, the rippling visual effect is shown after the first user interface object having been activated by an input that meets the first criteria. In some embodiments, the rippling visual effect is not shown if the first user interface object has not been activated by an input that meets the first criteria. Deforming the first surface of the first user interface object, including displaying oscillating movement of the first portion and the second portion of the first surface of the first user interface object during the first movement of the hand, provides real-time visual feedback as the user's hand moves, thereby providing improved visual feedback to the user.

In some embodiments, the second criteria (and/or the first criteria) include a third movement criterion that is met when the first movement of the hand includes movement of a first finger (e.g. an index finger of the hand 7102 in FIG. 7C, or 7E) in the physical environment with at least a first threshold speed (e.g., a threshold speed in a preset direction (e.g., upward, downward, leftward, rightward, etc.) in the physical environment). In some embodiments, the computer system displays the oscillating movement of the first portion and the second portion of the first surface of the first user interface object in response to detecting that the characteristic movement speed of the first finger exceeds the first threshold speed in the preset direction during the first movement of the hand. Deforming the first surface of the first user interface object in accordance with a determination that the first movement of the hand meets second criteria and does not meet first criteria, wherein the second criteria include a third movement criterion that is met when the first movement of the hand includes movement of a first finger provides additional control options (e.g., based on specific movement of a finger of the user's hand) without cluttering the UI with additional displayed controls.

In some embodiments, deforming the first surface of the first user interface object (e.g., during different portions of the first movement of the hand) (e.g., in accordance with a determination that the second criteria are met, in accordance with a determination that the first criteria are met, etc.) includes: in accordance with a determination that the first movement of the hand includes movement of a first finger into a preset position (e.g., raised, extended out, etc.) relative to a portion of the hand connected to the first finger, moving the first portion of the first surface relative to the second portion and a sixth portion of the first surface in a respective direction (e.g., bending the first surface to create a curve, bend, kink, angle, buckle, fold, etc. in the first surface at the location of the first portion of the first surface), where the second portion and the sixth portion of the first surface are connected to different sides of the first portion of the first surface; and in accordance with a determination that the first movement of the hand includes movement of the first finger in a respective direction, moving the first portion of the first surface relative to the second portion of the first surface in a respective direction corresponding to a characteristics movement direction of the first movement of the hand, while maintaining a connection between the first portion of the first surface and the second portion of the first surface; and in accordance with a determination that the first movement of the hand includes movement of the first finger with a characteristic movement speed that is greater than a threshold speed, displaying oscillating movement of the first portion and the second portion of the first surface of the first user interface object. For example, in some embodiments, the first user interface object flexes in response to the user raising the hand or first finger, without additional movement of the hand or first finger. For example, before the movement 7045, the movement 7049, and movement 7051 in FIGS. 7C, 7E, and 7G are started, the first surface of the first user interface objects 7046 becomes tout or flexes slightly in response to the user 7002 raising a first finger in the air (e.g., before the flick, or swipe movement of the first finger is started or underway). In some embodiments, deforming the first surface of the first user interface object includes, in accordance with a determination that the first movement of the hand includes movement of the first finger in a respective direction, moving the first portion of the first surface relative to the second portion of the first surface in a respective direction corresponding to a characteristics movement direction of the first movement of the hand, while maintaining a connection between the first portion of the first surface and the second portion of the first surface. For example, in some embodiments, the first user interface object is distorted in a manner (e.g., in a direction, with a magnitude, etc.) that is based on the direction of the movement of the user's hand or first finger, when the movement of the user's hand or first finger is below a threshold speed in the direction of movement. In some embodiments, the computer system performs the first operation in accordance with a determination that more than a threshold amount of movement of the hand or first finger in the respective direction is detected, and performs the first operation with a magnitude that corresponds to the magnitude of the movement of the user's hand or first finger (e.g., adjust a control value, move a slider control, etc. by an amount that is dynamically adjusted based on the magnitude of the movement of the hand or first finer). In some embodiments, deforming the first surface of the first user interface object includes, in accordance with a determination that the first movement of the hand includes movement of the first finger with a characteristic movement speed that is greater than a threshold speed, displaying oscillating movement of the first portion and the second portion of the first surface of the first user interface object (e.g., at the time that the first movement of the hand meets the threshold speed (e.g., which, optionally, continues for a period of time after the cessation of the first movement of the hand)). In some embodiments, the computer system performs a discrete operation (e.g., switching from a first state to a second state, opening or exiting a computer-generated experience, launching a user interface, etc.) in accordance with a determination that the characteristic movement speed of the hand or first finger has exceeded the threshold speed in the respective direction. Moving the first portion of the first surface relative to the second portion and a third portion of the first surface in a respective direction, in accordance with a determination that the first movement of the hand includes movement of a first finger into a preset position relative to a portion of the hand connected to the first finger, moving the first portion of the first surface relative to the second portion of the first surface in a respective direction corresponding to a characteristics movement direction of the first movement of the hand, in accordance with a determination that the first movement of the hand includes movement of the first finger in a respective direction, and displaying oscillating movement of the first portion and the second portion of the first surface of the first user interface object, in accordance with a determination that the first movement of the hand includes movement of the first finger with a characteristic movement speed that is greater than a threshold speed, provides real-time visual feedback regarding the type of detected movement of the user's hand, thereby providing improved visual feedback to the user.

In some embodiments, in response to detecting the first movement of the hand in the physical environment and in accordance with a determination that the first movement of the hand includes movement of the hand (e.g., the first finger, a preset portion of the hand, the hand as a whole, etc.) in a respective direction and the first movement of the hand meets the first criteria (e.g., exceeds a threshold amount of movement, is in a preset movement direction, has the required hand posture, and/or is detected with the gaze input directed to the first user interface object, etc.), the computer system performs an operation associated with the first user interface object with a magnitude that is selected in accordance with an amount of the movement of the hand in the respective direction. For example, in FIGS. 7C, and 7E-7F, the magnitude of the movement 7045 and movement 7049 determines the light intensity of the real or virtual light 7050 that is turned on, when the movement direction is a flick in the upward direction or a direction away from the palm of the hand 7102. In some embodiments, performing the operation associated with the first user interface object with a magnitude that is selected in accordance with the amount of movement of the hand in the respective direction includes dynamically changing corresponding value associated with the first user interface object in accordance with the magnitude of the movement of the hand in the respective direction. In some embodiments, performing the operation associated with the first user interface object includes adjusting a control value (e.g., display brightness, audio volume, an output level, etc.), adjusting a configuration parameter associated with a user interface or object (e.g., zoom level, progress level, etc.) associated with the first user interface object, etc. In some embodiments, the performance of the first operation is accompanied by moving the first portion of the first surface relative to the second portion of the first surface in a respective direction corresponding to a characteristics movement direction of the first movement of the hand, while maintaining a connection between the first portion of the first surface and the second portion of the first surface. In some embodiments, the direction of movement of the hand or first finger is reversible, and the computer system reverse the changes made in the three-dimensional environment that has been performed, in response to a reversal of the movement direction of the hand or first finger. Performing an operation associated with the first user interface object with a magnitude that is selected in accordance with an amount of the movement of the hand in the respective direction provides real-time visual feedback as the user's hand moves (e.g., regarding the amount of movement of the user's hand), thereby providing improved visual feedback to the user.

In some embodiments, in response to detecting the first movement of the hand in the physical environment and in accordance with a determination that the first movement of the hand includes movement of the hand (e.g., the first finger, a preset portion of the hand, the hand as a whole, etc.) with a characteristic movement speed (e.g., an average speed, a maximum speed, and/or a peak speed with some low pass filtering to remove sudden changes in speed) greater than a respective threshold speed and the first movement of the hand meets the first criteria (e.g., exceeds a threshold amount of movement, is in a preset movement direction, has the required hand posture, and/or is detected with the gaze input directed to the first user interface object, etc.), the computer system performs a discrete operation associated with the first user interface object. For example, as shown in FIGS. 7E-7F, when the movement speed of the hand 7049 (e.g., movement speed of a first set of fingers relative to another part of the hand connected to the fingers) is greater than a threshold speed, the computer system performs a discrete operation that turns on all three lights 7050 at the same time, in accordance with some embodiments. In some embodiments, performing the discrete operation associated with the first user interface object includes discretely changing a state of a control between multiple discrete states (on/off, maximum/medium/minimum states, etc.), adjusting a configuration parameter associated with a user interface or object to the next discrete value associated with the first user interface object, etc. In some embodiments, the performance of the discrete operation is accompanied by a discrete change in the appearance of the first surface or first user interface object (e.g., a complete change in color, shape, orientation, internal structure, etc.). Performing a discrete operation associated with the first user interface object, in response to detecting the first movement of the hand in the physical environment and in accordance with a determination that the first movement of the hand includes movement of the hand with a characteristic movement speed greater than a respective threshold speed and the first movement of the hand meets the first criteria, provides additional control options (e.g., for performing discrete operations, based on one or more thresholds) without cluttering the UI with additional displayed controls.

In some embodiments, displaying the first user interface object with the first surface in the first view of the three-dimensional environment includes displaying the first surface of the first user interface object with respective values for a first set of display properties of the first surface adjusted in a first manner (e.g., based on a first transparency level, and first simulated shape and refractive properties (e.g., color, simulated refractive index, simulated thickness and shape, etc.) of the first surface, etc.) based on an appearance of a first portion of the three-dimensional environment that is behind the first surface relative to a viewpoint of the first view of the three-dimensional environment, and deforming the first surface of the first user interface object (e.g., in accordance with the second criteria are met, in accordance with the first criteria are met, etc.) at the first position in the three-dimensional environment includes displaying the first surface of the first user interface object with respective values for the first set of display properties of the first surface adjusted in a second manner (e.g., based on a second transparency level, and second simulated shape and refractive properties (e.g., color, simulated refractive index, simulated thickness and shape, etc.) of the first surface, etc. as a result of the deformation of the first surface) based on the appearance of the first portion of the three-dimensional environment that is behind the first surface relative to the viewpoint of the first view of the three-dimensional environment, where the second manner is different from the first manner, and the second manner is based on the deformation of the first surface executed in response to the movement of the hand. In some embodiments, the first user interface object is translucent, and allows the shapes and colors of objects and content behind the first user interface object to be visible through the first surface of the first user interface object. When the first surface of the first user interface object is deformed (e.g., changes shape, spatial extent, compressed, stretched, etc.) due to the movement of the hand, the computer system simulates a corresponding change in the optical property (e.g., refractive properties, transparency level, shape, thickness, optical density, etc. of various parts of the first surface) of the first surface by changing the way that the shapes and colors of objects and content behind the first user interface object appears through the deformed first surface of the first user interface object. Displaying the first surface of the first user interface object with respective values for a first set of display properties of the first surface adjusted in a first manner based on an appearance of a first portion of the three-dimensional environment that is behind the first surface relative to a viewpoint of the first view of the three-dimensional environment, and deforming the first surface of the first user interface object at the first position in the three-dimensional environment, including displaying the first surface of the first user interface object with respective values for the first set of display properties of the first surface adjusted in a second manner based on the appearance of the first portion of the three-dimensional environment that is behind the first surface relative to the viewpoint of the first view of the three-dimensional environment, provides real-time visual feedback as the first user interface object is deformed (e.g., regarding the relative location of the first user interface object in the three-dimensional environment and regarding the portions of the three-dimensional environment behind the first surface of the first user interface object), thereby providing improved visual feedback to the user.

In some embodiments, the computer system detects third movement of the hand in the physical environment that meets the second criteria (and/or the first criteria) (e.g., where detecting the third movement of the hand includes detection of the hand moving from a fifth location in the physical environment to a sixth location in the physical environment (where the fifth and sixth locations in the physical environment correspond to respective positions in the three-dimensional environment), and/or detecting movement of a portion of the user's hand relative to another portion of the user's hand (e.g., with or without movement of the hand as a whole relative to the physical environment), etc.), where a location of the hand in the physical environment has a corresponding position in the three-dimensional environment that is less than the first threshold distance away from the first position in the three-dimensional environment. In response to detecting the third movement of the hand in the physical environment and in accordance with a determination that the third movement of the hand meets the second criteria and does not meet the first criteria, the computer system deforms the first surface of the first user interface object at the first position in the three-dimensional environment (e.g., deforming the first user interface includes reshaping, stretching, warping, bending, and/or shifting one portion relative to another portion, etc. of the first surface), without performing the first operation. For example, as shown in FIG. 7D, the movement 7047 does not meet the first criteria, the computer system deforms the first surface of the first user interface object 7046 without turning on the light 7050A, in accordance with some embodiments. In some embodiments, in response to detecting the third movement of the hand in the physical environment, in accordance with a determination that the first criteria are met, the computer system performs the first operation. In some embodiments, deforming the first surface of the first user interface object in response to detecting the third movement of the hand includes deforming the first surface by an amount that is independent of a respective location of the user's hand. In some embodiments, the corresponding position of the hand in the three-dimensional environment during the third movement of the hand overlaps with the first position of the first user interface object. In other words, the user interface object reacts to the user's hand movement from a location that is far away from the location corresponding to the position of the user interface object, and from a location that is at or near the location corresponding to the position of the user interface object. Deforming the first surface of the first user interface object at the first position in the three-dimensional environment without performing the first operation, in response to detecting the third movement of the hand in the physical environment and in accordance with a determination that the third movement of the hand meets the second criteria and does not meet the first criteria, provides real-time visual feedback as the user's hand moves, thereby providing improved visual feedback to the user.

In some embodiments, the computer system detects movement of a gaze input from a first position to a second position in the three-dimensional environment. In response to detecting the movement of the gaze input from the first position to the second position in the three-dimensional environment: in accordance with a determination that a current position of the gaze input is in a region occupied by the first user interface object, the computer system displays the first user interface object with a first appearance; and in accordance with a determination that the current position of the gaze input is in a region that is away from the first user interface object, the computer system displays the first user interface object with a second appearance different from the first appearance. Displaying the first user interface object with a first appearance, in accordance with a determination that a current position of the gaze input is in a region occupied by the first user interface object, and displaying the first user interface object with a second appearance different from the first appearance in accordance with a determination that the current position of the gaze input is in a region that is away from the first user interface object, provides real-time visual feedback regarding the detected location of the user's gaze, thereby providing improved visual feedback to the user.

In some embodiments, displaying the first user interface object with the first appearance includes deforming the first surface of the first user interface object in accordance with the gaze input moving into the region occupied by the first user interface object. In some embodiments, displaying the first user interface object with the second appearance includes restoring the first surface of the first user interface object in accordance with the gaze input moving away from the region occupied by the first user interface object. In some embodiments, the computer system changes the appearance of the first user interface object in accordance with a determination that the gaze input meets predefined stability and duration criteria at its current position. Displaying the first user interface object with the first appearance, including deforming the first surface of the first user interface object in accordance with the gaze input moving into the region occupied by the first user interface object, provides real-time visual feedback regarding the detected location of the user's gaze into the region occupied by the first user interface object, thereby providing improved visual feedback.

In some embodiments, the first criteria include a requirement that a gaze input is detected at a region corresponding to the first user interface object (e.g., the user interface object 7046 in FIGS. 7C-7D, 7E-7J, and 7K-7L, and, optionally, in FIG. 7M-7N, etc.) in the three-dimensional environment and that the gaze input meets predefined stability and duration criteria at its current position, in order for the first criteria to be met. In some embodiments, in response to detecting the first movement of the hand in the physical environment: in accordance with a determination that the first movement of the hand meets a movement requirement of the first criteria and in accordance with a determination that a gaze input is not detected at a region that corresponds to the first user interface object in the three-dimensional environment (e.g., a detected gaze input is directed to a different region of the environment, or a gaze is not detected, etc.), the computer system does not perform the first operation (and, optionally, the computer system performs a third operation different from the first and second operations). Requiring that a gaze input is detected at a region corresponding to the user interface object in the three-dimensional environment and that the gaze input meets predefined stability and duration criteria at its current position, provides additional control options (e.g., by using gaze to determine whether or not the first criteria is met) without cluttering the UI with additional displayed controls (e.g., additional displayed controls for selecting and/or enabling a user interface object for user interaction).

In some embodiments, the first view of the three-dimensional environment includes a plurality of user interface objects (e.g., including the first user interface object, and a second user interface object different from the first user interface object), and where the first user interface object is deformed in response to the first movement of the hand in accordance with a determination the gaze input is directed to the first user interface object during the first movement of the hand. In some embodiments, the first user interface object, as opposed to other user interface objects in the current view of the three-dimensional environment, is selected as the target of the user input (e.g., the first movement of the hand, and/or other inputs detected in conjunction with the gaze input, etc.)). In some embodiments, in accordance with a determination that the gaze input is directed to a second user interface object during the first movement of the hand, the computer system performs an operation corresponding to the second user interface object and deforms a first surface of the second user interface object (e.g., in a manner similar or substantially similar to deformation of the first surface of the first user interface object) and does not deform the first surface of the first user interface object or perform the first operation corresponding to the first user interface object. Deforming the first user interface object in response to the first movement of the hand in accordance with a determination the gaze input is directed to the first user interface object during the first movement of the hand, provides additional control options (e.g., by using gaze (in addition to other inputs) to select which user interface object, in a plurality of user interface objects, a user is interacting with) without cluttering the UI with additional displayed controls.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, and 12000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 9000, 10000, 11000, and 12000). For brevity, these details are not repeated here.

Figure 9:
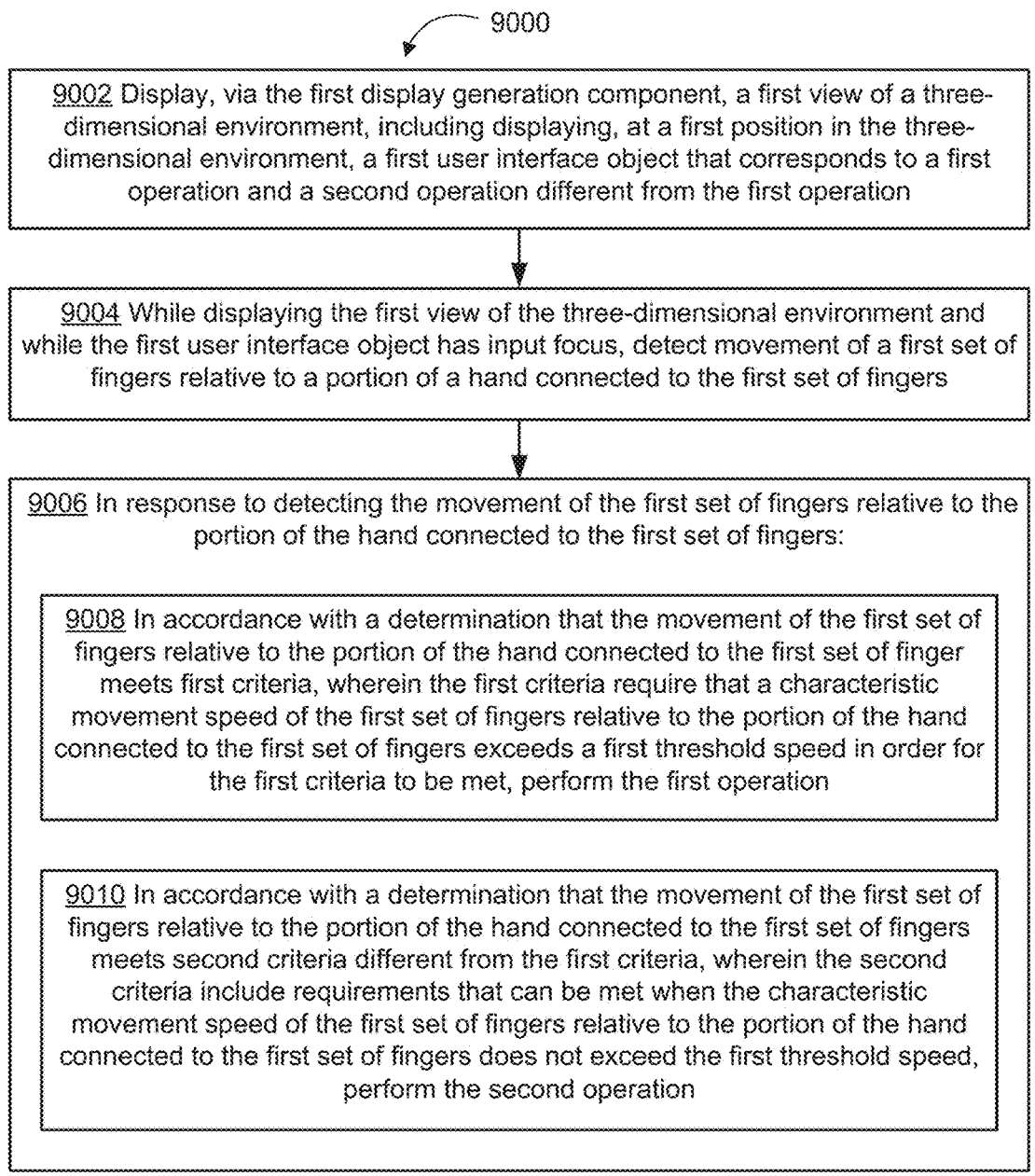
FIG. 9 is a flowchart of a method of performing different operations associated with a user interface object in a three-dimensional environment in response to movement of a user's hand in a physical environment, in accordance with some embodiments.

FIG. 9 is a flowchart of a method 9000 of performing different operations associated with a user interface object in a three-dimensional environment in response to different movements of a user's hand in a physical environment, in accordance with some embodiments. Method 9000 relates to performing different operations in response to different movements of a user's hand in a physical environment. Performing a first operation in accordance with a determination that the movement of the first set of fingers relative to the portion of the hand connected to the first set of finger meets first criteria, wherein the first criteria require that a characteristic movement speed of the first set of fingers relative the portion of the hand connected to the first set of fingers exceeds a first threshold speed, and performing a second operation in accordance with a determination that the movement of the first set of fingers relative to the portion of the hand connected to the first set of fingers meets second criteria different from the first criteria, wherein the second criteria include requirements that can be met when the characteristic movement speed of the first set of fingers relative to the portion of the hand connected to the first set of fingers does not exceed the first threshold speed, provides additional control options without cluttering the UI with additional displayed controls (e.g., additional displayed controls for performing the first operation and additional displayed controls for performing the second operation). Providing additional control options without cluttering the UI with additional displayed controls enhances the operability of the device, which, additionally, reduces power usage and improves battery life of the device by enabling the user to use the device more quickly and efficiently.

In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., computer system 101 in FIG. 1) that is in communication with a first display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the first display generation component and at least some of the one or more input devices. In some embodiments, the computer system includes a computing component that includes one or more processors and memory that is separate from the first display generation component and/or the one or more input devices. In some embodiments, the first display generation component and the one or more input devices are integrated and enclosed in the same housing.

In the method 9000, the computer system displays (9002), via the first display generation component, a first view (e.g., view 7202 in FIG. 7E, or another view) of a three-dimensional environment (e.g., a virtual three-dimensional environment without a representation of a physical environment, a mixed reality environment that is a virtual environment that is augmented by sensor data corresponding to the physical environment, an augmented reality environment that includes one or more virtual objects and a representation of at least a portion of a physical environment surrounding the first display generation component (e.g., a camera view or a view through a transparent or semitransparent portion of the first display generation component), etc.), including displaying, at a first position in the three-dimensional environment, a first user interface object (e.g., the first user interface object 7046 in FIGS. 7E-7J, or another user interface object, etc.) (e.g., a representation of an application, a selectable avatar, a selectable menu item, a selectable device controls, a content item, a slider control, a button, a virtual three-dimensional object, a multifunction control object, a control panel that includes multiple controls corresponding to different functions or operations, an information item, a media item, etc.) that corresponds to a first operation and a second operation different from the first operation (e.g., where activation of the first user interface object in accordance with different criteria results in the performance of the first operation or the second operation). In some embodiments, the first user interface object is a control object for a first physical object (e.g., a light source, an appliance, a media player, etc.) present at a first location in the physical environment, and the computer system causes the first physical object to perform the first operation or the second operation (e.g., by generating and sending the corresponding control commands to the first physical object, by causing another device to generate and send the control commands to the first physical object, etc.). In some embodiments, the first user interface object is a control object for a first physical object and a second physical object present at respective locations in the physical environment, where the first operation is an operation related to the first physical object and the second operation is an operation related to the second physical object. In some embodiments, the first user interface object is a control for two related functions (e.g., functions of the same component (e.g., audio component, display generation component, network component, media player component, flashlight component, camera component, etc.) of the computer system, functions of the same application or computer-generated experience, functions to be applied to the same user interface or user interface object, etc.) or the same function performed with different parameters (e.g., turn on/off vs. gradually adjusting a value between on/off; switching between discrete values vs. fine tuning between discrete values, adjusting value based on different units (e.g., scroll by page vs. scroll item by item), etc.). In some embodiments, performance of the first operation and performance of the second operation cause changes in the three-dimensional environment that are external to the first user interface object (e.g., causing additional virtual content to be displayed, causing changes in existing virtual content that is displayed, entering or exiting a computer-generated experience, change a level of immersion associated with currently displayed content, etc.). While displaying the first view of the three-dimensional environment and while the first user interface object has input focus (e.g., the computer system evaluates the next user input in the context of the operations and associated input criteria for the first user interface object, as opposed to other user interface object in the view), the computer system detects (9004) movement (e.g., rotation around a joint, bending, movement in the up-and-down direction, movement in the sideways direction, etc.) of a first set of fingers (e.g., a single finger, two fingers, four fingers, index finger, index finger and middle finger, thumb, etc.) relative to a portion of a hand (e.g., where the portion of the hand corresponds to a palm of the hand, a knuckle, etc.) connected to the first set of fingers (e.g., rotating a fingertip around a knuckle connected to the fingertip, rotating a finger around a knuckle connecting the finger to a hand, rotating two fingers together around their respective knuckles connected to the hand, etc.). In some embodiments, the first user interface object gains and/or retains the input focus based at least in part on a user gaze being directed to the first user interface object. In some embodiments, the first user interface object gains and retains input focus in response to a selection input that was detected before the movement of the set of fingers. In some embodiments, the selection input includes moving a focus selector object to the position of the first user interface object, providing a selection gesture (e.g., in-air tap, a selection gesture detected on a touch-sensitive surface, a tap of one finger on another portion of the same hand, etc.) at a location that corresponds to the position of the first user interface object or while the gaze is directed to the first user interface object, etc. In response to detecting (9006) the movement of the first set of fingers relative to the portion of the hand connected to the first set of fingers and in accordance with a determination that the movement of the first set of fingers relative to the portion of the hand connected to the first set of finger meets first criteria, where the first criteria require that a characteristic movement speed (e.g., rotational speed, translational speed, a combination of the rotation and translation speeds, etc.) of the first set of fingers relative the portion of the hand connected to the first set of fingers exceeds a first threshold speed in order for the first criteria to be met, the computer system performs (9008) the first operation (e.g., without performing the second operation) (e.g., in FIGS. 7E-7F, the computer system turned on all the light 7052 in response to the movement 7049 of the hand 7102). In some embodiments, the first operation corresponds to a discrete operation (e.g., on/off or toggle, switch to a different state, launch or exit an application or experience, display or cease to display a user interface object, etc.). In the method 9000, in response to detecting the movement of the first set of fingers relative to the portion of the hand connected to the first set of fingers (e.g., movement 7049 in FIG. 7E, movement 7051 in FIGS. 7G-7J, etc.) and accordance with a determination that the movement of the first set of fingers relative to the portion of the hand connected to the first set of fingers meets second criteria different from the first criteria, where the second criteria include requirements that can be met when the characteristic movement speed of the first set of fingers relative to the portion of the hand connected to the first set of fingers does not exceed the first threshold speed, the computer system performs (9010) the second operation (e.g., without performing the first operation) (e.g., in FIGS. 7G-7J, the light 7054 is gradually adjusted in accordance with the movement 7051 of the hand 7102). In some embodiments, the second operation corresponds to a graduated operation (e.g., a continuous operation that results in a gradual adjustment of an effect based on progress, extent, and/or magnitude of the input). In some embodiments, the second criteria require that the characteristic movement speed of the first set of fingers relative to the portion of the hand connected to the first set of fingers does not exceed the first threshold speed in order for the second criteria to be met. In some embodiments, the second criteria can be met irrespective of whether the characteristic movement speed of the first set of fingers is above or below the first threshold speed as long as other requirements of the second criteria are met (e.g., by other aspects of the input, or other inputs, etc.). In some embodiments, the second criteria requires that the characteristic movement speed of the first set of fingers is above a second threshold speed that is below the first threshold speed. In some embodiments, the characteristic movement speed of the first set of fingers includes translational speed of the first set of fingers in a preset direction (e.g., upward, downward, leftward, rightward, vertical, sideways, etc.) relative to the physical environment. In some embodiments, the characteristic movement speed of the first set of fingers includes translational speed of the fingertips of the first set of fingers in a preset direction (e.g., upward, downward, leftward, rightward, vertical, sideways, etc.) relative to the joints connecting the fingers to the palm of the hand (e.g., the palm can be moving or stationary during the movement of the first set of fingers). In some embodiments, the characteristic movement speed of the first set of fingers includes rotational speed of the first set of fingers in a preset direction (e.g., toward the palm, away from the palm, in a pronated direction, in a supinated direction, toward the user's face, away from the user's face, toward the head, toward the feet, toward the left, toward the right, upward, downward, clockwise, counterclockwise, etc.) around a preset portion of the user's body (e.g., the wrist connected to the hand, elbow connected to the hand, knuckles of the first set of fingers, longitudinal axis of a finger, longitudinal axis of the forearm, rotational axis of the wrist, etc.). In some embodiments, the characteristic movement speed of the first set of fingers and the relevant threshold speeds are measured in standard units of distance and/or angles (e.g., centimeters, inches, degrees, radians, etc.) over time. In some embodiments, the characteristic movement speed of the first set of fingers and the relevant threshold speeds are measured in fractions (e.g., one quarter, one half, three-quarters, three-eighths, 20%, 35%, 78%, 100%, etc.) of preset ranges of motion (e.g., range of rotation and/or translation, etc. relative to reference position(s) on the user's body or hand) of the first set of fingers (e.g., user's specific full/comfortable range of motion, average full/comfortable range of motion for a group of users, etc.) over time. In some embodiments, the characteristic movement speed of the first set of fingers and the relevant threshold speeds are measured by the amount of time by which the user's index finger takes to extend from a curled up state to an extended state. In some embodiments, the characteristic movement speed of the first set of fingers and the relevant threshold speeds are measured by the rate of rotation as measured by a rate of change in the angle around a knuckle (e.g., at the base of the finger, or in the middle of the finger, etc.) between the user's index finger in a resting position or preset ready-state position and the index finger in a raised position during the movement of the index finger. In some embodiments, the characteristic movement speed of the first set of fingers and the relevant threshold speeds are measured by the rate of rotation as measured by a rate of change in the angles around respective knuckles (e.g., at the base of the fingers, or in the middle of the fingers, etc.) between the user's index and middle fingers in their resting positions or preset ready-state positions and the fingers in their raised positions during the movement of the fingers.

These features are illustrated in FIGS. 7A and 7E-7J, where a first view 7202 of a three-dimensional environment is displayed. Movement 7049 of a user's hand 7102 in the physical environment that meet first criteria (FIGS. 7E and 7F) causes the computer system to change the appearance of a first surface of the first user interface object 7046 and perform a first operation (e.g., turn on all of the light 7052) (e.g., the first operation corresponds to an on/off operation (e.g., a toggle switch, a check box, a press button, etc.)). Movement 7051 of the user's hand 7102 in the physical environment that meet second criteria (FIGS. 7G-7J) causes the computer system to change the appearance of the first surface of the first user interface object 7046 and perform a second operation (e.g., gradually adjusting the light 7054, or adjusting another value or control, etc.) (e.g., the second operation corresponds to a graduated change in a value (e.g., a dimmer switch, a slider control, etc.).

In some embodiments, the first operation and the second operation correspond to different manners (e.g., switching between states vs. adjusting values gradually between the states, turn on a first mode vs. adjusting values in a second mode, etc.) of adjusting a first control function (e.g., volume control, brightness control, playback speed control, scroll/paging control, lighting control, fan speed control, air conditioning control, etc.) associated with the first user interface object. For example, as shown in FIGS. 7E-7F, when the movement speed of the hand movement 7049 (e.g., movement speed of a first set of fingers relative to another part of the hand connected to the fingers) is greater than a threshold speed, the computer system performs a discrete operation that turns on all three lights 7050 at the same time, in accordance with some embodiments; and as shown in FIGS. 7G-7J, when the movement speed of the hand movement 7051 (e.g., movement speed of a first set of fingers relative to another part of the hand connected to the fingers) is less than the threshold speed, the computer system performs a continuous and graduated operation that turns on/off the lights 7050 one by one, in accordance with some embodiments, or adjust the intensity of the lights gradually. Adjusting a first control function in a first manner, in accordance with a determination that the movement of the first set of fingers relative to the portion of the hand connected to the first set of finger meets first criteria, wherein the first criteria require that a characteristic movement speed of the first set of fingers relative the portion of the hand connected to the first set of fingers exceeds a first threshold speed, and adjusting the first control function in a second, different manner, in accordance with a determination that the movement of the first set of fingers relative to the portion of the hand connected to the first set of fingers meets second criteria different from the first criteria, wherein the second criteria include requirements that can be met when the characteristic movement speed of the first set of fingers relative to the portion of the hand connected to the first set of fingers does not exceed the first threshold speed, provides additional control options without cluttering the UI with additional displayed controls (e.g., additional displayed controls for adjusting the first control manner in the first and second manners).

In some embodiments, the first set of fingers includes a single finger of the hand (e.g., the index finger, the thumb, a preset finger selected by the system or the user, etc.). For example, the first set of fingers is an index finger of the hand 7102 in FIGS. 7E-7J, in accordance with some embodiments. Performing a first operation in accordance with a determination that the movement of the first set of fingers relative to the portion of the hand connected to the first set of finger meets first criteria, wherein the first criteria require that a characteristic movement speed of the first set of fingers that includes a single finger of the hand, relative the portion of the hand connected to the first set of fingers exceeds a first threshold speed, and performing a second operation in accordance with a determination that the movement of the first set of fingers that includes a single finger of the hand, relative to the portion of the hand connected to the first set of fingers meets second criteria different from the first criteria, wherein the second criteria include requirements that can be met when the characteristic movement speed of the first set of fingers relative to the portion of the hand connected to the first set of fingers does not exceed the first threshold speed, provides additional control options without cluttering the UI with additional displayed controls (e.g., additional displayed controls for performing the first operation and additional displayed controls for performing the second operation).

In some embodiments, in response to detecting a start of the movement of the first set of fingers relative to the portion of the hand connected to the first set of fingers (e.g., movement into a starting posture, an initial portion of the movement detected prior to detecting sufficient amount of movement of the first set of fingers relative to the portion of the hand connected to the first set of fingers to evaluate the movement against the different criteria associated with the first user interface object, etc.), the computer system changes an appearance of the first user interface object in a first manner. In some embodiments, changing the appearance of the first user interface object in the first manner includes deforming a first surface of the first user interface object, changing the simulated optical property (e.g., reflective index, thickness of the optical path, color, etc.) of the first user interface object, or changing a display property (e.g., color, transparency, brightness, etc.) of the first user interface object, etc. In some embodiments, the computer system changes the appearance of the first user interface object in the first manner in accordance with characteristics (e.g., starting speed, starting acceleration, direction of movement, pointing direction, etc.) of the start of the movement of the first set of fingers relative to the portion of the hand connected to the first set of fingers. For example, before the movement 7049 and the movement 7051 in FIGS. 7E and 7G are started, the computer system changes the appearance of the first surface of the first user interface object 7046 (e.g., flexes, making it bulge up, etc.) in response to detecting the first set of fingers being raised (e.g., before the rotational movement of the fingers relative to the joints of the fingers are started), in accordance with some embodiments. Changing an appearance of the first user interface object in a first manner in response to detecting a start of the movement of the first set of fingers relative to the portion of the hand connected to the first set of fingers, provides real-time visual feedback as the user's fingers move relative to the portion of the user's hand, thereby providing improved visual feedback to the user.

In some embodiments, in response to detecting the movement of the first set of fingers relative to the portion of the hand connected to the first set of fingers and in accordance with the determination that the movement of the first set of fingers relative to the portion of the hand connected to the first set of fingers meets the first criteria, the computer system changes an appearance of the first user interface object in a second manner that is different from the first manner. In some embodiments, changing the appearance of the first user interface object in the second manner includes, deforming a first surface of the first user interface object, changing the simulated optical property (e.g., reflective index, thickness of the optical path, color, etc.) of the first user interface object, changing a display property (e.g., color, transparency, opacity, brightness, etc.) of the first user interface object, etc. In some embodiments, the final state of the first user interface object corresponds to completion of the first operation. In some embodiments, the change in appearance is made in conjunction with performance of the first operation, and performing the first operation includes performing an action that causes an effect that is external to the first user interface object, the change in the appearance of the first user interface object provides visual feedback regarding the performance of the first operation. In some embodiments, changing the appearance of the first user interface object in the second manner (e.g., in response to movement of the fingers that meet the first threshold speed) includes a greater amount of change to the first user interface object as compared to changing the appearance of the first user interface object in the first manner (e.g., in response to the start of the movement of the finger(s)). For example, as shown in FIGS. 7E-7F, when the movement speed of the hand movement 7049 (e.g., movement speed of a first set of fingers relative to another part of the hand connected to the fingers) is greater than a threshold speed, the computer system performs a discrete operation that turns on all three lights 7050 at the same time and presses the surface of the first user interface object all the way inward in accordance with some embodiments; and as shown in FIGS. 7G-7J, when the movement speed of the hand movement 7051 (e.g., movement speed of a first set of fingers relative to another part of the hand connected to the fingers) is less than the threshold speed, the computer system performs a continuous and graduated operation that turns on/off the lights 7050 one by one, and only a portion of the surface of the first user interface object 7046 is pressed down. Changing an appearance of the first user interface object in a second manner that is different from the first manner in response to detecting the movement of the first set of fingers relative to the portion of the hand connected to the first set of fingers and in accordance with the determination that the movement of the first set of fingers relative to the portion of the hand connected to the first set of fingers meets the first criteria, provides real-time visual feedback as the user's fingers move (e.g., to meet the first criteria), thereby providing improved visual feedback to the user.

In some embodiments, in response to detecting the movement of the first set of fingers relative to the portion of the hand connected to the first set of fingers and in accordance with a determination that the movement of the first set of fingers relative to the portion of the hand connected to the first set of fingers meets the second criteria, the computer system changes an appearance of the first user interface object in a third manner that is different from the first manner (and optionally different from the second manner). In some embodiments, changing the appearance of the first user interface object in the third manner includes deforming a first surface of the first user interface object, changing the simulated optical property (e.g., reflective index, thickness of the optical path, color, etc.) of the first user interface object, changing a display property (e.g., color, transparency, opacity, brightness, etc.) of the first user interface object, etc. In some embodiments, the final state of the first user interface object corresponds to completion of the first operation. In some embodiments, the change in appearance is made in conjunction with performance of the second operation, and performing the second operation includes performing an action that causes an effect that is external to the first user interface object, the change in the appearance of the first user interface object provides visual feedback regarding the performance of the second operation. In some embodiments, changing the appearance of the first user interface object in the third manner (e.g., in response to movement of the fingers that does not meet the first threshold speed) includes a greater amount of change to the first user interface object as compared to changing the appearance of the first user interface object in the first manner (e.g., in response to the start of the movement of the finger(s)), and less or different changes to the first user interface object as compared to changing the appearance of the first user interface object in the second manner (e.g., in response to movement of the fingers that meet the first threshold speed). For example, as shown in FIGS. 7E-7F, when the movement speed of the hand movement 7049 (e.g., movement speed of a first set of fingers relative to another part of the hand connected to the fingers) is greater than a threshold speed, the computer system performs a discrete operation that turns on all three lights 7050 at the same time and presses the surface of the first user interface object all the way inward in accordance with some embodiments; and as shown in FIGS. 7G-7J, when the movement speed of the hand movement 7051 (e.g., movement speed of a first set of fingers relative to another part of the hand connected to the fingers) is less than the threshold speed, the computer system performs a continuous and graduated operation that turns on/off the lights 7050 one by one, and only a portion of the surface of the first user interface object 7046 is pressed down. Changing an appearance of the first user interface object in a third manner that is different from the first manner in response to detecting the movement of the first set of fingers relative to the portion of the hand connected to the first set of fingers and in accordance with a determination that the movement of the first set of fingers relative to the portion of the hand connected to the first set of fingers meets the second criteria, provides real-time visual feedback as the user's fingers move (e.g., to meet the second criteria), thereby providing improved visual feedback to the user.

In some embodiments, the first user interface object includes a reference portion (e.g., the fixed track of a slider control, a fixed part of a dial control, etc., the portion that indicates the whole range of values of the control, etc.) and an adjustable portion (e.g., a moveable knob, a value indicator, etc.) that is movable relative to the reference portion (e.g., movable along a longitudinal direction of the reference portion, rotatable around the perimeter of the reference portion, rotatable around an axis of the reference portion, etc.) in accordance with user input. In response to detecting the movement of the first set of fingers relative to the portion of the hand connected to the first set of fingers and in accordance with a determination that the movement of the first set of fingers relative to the portion of the hand connected to the first set of fingers meets the second criteria, the computer system moves a first portion (e.g., the tip portion for a given direction of movement) of the adjustable portion of the first user interface object with a first speed that corresponds to the characteristic speed of the movement of the first set of fingers, and the computer system moves a second portion (e.g., the tail portion for a given direction of movement) of the adjustable portion of the first user interface object at a second speed less than the first speed. In some embodiments, the second portion of the moveable portion lags behind the first portion of the movable portion. This is illustrated in FIGS. 7I-7J, where when the movement of the finger is downward, the middle portion of the indication 7048 follows more closely with the movement of the hand, and the side portions of the indication 7048 lags behind the middle portion of the indication 7048, in accordance with some embodiments. In some embodiments, the moveable portion is stretched out by the movement of the first set of fingers. In some embodiments, the first portion of the moveable option has a stable spatial relationship with the virtual positions corresponding to the locations of the first set of fingers during movement of the first set of fingers (e.g., follow the movement of the fingers closely, with the same characteristic speed, etc.), but the spatial relationship between the second portion of the moveable option and the virtual positions corresponding to the locations of the first set of fingers change over time depending on the changes in the characteristic movement speed of the first set of fingers (e.g., more lag between the first portion and the second portion when the fingers move faster, and less lag when the fingers move slower, etc.). In some embodiments, moving the first and second portions of the moveable portion of the first user interface object includes maintaining movement after cessation of the movement of the first set of fingers relative to the portion of the hand connected to the first set of fingers (e.g., movement of the first and second portion of the moveable portion of the first user interface object lag behind the movement of the first set of fingers, and may catch up the movement and cessation of movement of the fingers after a period of time). Moving a first portion of the moveable portion of the first user interface object with a first speed that corresponds to the characteristic speed of the movement of the first set of fingers, and moving a second portion of the moveable portion of the first user interface object at a second speed less than the first speed, provides real-time visual feedback as the user's fingers move (e.g., that the movement of the user's fingers is moving an adjustable portion of the first user interface object, which other portions of the first user interface object may follow), thereby providing improved visual feedback to the user.

In some embodiments, in response to detecting the movement of the first set of fingers relative to the portion of the hand connected to the first set of fingers and in accordance with a determination that the movement of the first set of fingers relative to the portion of the hand connected to the first set of fingers meets third criteria different from the first criteria and the second criteria, wherein the third criteria require that the characteristic movement speed of the first set of fingers relative to the portion of the hand connected to the first set of fingers does not exceed the first threshold speed and that the movement of the first set of fingers is maintained for more than a first threshold duration (e.g., continuing to move with a slow speed at least the first threshold duration, or stop and remains at the final position after the movement for at least the first threshold duration, etc.), the computer system performs a third operation (e.g., opening a new control object that includes the options included in the first user interface object and additional options not included in the first user interface object; displaying an expanded portion of the first user interface object that was not previously displayed, activating an alternative action associated with the first user interface object, etc.) that is different from the first operation and the second operation. For example, in some embodiments, a quick downward/upward movement of the index finger around the knuckle or base of the finger activates the first user interface object and causes performance of the first operation associated with the first user interface object, a medium speed upward/downward movement of the index finger around the knuckle or base of the finger causes performance of the second operation, and a slow upward/downward movement of the index finger around the knuckle or based of the finger causes performance of the third operation associated with the first user interface object. For example, as shown in FIGS. 7E-7F, when the movement speed of the hand movement 7049 (e.g., movement speed of a first set of fingers relative to another part of the hand connected to the fingers) is greater than a threshold speed, the computer system performs a discrete operation that turns on all three lights 7050 at the same time and presses the surface of the first user interface object all the way inward in accordance with some embodiments; and as shown in FIGS. 7G-7J, when the movement speed of the hand movement 7051 (e.g., movement speed of a first set of fingers relative to another part of the hand connected to the fingers) is less than the threshold speed, the computer system performs a continuous and graduated operation that turns on/off the lights 7050 one by one, and only a portion of the surface of the first user interface object 7046 is pressed down. In some embodiments, if the movement of the hand persists for more than a threshold amount of time with less than the threshold speed required to perform the discrete operation shown in FIGS. 7E-7F, the computer system performs another operation, such as opening a control panel for the light 7052, or another related or unrelated operation.

Performing a third operation, different from the first operation and the second operation, in response to detecting the movement of the first set of fingers relative to the portion of the hand connected to the first set of fingers and in accordance with a determination that the movement of the first set of fingers relative to the portion of the hand connected to the first set of fingers meets third criteria different from the first criteria and the second criteria, wherein the third criteria require that the characteristic movement speed of the first set of fingers relative to the portion of the hand connected to the first set of fingers does not exceed the first threshold speed and that the movement of the first set of fingers is maintained for more than a first threshold duration, provides additional control options without cluttering the UI with additional displayed controls (e.g., additional displayed controls for the first, second, and third operations).

In some embodiments, in response to detecting the movement of the first set of fingers relative to the portion of the hand connected to the first set of fingers, the computer system reveals, from the first position of the first user interface object (e.g., user interface object 7046 in FIGS. 7E-7J, another user interface object, etc.), one or more of a plurality of user interface objects that were not displayed in the first view (e.g., view 7202 in FIGS. 7E-7J) of the three-dimensional environment, including moving the one or more of the plurality of user interface objects into the first view of the three-dimensional environment from the first position of the first user interface object. In some embodiments, the amount of one or more user interface objects, and/or the number of user interface objects that are revealed increases or decreases in accordance with a movement or reversal of movement of the first set of fingers relative to a preset direction. In some embodiments, the amount of one or more user interface objects, and/or the number of user interface objects that are revealed is adjusted based on characteristics (e.g., movement distance, movement progress level relative to preset threshold, movement speed, amount of rotation, angular speed, and/or duration, etc.) of the movement of the first set of fingers relative to the portion of the hand connected to the first set of fingers. In some embodiments, the one or more user interface objects are shown to slide out from behind or underneath the first user interface object in response to the movement of the first set of fingers by an amount that corresponds to the characteristics of the movement of the first set of fingers. Revealing, from the first position of the first user interface object, one or more of a plurality of user interface objects that were not displayed in the first view, in response to detecting the movement of the first set of fingers relative to the portion of the hand connected to the first set of fingers, provides additional control options (e.g., relating to the one or more user interface objects not displayed in the first view) without cluttering the UI (e.g., the first view) with additional displayed controls.

In some embodiments, in response to detecting the movement of the first set of fingers relative to the portion of the hand connected to the first set of fingers: in accordance with a determination that the movement of the first set of fingers relative to the portion of the hand connected to the first set of fingers meets the first criteria, the computer system generates a first audio output (e.g., along with displaying the view shown in FIG. 7F) (e.g., first sound effect, first alert sound, etc.) (e.g., outputted upon satisfaction of the first criteria, via an audio output component of the first display generation component, an audio output component of the computer system, etc.); and in accordance with a determination that the movement of the first set of fingers relative to the portion of the hand connected to the first set of fingers meets the second criteria, the computer system generates a second audio output (e.g., along with displaying the view shown in FIGS. 7G-7J) (e.g., second sound effect, second alert sound, etc.) (e.g., outputted upon satisfaction of the second criteria, via an audio output component of the first display generation component, an audio output component of the computer system, etc.), where the first audio output is different from the second audio output in one or more characteristics (e.g., frequency, magnitude, wave pattern, overtones, harmonics, etc.) of the first and second audio outputs. Generating a first audio output in accordance with a determination that the movement of the first set of fingers relative to the portion of the hand connected to the first set of fingers meets the first criteria, and generating a second audio output, different from the first audio output, in accordance with a determination that the movement of the first set of fingers relative to the portion of the hand connected to the first set of fingers meets the second criteria, provides real-time aural feedback as the user's fingers move (e.g., to meet the first or second criteria), thereby providing improved feedback to the user.

In some embodiments, generating the first audio output includes selecting a first characteristic (e.g., amplitude, wave pattern, frequency, overtones, harmonics, etc.) of the first audio output in accordance with the characteristic movement speed of the movement of the first set of fingers, and generating the second audio output includes selecting a second characteristic (e.g., amplitude, wave pattern, frequency, overtones, harmonics, etc.) of the second audio output in accordance with the characteristic movement speed of the movement of the first set of fingers. In some embodiments, the first audio output is different from the second audio output. For example, in some embodiments, when the movement of the first set of fingers has a first characteristic movement speed, then the first audio output has a first pitch (and/or first amount of reverberations, first volume, etc.), and when the movement of the first set of fingers has a second characteristic movement speed, then the second audio output has a second pitch (and/or second amount of reverberations, second volume, etc.), where the second pitch (and/or second amount of reverberations, second volume, etc.) of the second audio output is lower (or higher) that the first pitch (and/or first amount of reverberations, first volume, etc.) of the first audio output. Generating the first audio output, including selecting a first characteristic of the first audio output, in accordance with the characteristic movement speed of the movement of the first set of fingers, and generating the second audio output in accordance with the characteristic movement speed of the movement of the first set of fingers, provides real-time aural feedback as the user's fingers move (e.g., real-time audio feedback regarding the movement speed of the user's fingers), thereby providing improved aural feedback to the user.

In some embodiments, in response to detecting the movement of the first set of fingers relative to the portion of the hand connected to the first set of fingers: in accordance with a determination that the first user interface object is a first type of control (e.g., playback control, scroll/paging control, application control, etc.), the computer system generates a respective audio output (e.g., along with displaying the view shown in FIG. 7F) (e.g., first sound effect, first alert sound, etc.) in accordance with a first audio output profile associated with the first type of control; and in accordance with a determination that the first user interface object is a second type of control (e.g., volume control, display control, system control, etc.), the computer system generates a respective audio output (e.g., along with displaying the view shown in FIG. 7G-7J) (e.g., second sound effect, second alert sound, etc.) in accordance with a second audio output profile associated with the second type of control, where the first audio output profile is different from the second audio output profile. In some embodiments, the respective audio output includes a different baseline audio output for different types of operations. In some embodiments, the respective audio output includes different ways of modifying the baseline audio output for different types of operations. In some embodiments, generating the respective audio output includes generating audio outputs with differences in one or more characteristics (e.g., frequency, magnitude, wave pattern, overtones, harmonics, etc.) the audio outputs, etc. In some embodiments, the first view of the three-dimensional environment includes multiple user interface objects of different control types, and a respective user interface object, when activated, cause output of a respective audio output that is generated based on the audio output profile for the control type associated with the respective user interface object. In some embodiments, the different control types are specified based on the different types of input that are required to activate the controls, such as press, flick, long press, slow slide, etc. The different control types include slider controls, dial controls, push buttons, toggles, switches, levers, ratchet buttons, etc. Generating a respective audio output in accordance with a first audio output profile associated with the first type of control, and generating a respective audio output in accordance with a second audio output profile associated with the second type of control, provides real-time aural feedback regarding the type of control, thereby providing improved feedback to the user.

In some embodiments, the three-dimensional environment includes the first user interface object (e.g., user interface object 7046 in FIGS. 7E-7J, another user interface object, etc.) and one or more second user interface objects (e.g., at different positions in the three-dimensional environment) that, when having input focus, are activatable in response movement of the first set of fingers relative to the portion of the hand (e.g., hand 7102 in FIGS. 7E-7J, or another hand, etc.) connected to the first set of fingers, and respective audio outputs that are generated in response to activation of the first user interface object and the one or more second user interface objects have a preset correspondence (e.g., having the same values or related values, or are harmonious, etc.) in one or more characteristics (e.g., tone, pitch, volume, harmonics, baseline wave pattern, etc.) of the respective audio outputs. Generating respective audio outputs having a preset correspondence in one or more characteristics of the respective audio outputs, in response to activation of the first user interface object and the one or more second user interface objects, provides real-time aural feedback regarding the user interface object that has input focus, thereby providing improved aural feedback to the user.

In some embodiments, after detecting that the movement of the first set of fingers relative to the portion of the hand connected to the first set of fingers meets the first criteria, the computer system detects continued movement of the first set of fingers relative to the portion of the hand connected to the first set of fingers. In response to detecting the continued movement of the first set of fingers relative to the portion of the hand connected to the first set of fingers and in accordance with a determination that the continued movement of the first set of fingers relative to the portion of the hand connected to the first set of fingers meets fourth criteria different from the first criteria and the second criteria, where the third criteria requires that the continued movement of the first set of fingers includes a reduction in the characteristic movement speed of the movement of the first set of fingers below a second threshold speed (e.g., same as the first threshold speed, lower than the first threshold speed, etc.) in order for the fourth criteria to be met, the computer system forgoes performing the first operation. In some embodiments, forgoing performing the first operation includes not starting to perform the first operation, or reversing the progress in performing the first operation that has already occurred, etc. In some embodiments, after the first criteria are met, the computer system allows the user to cancel the performance of the first operation by slowing the movement of the first set of fingers, changing the movement direction of the first set of fingers, etc., in a continuation of the movement after the first criteria are met. In some embodiments, before the first criteria are met, the computer system allows the user to avoid triggering the performance of the first operation by slowing the movement of the first set of fingers, changing the movement direction of the first set of fingers, etc., after an initial portion of the movement with high speed. For example, in FIG. 7F, if after the first criteria are met by the movement of the hand 7102, the hand continues to move but with reduced speed or changed direction, the computer system does not turn on the real or virtual light 7052A-C, or turn them off again after turning them on first, in some embodiments. Forgoing performing the first operation, in response to detecting the continued movement of the first set of fingers relative to the portion of the hand connected to the first set of fingers and in accordance with a determination that the continued movement of the first set of fingers relative to the portion of the hand connected to the first set of fingers meets fourth criteria different from the first criteria and the second criteria, where the third criteria requires that the continued movement of the first set of fingers includes a reduction in the characteristic movement speed of the movement of the first set of fingers below a second threshold speed, provides additional control options (e.g., for forgoing performance of the first operation once the first criteria are met, for cancelling performance of the first operation, if in progress, etc.) without cluttering the UI with additional displayed controls.

In some embodiments, the first criteria require that the movement of the first set of fingers includes movement of a first preset finger that meets the first threshold speed in order for the first criteria to be met (e.g., as in the example shown in FIGS. 7E-7F). In some embodiments, other fingers may also move with greater or slower speed, as the first preset finger moves. In some embodiments, the first criteria are not met if the movement of the first set of fingers does not include movement of the first preset finger that meets the first threshold speed, even if other fingers among the first set of fingers have movement speeds that exceeded the first threshold speed. Performing a first operation in accordance with a determination that the movement of the first set of fingers relative to the portion of the hand connected to the first set of finger meets first criteria, wherein the first criteria require that the movement of the first set of fingers includes movement of a first preset finger that meets the first threshold speed in order for the first criteria to be met, and performing a second operation in accordance with a determination that the movement of the first set of fingers relative to the portion of the hand connected to the first set of fingers meets second criteria different from the first criteria, wherein the second criteria include requirements that can be met when the characteristic movement speed of the first set of fingers relative to the portion of the hand connected to the first set of fingers does not exceed the first threshold speed, provides additional control options without cluttering the UI with additional displayed controls (e.g., additional displayed controls for performing the first operation and additional displayed controls for performing the second operation).

In some embodiments, the first user interface object retains the input focus while a gaze input is directed to the first user interface object (e.g., user interface object 7046 in FIGS. 7E-7J, another user interface object, etc.) (e.g., when the gaze input meets predefined stability and duration criteria at the first position). In some embodiments, in response to detecting the movement of the first set of fingers relative to the portion of the hand connected to the first set of fingers and in accordance with a determination that the gaze input is not directed to the first user interface object (e.g., when the gaze input fails to meet predefined stability and duration criteria at the first position, when the gaze input has shifted to another portion of the environment, etc.), the computer system forgoes performance of the first or second operations, and does not changing the appearance of the first user interface object (e.g., does not move and/or deform the first surface of the first user interface object in accordance with the movement of the user's fingers). Retaining the input focus on the first user interface object while a gaze input is directed to the first user interface object reduces the number of user inputs needed to interact with the first user interface object (e.g., as the user does not need to repeat or maintain gestures in order to assign the input focus to the first user interface object), enhancing the operability of the device.

In some embodiments, the computer system detects movement of the gaze input from a second position to the first position, and in response to detecting the movement of the gaze input to the first position (e.g., in accordance with a determination that the gaze input meets predefined stability and duration criteria at the first position), the computer system displays the first user interface object (e.g., user interface object 7046 in FIG. 7E, or another user interface object, etc.) with a first visual indication (e.g., outlining, increase in brightness, etc.) in the three-dimensional environment. Displaying the first user interface object with a first visual indication in the three-dimensional environment, in response to detecting movement of the gaze input from the first position, provides real-time visual feedback regarding the detected location of the user's gaze (e.g., directed to the first user interface object), thereby providing improved visual feedback to the user.

In some embodiments, the first view of the three-dimensional environment includes a plurality of user interface objects (e.g., including the first user interface object), and in response to detecting the movement of the gaze input to the first position, the computer system shifts the input focus to the first user interface object (e.g., user interface object 7046 in FIGS. 7E-7J, or another user interface object, etc.). For example, in some embodiments, the movement of the first set of fingers will cause activation of the first user interface object when the gaze input is directed to the first user interface object at the time that the movement of the first set of fingers is started or meets the first criteria or second criteria; and the movement of the first set of fingers will cause activation of a different user interface object when the gaze input is directed to the different user interface object at the time that the movement of the first set of fingers is started or meets the first criteria or second criteria. Shifting the input focus to the first user interface object in response to detecting the movement of the gaze input to the first position provides additional control options (e.g., for shifting the input focus) without cluttering the UI with additional displayed controls.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, and 12000) are also applicable in an analogous manner to method 9000 described above with respect to FIG. 9. For example, the gestures, gaze inputs, physical objects, user interface objects, controls, movements, criteria, three-dimensional environment, display generation component, surface, representation of physical object, virtual objects, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 10000, 11000, and 12000). For brevity, these details are not repeated here.

Figure 10:
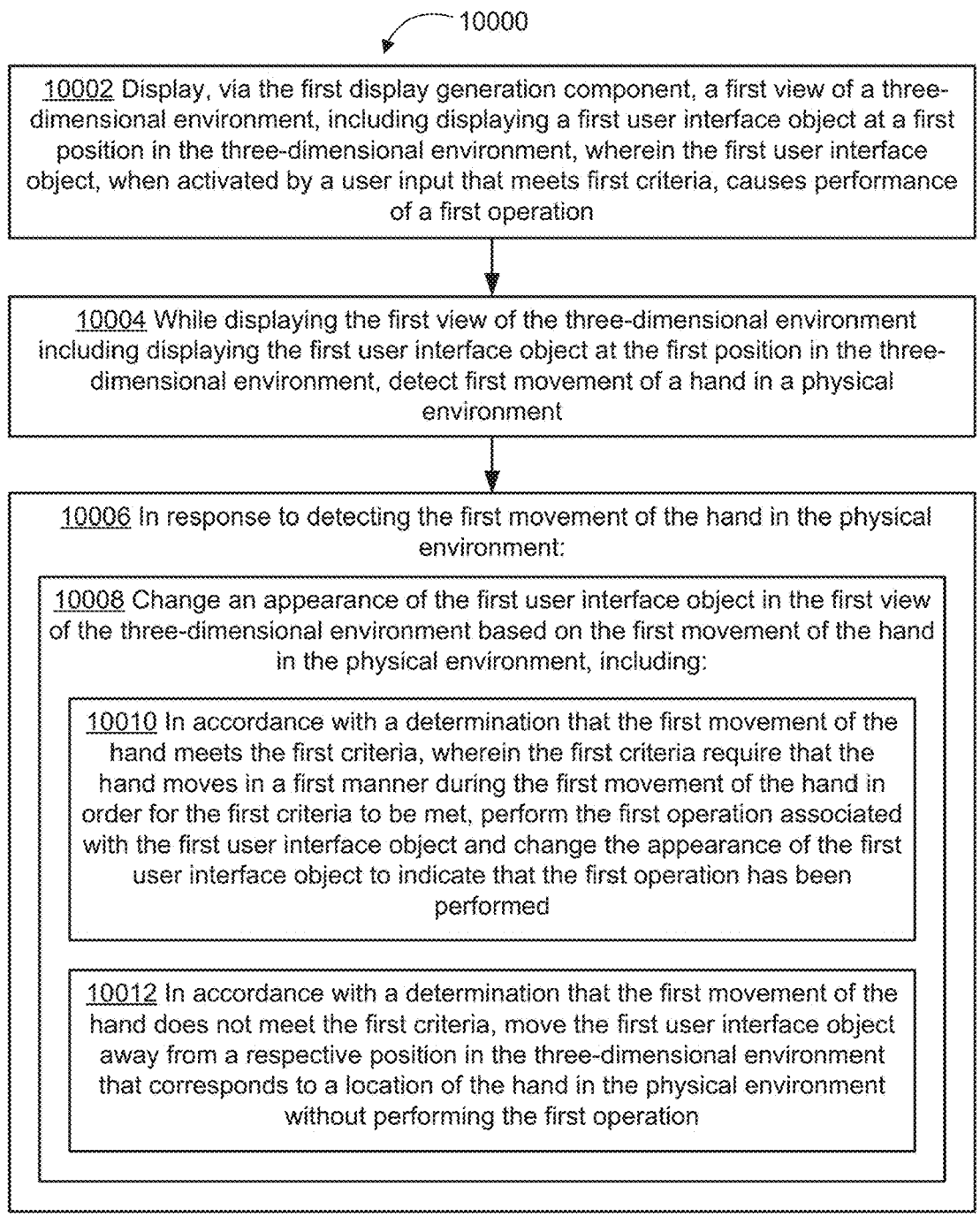
FIG. 10 is a flowchart of a method of causing a change in appearance of a user interface object in different manners in response to movement of a portion of a user, including performing an operation corresponding to the user interface object in conjunction with changing the appearance of the user interface object, or moving the first user interface object away from a position that corresponds to the location of the movement of the portion of the user, in accordance with some embodiments.

FIG. 10 is a flowchart of a method 10000 of causing a change in appearance of a user interface object in different manners in response to movement of a portion of a user, including performing an operation corresponding to the user interface object in conjunction with changing the appearance of the user interface object in response to detecting a first movement of a hand that meets first criteria, and moving the first user interface object away from a position that corresponds to the location of the movement of the portion of the user in response to detecting the first movement of the hand that does not meet first criteria, in accordance with some embodiments.

Method 10000 relates to performing an operation corresponding to the user interface object in conjunction with changing the appearance of the user interface object in response to detecting a first movement of a hand that meets first criteria (e.g., a preset hand posture, a finger flick, a tap, a wave, etc.), and moving the first user interface object away from a position that corresponds to the location of the movement of the portion of the user in response to detecting the first movement of the hand that does not meet first criteria, which provides additional control options without cluttering the UI with additional displayed controls (e.g., additional displayed controls for performing an operation and additional displayed controls for moving the first user interface object). Providing additional control options without cluttering the UI with additional displayed controls enhances the operability of the device, which, additionally, reduces power usage and improves battery life of the device by enabling the user to use the device more quickly and efficiently.

In some embodiments, the method 10000 is performed at a computer system (e.g., computer system 101 in FIG. 1) including a first display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the first display generation component and at least some of the one or more input devices. In some embodiments, the computer system includes a computing component that includes one or more processors and memory that is separate from the first display generation component and/or the one or more input devices. In some embodiments, the first display generation component and the one or more input devices are integrated and enclosed in the same housing.

In the method 10000, the computer system displays (10002), via the first display generation component, a first view (e.g., view 7204 in FIG. 7K, or another view, etc.) of a three-dimensional environment (e.g., a virtual three-dimensional environment without a representation of a physical environment, a mixed reality environment that is a virtual environment that is augmented by sensor data corresponding to the physical environment, an augmented reality environment that includes one or more virtual objects and a representation of at least a portion of a physical environment surrounding the first display generation component (e.g., a camera view or a view through a transparent or semitransparent portion of the first display generation component), etc.), including displaying a first user interface object (e.g., the first user interface object 7046 in FIGS. 7C-7N, or another user interface object, etc.) (e.g., a representation of an application, a selectable avatar, a selectable menu item, a selectable device controls, a content item, a slider control, a button, a virtual three-dimensional object, a multifunction control object, a control panel that includes multiple controls corresponding to different functions or operations, an information item, a media item, etc.) at a first position in the three-dimensional environment, wherein the first user interface object, when activated by a user input that meets first criteria (e.g., one of different sets of activation criteria that trigger different operations associated with the first user interface object, criteria for activating a single operation associated with the first user interface object, etc.), causes performance of a first operation (e.g., as illustrated in FIGS. 7E-7J). In some embodiments, activation of the first user interface object in accordance with different criteria results in the performance of different operations, including the first operation or other operations different from the first operation. In some embodiments, the first user interface object is a control object for a first physical object (e.g., a light source, an appliance, a media player, etc.) present at a first location in the physical environment, and the computer system causes the first physical object to perform the first operation or other operations associated with the first user interface object (e.g., by generating and sending the corresponding control commands to the first physical object, by causing another device to generate and send the control commands to the first physical object, etc.). In some embodiments, the first user interface object is a control for one or more functions (e.g., functions of the audio component, display generation component, network component, media player component, flashlight component, camera component, etc. of the computer system, functions of an application or computer-generated experience, functions to be applied to a user interface or user interface object displayed in the three-dimensional environment, etc. In some embodiments, performance of the first operation or other operations associated with the first user interface object cause changes in the three-dimensional environment that are external to the first user interface object (e.g., causing additional virtual content to be displayed, causing changes in existing virtual content that is displayed, entering or exiting a computer-generated experience, change a level of immersion associated with currently displayed content, etc.). In the method 10000, while displaying the first view (e.g., the view 7202 in FIGS. 7B-7J, the view 7204 in FIGS. 7K-7N, etc.) of the three-dimensional environment including displaying the first user interface object (e.g., the user interface object 7046 in FIGS. 7B-7N) at the first position in the three-dimensional environment, the computer system detects (10004) first movement of a hand (e.g., movement 7045 in FIG. 7C, movement 7047 in FIG. 7D, movement 7049 in FIG. 7E, movement 7051 in FIGS. 7G-7J, movement 7059 in FIGS. 7K-7L, movement of the hand 7102 in 7M-7N, etc.) in a physical environment (e.g., detecting the user's hand moving from a location close to the user to another location farther away from the user, and, optionally toward a location that corresponds to a position of the first user interface object, detecting the user flicking an index finger away from the user, etc.). In the method 10000, in response to detecting (10006) the first movement of the hand (e.g., where the movement of the hand corresponds to a flick gesture, a tap gesture, etc., or where the movement does not correspond to a recognized gesture for activating the first user interface object, etc.) in the physical environment, the computer system changes (10008) an appearance of the first user interface object (e.g., the surface of the first user interface object 7046 is changed in FIGS. 7D, 7F, 7G-7J, 7L, etc. as a result of the movement of the hand 7102, the first user interface object 7046 moved in FIG. 7N as a result of the movement of the hand 7102, etc.) (e.g., the change in appearance is a result of deforming the first user interface object, changing a position of the first user interface object, or both, changing values of one or more display properties of the first user interface object, etc.) in the first view of the three-dimensional environment based on the first movement of the hand in the physical environment (e.g., based on the characteristic values of the movement, based on which criteria are met by the movement, based on whether the first criteria are met or not met, etc.), including: in accordance with a determination that the first movement of the hand meets the first criteria, wherein the first criteria require that the hand moves in a first manner (e.g., in a preset direction, meeting a preset movement threshold (e.g., threshold(s) based on magnitude, speed, acceleration, etc. of the movement of the hand), in a preset hand posture, and/or forming a dynamic gesture (e.g., a finger flick, a tap, a wave, etc.), etc.) during the first movement of the hand in order for the first criteria to be met, the computer system performs (10010) the first operation associated with the first user interface object and changing the appearance of the first user interface object (e.g., by translating, rotating, deforming, changing values of one or more display properties of, etc. one or more portions of the first user interface object) to indicate that the first operation has been performed (and/or is to be performed, is in the process of being performed, etc.) (as illustrated in FIGS. 7C, 7E-7F, 7G-7J, 7K-7L, etc., where an operation corresponding to the first user interface object is performed in response to the movement of the hand); and in accordance with a determination that the first movement of the hand does not meet the first criteria (e.g., does not meet any of the sets of criteria for activating the first user interface object), the computer system moves (10012) the first user interface object away from a respective position in the three-dimensional environment that corresponds to a location of the hand in the physical environment (e.g., as illustrated in FIGS. 7M-7N, where the first use interface object 7046 moved away from the position that corresponds to the location of the hand) (e.g., the location to which the hand moved in the physical environment based on the first movement of the hand) without performing the first operation (e.g., optionally, without changing the appearance of the first user interface object to indicate that the first operation has not been performed).

These features are illustrated, for example, in FIGS. 7A and 7K-7N, where a first view 7204 of a three-dimensional environment is displayed. Some aspects of the method 10000 is also illustrated in FIGS. 7A-7J, in accordance with some embodiments. Movement 7059 of a user's hand 7102 in the physical environment that meet first criteria (FIGS. 7K and 7L), causes the computer system to change the appearance of the first user interface object 7046 (e.g., in FIG. 7L, the surface of the first user interface object is pressed in) and perform a first operation associated with the first user interface object (e.g., turn on the light, start a computer-generated experience, etc.). Movement of the user's hand 7102 in the physical environment that does not meet the first criteria (FIGS. 7M-7N) causes the computer system to move the first user interface object 7046 in the three-dimensional environment to away from a position that corresponds to the location of the user's hand, without performing the first operation.

In some embodiments, the first movement of the hand in the physical environment corresponds to a movement of a representation of the hand within the three-dimensional environment toward the first position in the three-dimensional environment, and in response to detecting the first movement of the hand in the physical environment, the computer system displays, via the first display generation component, the representation of the hand moving in the three-dimensional environment toward the first position in the three-dimensional environment (e.g., where the view displayed via the display generation component shows the first movement of the hand towards the first user interface object). In some embodiments, the representation of the hand is a view of the hand through a transparent or semi-transparent portion of the display generation component, the first user interface object is projected onto a first location in the physical environment that corresponds to the first position in the three-dimensional environment, and the user controls the movement of the hand toward the first location in the physical environment that corresponds to the first position in the three-dimensional environment (which is seen through the transparent or semi-transparent portion of the display generation component). In some embodiments, the representation of the hand is a view of the hand through a transparent or semi-transparent portion of the display generation component, the first user interface object is displayed at a first position in the three-dimensional environment by the display generation component and blocks the view of a first location in the physical environment that corresponds to the first position in the three-dimensional environment, and the user controls the movement of the hand toward the first location in the physical environment that corresponds to the first position in the three-dimensional environment (which is seen through the transparent or semi-transparent portion of the display). In some embodiments, the representation of the hand is part of a camera view of the physical environment, and the first user interface object is projected onto a first location in the physical environment that corresponds to the first position in the three-dimensional environment, and the user controls the movement of the hand toward the first location in the physical environment that corresponds to the first position in the three-dimensional environment (which is shown in the camera view of the physical environment). In some embodiments, the representation of the hand is part of a camera view of the physical environment, the first user interface object is displayed at a first position in the three-dimensional environment by the display generation component and replaces display of the camera view of a first location in the physical environment that corresponds to the first position in the three-dimensional environment, and the user controls the movement of the hand toward the first location in the physical environment that corresponds to the first position in the three-dimensional environment (which is shown in the camera view of the physical environment). Displaying a representation of the hand moving in the three-dimensional environment toward the first position in the three-dimensional environment in response to detecting the first movement of the hand in the physical environment, provides real-time visual feedback as the user's hand moves, thereby providing improved visual feedback to the user.

In some embodiments, the first criteria require that the first movement of the hand includes movement of a first finger of the hand relative to a portion of the hand connected to the first finger (e.g., the pointing finger, the middle finger, the thumb, etc.). In some embodiments, the first movement of the hand includes a flick of the first finger relative to a knuckle or base of the finger, a flick of the thumb relative to the side of the index finger, etc., as opposed to movement of the whole hand). For example, in FIG. 7K, the movement 7059 represents a movement of a first finger relative to a portion of the hand connected to the finger, in some embodiments. Performing an operation corresponding to the user interface object in conjunction with changing the appearance of the user interface object in response to detecting a first movement of a hand that meets first criteria requiring first movement of the hand include movement of a first finger of the hand relative to a portion of the hand connected to the first finger, and moving the first user interface object away from a position that corresponds to the location of the movement of the portion of the user in response to detecting the first movement of the hand that does not meet first criteria, which provides additional control options without cluttering the UI with additional displayed controls (e.g., additional displayed controls for performing an operation and additional displayed controls for moving the first user interface object).

In some embodiments, in response to detecting the first movement of the hand in the physical environment and in accordance with a determination that the first movement of the hand meets the first criteria, the computer system generates a first audio output (e.g., outputting a first audio alert, first sound effect, etc.) in conjunction with performing the first operation (e.g., right before starting the performance of the first operation, at the start of the performance of the first operation, at the completion of the first operation, during the performance of the first operation, etc.). For example, the computer system generates the first audio output in conjunction with displaying the first view 7204 in FIGS. 7C, 7F, 7G-7J, and 7L, in accordance with some embodiments. Generating a first audio output in conjunction with performing the first operation provides real-time aural feedback that the first operation was performed, thereby providing improved aural feedback to the user.

In some embodiments, in response to detecting the first movement of the hand in the physical environment and in accordance with a determination that the first movement of the hand does not meet the first criteria, the computer system generates a second audio output (e.g., outputting a second audio alert, second sound effect, etc.) (e.g., different from the first audio output generated in conjunction with performance of the first operation, differing from the first audio output in at least one audio characteristic, etc.) in conjunction with moving the first user interface object away from the respective position in the three-dimensional environment that corresponds to the location of the hand in the physical environment (e.g., right before starting the movement of the first user interface object, at the start of the movement of the first user interface object, at the completion of the movement of the first user interface object, during the movement of the first user interface object, etc.). For example, the computer system generates the second audio output in conjunction with displaying the first view 7204 in FIGS. 7M-7N, in accordance with some embodiments. Generating a second audio output in conjunction with moving the first user interface object away from the respective position in the three-dimensional environment that corresponds to the location of the hand in the physical environment, provides real-time aural feedback that the first user interface object was moved, thereby providing improved aural feedback to the user.

In some embodiments, in response to detecting the first movement of the hand in the physical environment, the computer system generates a respective audio output (e.g., outputting a respective audio alert, respective sound effect, etc.) with a respective audio output profile that is selected from a plurality of audio output profiles in accordance with whether the first criteria are met. For example, the computer system generates the first audio output in conjunction with the movement 7045, movement 7049 and movement 7051 and/or with displaying the first view 7204 in FIGS. 7C, 7F, 7G-7J, and 7L, in accordance with some embodiments; and the computer system generates the second audio output in conjunction with the movement of the hand 7102 shown in FIGS. 7M-7N, and with displaying the first view 7204 in FIGS. 7M-7N, in accordance with some embodiments. In some embodiments, the computer system selects a first audio output profile from a first subset of audio output profiles if the first criteria are met, and the computer system selects a second audio output profile from a second subset of audio output profiles if the first criteria are not met, where the first subset and the second subset do not overlap, are different, etc. In some embodiments, in response to detecting the first movement of the hand in the physical environment: in accordance with a determination that first movement of the hand meets the first criteria, the computer system generates a first audio output (e.g., outputting a first audio alert, first sound effect, etc.) in conjunction with performing the first operation (e.g., right before starting the performance of the first operation, at the start of the performance of the first operation, at the completion of the first operation, during the performance of the first operation, etc.); and in accordance with a determination that first movement of the hand does not meet the first criteria, the computer system generates a second audio output (e.g., outputting a second audio alert, second sound effect, etc.) that is different from the first audio output, in conjunction with moving the first user interface object away from the respective position in the three-dimensional environment that corresponds to the location of the hand in the physical environment (e.g., right before starting the movement of the first user interface object, at the start of the movement of the first user interface object, at the completion of the movement of the first user interface object, during the movement of the first user interface object, etc.). Generating a respective audio output with a respective audio output profile that is selected from a plurality of audio output profiles in accordance with whether the first criteria are met, provides real-time aural feedback regarding whether the first criteria were or were not met, thereby providing improved aural feedback to the user.

In some embodiments, moving the first user interface object away from the respective position in the three-dimensional environment that corresponds to the location of the hand in the physical environment includes dynamically selecting the current position of the first user interface object in accordance with the current location of the hand in the physical environment (and optionally, the previous locations of the hand in the physical environment during a period of time preceding the current time). In some embodiments, the computer system displays continuous movement of the first user interface object with values of one or more movement characteristics of the first user interface object selected based on values of corresponding movement characteristics of the hand. In some embodiments, when the hand moves away from the location that corresponds to the first position of the first user interface object, the first user interface object is moved back to the first position. In some embodiments, when the hand is in a first position in the three-dimensional environment, moving the first user interface object away from the first position includes moving the first user interface object in a first respective direction (and/or to a first respective object position). In some embodiments, when the hand is in a second position in the three-dimensional environment, moving the first user interface object away from the second position include moving the first user interface object in a second respective direction different from the first respective direction (and/or to a second respective object position different from the first object position). Moving the first user interface object away from the respective position in the three-dimensional environment that corresponds to the location of the hand in the physical environment, including dynamically selecting the current position of the first user interface object in accordance with the current location of the hand in the physical environment, provides real-time visual feedback as the user's hand moves, thereby providing improved feedback to the user.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, and 12000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 11000, and 12000). For brevity, these details are not repeated here.

Figure 11:
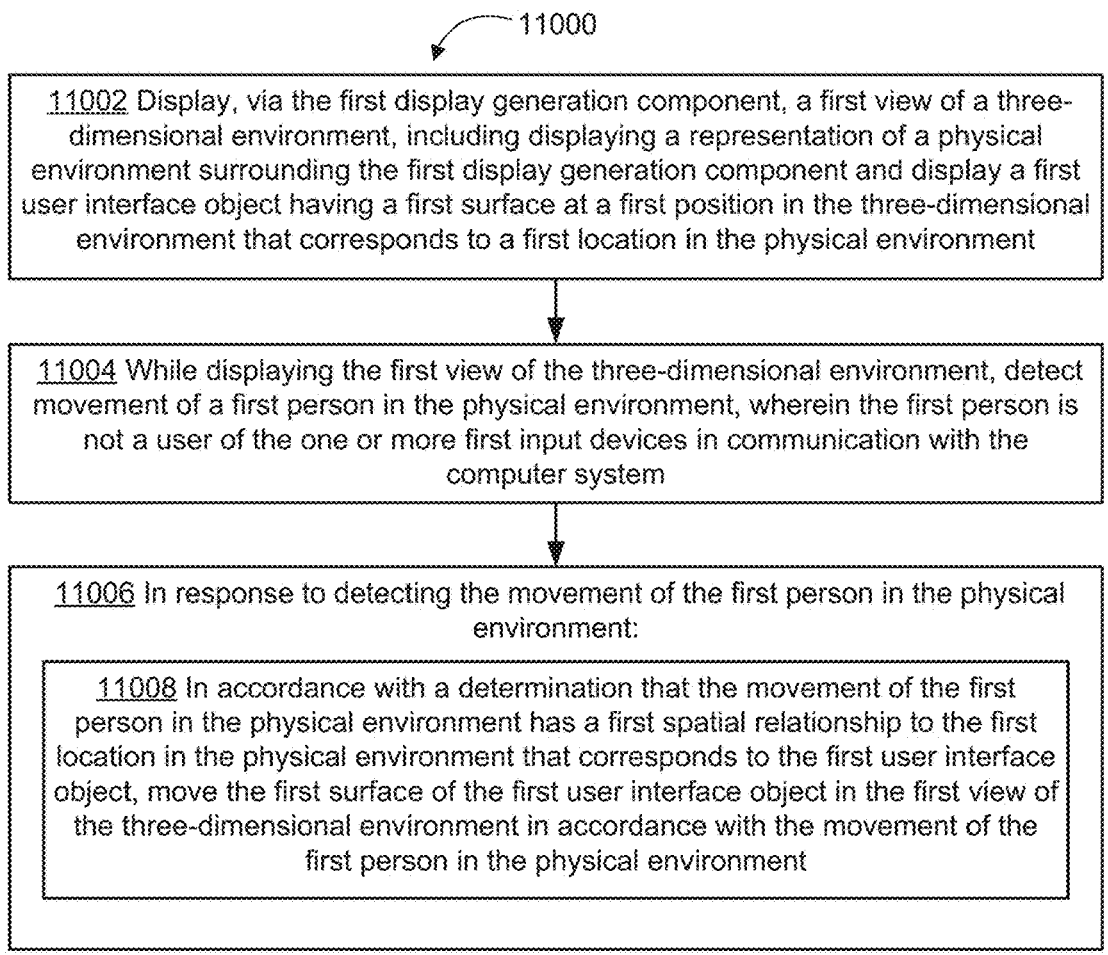
FIG. 11 is a flowchart of a method of moving a surface of a user interface object in a three-dimensional environment in response to movement in a physical environment of a person who is not a user of the computer system, in accordance with some embodiments.

FIG. 11 is a flowchart of a method of moving a surface of a user interface object in a three-dimensional environment in response to movement in a physical environment of a person who is not a user of the computer system, in accordance with some embodiments.

In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a first computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the first display generation component and at least some of the one or more input devices. In some embodiments, the computer system includes a computing component that includes one or more processors and memory that is separate from the first display generation component and/or the one or more input devices. In some embodiments, the first display generation component and the one or more input devices are integrated and enclosed in the same housing.

The method 11000 relates to automatically updating display of a surface of a user interface object, displayed in a three-dimensional environment that corresponds to a physical environment, in response to a computer system detecting that a person is moving in the physical environment, such that a person viewing the user interface object is aware of the presence of the person while the user is viewing virtual objects in the three-dimensional environment. Automatically changing a surface displayed in the three-dimensional environment to increase the user's awareness of the physical environment, without requiring the user to interrupt the user's session in the three-dimensional environment (e.g., by requesting to reduce a level of immersion in the three-dimensional environment), provides real-time visual feedback as a person moves in the physical environment in response to determining that the person is moving, without requiring additional user input (e.g., to request to cease display of the user interface object (e.g., to view the person that is moving in the physical environment)). Providing improved visual feedback to the user and performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In the method 11000, the computer system displays (11002), via the first display generation component, a first view (e.g., view 7206 in FIG. 7P, or another view, etc.) of a three-dimensional environment (e.g., a virtual three-dimensional environment without a representation of a physical environment, a mixed reality environment that is a virtual environment that is augmented by sensor data corresponding to the physical environment, an augmented reality environment that includes one or more virtual objects and a representation of at least a portion of a physical environment surrounding the first display generation component (e.g., a camera view or a view through a transparent or semitransparent portion of the first display generation component), etc.), including displaying a representation of a physical environment (e.g., scene 105 in FIG. 7O, or another physical environment, etc.) surrounding the first display generation component (e.g., display generation component 7100, or another display generation component such as an HMD, etc.) and displaying a first user interface object (e.g., the user interface object 7200 in FIG. 7P, or another user interface object, etc.) (e.g., a virtual user interface object that does not correspond to a physical object in the physical environment, a computer-generated user interface object, a media item, a virtual three-dimensional object, a virtual surface, a virtual screen that displays virtual content, a user interface object that includes controls that, when activated, cause performance of operations in the three-dimensional environment, etc.) having a first surface at a first position in the three-dimensional environment that corresponds to a first location in the physical environment (e.g., the first surface occupies a first spatial portion of the three-dimensional environment that corresponds to a first spatial region in the physical environment). In the method 11000, while displaying the first view (e.g., the view 7206 in FIGS. 7P-7R, or another view, etc.) of the three-dimensional environment, the computer system detects (11004) movement of a first person (e.g., person 7300 in FIG. 7Q, or another person, etc.) in the physical environment, where the first person is not a user of the one or more first input devices (e.g., not user 7002 in FIG. 7Q) in communication with the computer system (e.g., the first person is different from a person (e.g., user) who is primarily using the first display generation component and providing inputs to update the user interface displayed by the first display generation component). In some embodiments, the computer system recognizes the first person as an object of significance (e.g., a human, a person of significance to the user of the first display generation component, etc.) in the physical environment, but does not recognize or accept inputs from the first person to proactively control the content displayed in the three-dimensional environment. For example, the computer system recognizes the first person as an object of significance (e.g., a person of importance to the user) based at least in part on receiving a wireless identification signal (e.g., from a smart watch, fitness tracker, etc. worn by and/or associated with the first person) or based at least in part on performing facial and/or body recognition of the first person (e.g., that identifies the first person). The first person is not an active participant of a computer-facilitated shared experience that is provided by the first display generation component, and does not alter the shared experience via another device in communication with the computer system. In the method 11000, in response to detecting (11006) the movement of the first person in the physical environment and in accordance with a determination that the movement of the first person in the physical environment has a first spatial relationship (e.g., within a first threshold distance, within a first threshold angle, etc.) to the first location in the physical environment that corresponds to the first user interface object (e.g., the user interface object 7200 in FIG. 7R), the computer system moves (11008) (e.g., translating, rotating, and/or deforming, etc.) the first surface of the first user interface object in the first view of the three-dimensional environment in accordance with the movement of the first person in the physical environment (e.g., as shown in FIG. 7R, the user interface object is moved and deformed in accordance with the movement of the person 7300, when the person 7300 is at a location that has a first spatial relationship with the location that corresponds to the position of the user interface object 7200).

These features are illustrated, for example, in FIGS. 7O-7R, where a first view 7206 of a three-dimensional environment is displayed. A user interface object 7200 is displayed in the first view 7206 of the three-dimensional environment (FIG. 7P). Movement of a person 7300 who is not a user of the computer system in the physical environment (FIG. 7Q) causes the computer system to move (e.g., change shape, deform, translate, etc.) of the user interface object 7200 (FIG. 7R).

In some embodiments, the computer system moves the first surface of the first user interface object (e.g., first user interface object 7200 in FIGS. 7P and 7R, or another user interface object, etc.) in the first view (e.g., view 7206 in FIGS. 7P and 7R, or another view) of the three-dimensional environment in accordance with values of one or more characteristics of movement (e.g., movement speed, movement direction, movement pattern, distance of the first person to the first location in the physical environment, etc.). In some embodiments, values of various characteristics of the movement of the first surface of the first user interface object are selected in accordance with characteristics of the movement of the first person (e.g., the person 7300 in FIG. 7Q, or another person that is not the user, etc.). In some embodiments, the movement of the first person also causes other changes in the appearance of the first user interface object, such as changing values of one or more display properties (e.g., color, transparency level, opacity, translucency, refractive properties, etc.) of the first surface of the first user interface object. In some embodiments, the movement of the first person in the physical environment has the first spatial relationship to the first location in the physical environment that corresponds to the first user interface object when the first person moves within a threshold range of a spatial region in the physical environment that corresponds to the spatial portion of the three-dimensional environment occupied by the first user interface object. In some embodiments, the movement of the first person in the physical environment has the first spatial relationship to the first location in the physical environment that corresponds to the first user interface object when the first person moves in a direction toward a spatial region in the physical environment that corresponds to the spatial portion of the three-dimensional environment occupied by the first user interface object.

In some embodiments, the movement of the first person in the physical environment has the first spatial relationship to the first location in the physical environment that corresponds to the first user interface object when the first person moves in a spatial region in the physical environment that is within a preset portion (e.g., central portion and/or left and right peripheral portions, etc.) of the field of view provided by the first display generation component. For example, as shown in FIG. 7Q, the person 7300 is moving at a location in the physical environment that corresponds to the position of the user interface object 7200 (e.g., passing through or behind the first surface of the first user interface object 7200 in FIG. 7Q-7R).

In some embodiments, in response to detecting the movement of the first person in the physical environment and in accordance with a determination that the movement of the first person in the physical environment does not have the first spatial relationship to the first location in the physical environment that corresponds to the first user interface object, the computer system forgoes movement of the first surface of the first user interface object in the first view of the three-dimensional environment in accordance with the movement of the first person in the physical environment. In some embodiments, forgoing movement of the first surface includes not moving the first surface in accordance with the movement of the first person, while the movement of the first person is visible in the first view of the three-dimensional environment (e.g., as part of the representation of the physical environment). In some embodiments, the movement of the first person in the physical environment does not have the first spatial relationship to the first location in the physical environment that corresponds to the first user interface object when the first person moves outside of a threshold range of a spatial region in the physical environment that corresponds to the spatial portion of the three-dimensional environment occupied by the first user interface object. In some embodiments, the movement of the first person in the physical environment does not have the first spatial relationship to the first location in the physical environment that corresponds to the first user interface object when the first person moves in a direction away from, or not toward a spatial region in the physical environment that corresponds to the spatial portion of the three-dimensional environment occupied by the first user interface object.

In some embodiments, the movement of the first person in the physical environment does not have the first spatial relationship to the first location in the physical environment that corresponds to the first user interface object when the first person moves in a spatial region in the physical environment that is outside of a preset portion (e.g., central portion and/or left and right peripheral portions, etc.) of the field of view provided by the first display generation component. In some embodiments, the movement of the first person in the physical environment does not have the first spatial relationship to the first location in the physical environment that corresponds to the first user interface object when the movement is different from the various possible ways to achieve the first spatial relationship to the first location (e.g., not in the threshold range, not in the required direction, and not in the preset portion of the field of view, etc.).

Determining whether the movement of the person in the physical environment does not have the first spatial relationship to the first location that corresponds to the first user interface object, and forgoing moving the first surface when the movement does not have the first spatial relationship (e.g., automatically determining to forgo changing the surface of an object displayed in the three-dimensional environment when the person is not moving in a portion of the physical environment that corresponds to a portion of the three-dimensional environment that displays the surface of the object), provides improved visual feedback to the user and enables an operation to be performed (e.g., automatically) when a set of conditions has been met without requiring further user input.

In some embodiments, the computer system obtains values of one or more characteristics (e.g., speed, velocity, acceleration, directionality, distance from one or more portions of the first surface of the first user interface object, etc.) of the movement of the first person in the physical environment, and the computer system determines values of one or more characteristics of the movement of the first surface of the first user interface object (e.g., the amount of stretching, bending, rippling, fluttering, translation, rotation, etc. for different parts of the first surface; how different parts of the first surface should be moving relative to one another, the speed by which the parts of the first surface should be moving, the direction by which the parts of the first surface should be moving, etc.) in accordance with the values of the one or more characteristics of the movement of the first person in the physical environment, while a location of the first person is spatially separated from the first location by a distance. In some embodiments, the values of the one or more characteristics of the movement of the first surface is used to compute a simulated energy stream and/or field, such as virtual wind, virtual electrostatic charge, virtual magnetic attraction/repulsion, virtual fluid flow, etc., that flows and/or exerts forces in the physical environment and interacts with the first surface in its path. The interaction between the simulated energy stream is optionally simulated by a virtual interaction mechanism, such as virtual friction, virtual viscosity, etc. between the virtual energy stream and the first surface. In some embodiments, characteristics of fluid dynamics and interaction between a software thin material and wind or fluid are simulated and reflected by the visual changes exhibited by the first surface in the three-dimensional environment in response to the movement of the first person in the physical environment. In some embodiments, when the first person moves at a location in the physical environment that corresponds to the position of the first user interface object, the computer system, optionally, shows movement of the first user interface object in a manner that is different from that shown when the movement of the first user is separated from the location that corresponds to the position of the first user interface object. For example, in some embodiments, characteristics of how a solid form (e.g., the solid form of the first person) interacts with a software thin material would be simulated and reflected by the visual changes exhibited by the first surface in the three-dimensional environment in response to the movement of the first person in the physical environment at a location that corresponds to the position of the first user interface object in the three-dimensional environment. For example, in FIGS. 7Q-7R, the characteristics of movement of the person 7300 affects how much the first user interface object 7200 moves and deforms in the first view 7206, in accordance with some embodiments.

Using values obtained for characteristics of movement of the person in the physical environment, and using the obtained values to determine characteristics of the movement to apply to the surface of the user interface object (e.g., and automatically displaying the movement with the determined characteristics without requiring the user to provide additional user inputs to interrupt the user's session in the three-dimensional environment (e.g., by requesting to reduce a level of immersion in the three-dimensional environment)), enables an operation to be performed (e.g., automatically) when a set of conditions has been met without requiring further user input.

In some embodiments, in response to detecting movement of the first person in the physical environment relative to the first location in the physical environment and in accordance with a determination that at least a portion of the first person in the physical environment has a second spatial relationship (e.g., within a second threshold distance, within a second threshold angle, etc.) (e.g., same as the first spatial relationship, closer than the first spatial relationship, has a location that corresponds to the position of the first surface, etc.) to the first location in the physical environment (e.g., the location that corresponds to the first position of the first surface of the first user interface object), the computer system generates a first audio output (e.g., simulating wind blowing through fabric, rustling sound, music, alert sound, etc.) (e.g., having a first set of values for parameters (e.g., amplitude, wave pattern, frequency, cycles, baseline sound, modifiers for the baseline sound, audio composition, etc.) of an audio output profile of the audio output) in conjunction with moving the first surface in the three-dimensional environment (e.g., in accordance with the movement of the first person). Generating an audio output while moving the surface of the object in the three-dimensional environment in accordance with a determination that at least a portion of the first person has a second spatial relationship to the first location (e.g., automatically providing an audio indication such that the user is aware that a portion of the person in the physical environment is at a particular position, without requiring the user to provide additional user input to interrupt the user's session in the three-dimensional environment (e.g., by requesting to reduce a level of immersion in the three-dimensional environment)), provides improved audio feedback to the user and enables an operation to be performed (e.g., automatically) when a set of conditions has been met without requiring further user input.

In some embodiments, while displaying the first view of the three-dimensional environment, the computer system detects movement of at least a portion of a second person (e.g., the user 7002 in FIG. 7Q) in the physical environment, where the second person is a user of the one or more first input devices in communication with the computer system. For example, the second person is the user who is primarily using the first display generation component and providing inputs to update the user interface displayed by the first display generation component. In some embodiments, the computer system recognizes the second person as the user of the computer system based on a spatial relationship between the second person and the display generation component (e.g., the second user is wearing the HMD, facing the display side of the display generation component, holding a controller of the computer system, etc.) in the physical environment. In some embodiments, the computer system has recognized and accepts inputs from the second person to proactively control the content displayed in the three-dimensional environment prior to the movement of the second person. In response to detecting the movement of at least the portion of the second person in the physical environment and in accordance with a determination that the at least the portion of the second person in the physical environment has the second spatial relationship (e.g., within a second threshold distance, within a second threshold angle, etc.) (e.g., same as the first spatial relationship, closer than the first spatial relationship, has a location that corresponds to the position of the first surface, etc.) to the first location in the physical environment (e.g., the location that corresponds to the first position of the first surface of the first user interface object), the computer system generates a second audio output (e.g., simulating wind blowing through fabric, rustling sound, music, alert sound, etc.) (e.g., having a second set of values for parameters (e.g., amplitude, wave pattern, frequency, cycles, baseline sound, modifiers for the baseline sound, audio composition, etc.) of an audio output profile of the audio output) in conjunction with moving the first surface in the three-dimensional environment (e.g., in accordance with the movement of the second person), where the second audio output is different from the first audio output in at least one of one or more characteristics (e.g., amplitude, wave pattern, frequency, cycles, baseline sound, modifiers for the baseline sound, audio composition, etc.) of the first audio output and the second audio output.

Generating a second audio output in accordance with at least a portion of the user moving in the physical environment, and in response to the user moving, in accordance with a determination that at least a portion of user has a second spatial relationship to the first location, that is distinct from the first audio output generated in accordance with at least a portion of the person (e.g., not the user) moving in the physical environment having the second spatial relationship to the first location (e.g., automatically generating distinct audio indications based on whether the user (e.g., or another person) is moving), provides improved audio feedback.

In some embodiments, in response to detecting the movement of the first person (e.g., person 7300 in FIGS. 7Q-7R) in the physical environment and in accordance with the determination that the movement of the first person in the physical environment has a third spatial relationship (e.g., the location of the first person corresponds to a virtual position that is behind the first surface, relative to the viewpoint of the currently displayed view of the three-dimensional environment, is within a threshold range of the first surface, etc.) to the first location in the physical environment that corresponds to the first position of the first surface of the first user interface object, the computer system changes a first display property (e.g., increasing a translucency, reducing opacity, making more transparent, etc.) of the first surface of the first user interface object. In some embodiments, the first surface reveals (e.g., partially, completely, directly without modification, with some modifications (e.g., blurring, darkening, etc.), etc.) a representation of the first person and/or physical environment at positions behind the first surface. In some embodiments, the computer system increases the translucency of the first surface in accordance with a determination that at least a portion of the first person has a virtual position that is behind the first surface relative to the viewpoint of the currently displayed view of the three-dimensional environment. In some embodiments, the entirety of the first surface, including portions that are not between the virtual position of the first person and the viewpoint, becomes translucent or partially translucent, so that the portion of the physical environment that is previously obscured by the first surface, as well as the first person, becomes visible or partially visible through the first surface. In some embodiments, only a sub-portion of the first surface (e.g., including the portion that is between the viewpoint and the virtual position of the first person, and excluding portions that are not between the virtual position of the first person and the viewpoint) becomes translucent, so that only the first person, and not the portion of the physical environment that is previously obscured by the first surface, becomes visible through the first surface. In some embodiments, only a sub-portion of the first surface (e.g., including the portion that is between the viewpoint and the virtual position of a preset portion of the first person, and excluding portions that are not between the virtual position of the first person and the viewpoint and portions that is between the viewpoint and virtual position of other non-preset portions of the first person) becomes translucent, so that only the preset portion of the first person, and not the portion of the physical environment that is previously obscured by the first surface or the other non-preset portions of the first person, becomes visible through the first surface. This is illustrated in FIGS. 7Q-7R, where the first surface of the first user interface object 7200 becomes translucent and reveals the presence and movement of the person 7300 in a portion of the first surface of which a corresponding location in the physical environment is between the user 7002 and the person 7300, in accordance with some embodiments.

Changing a display property of the surface of the user interface object in the three-dimensional environment in accordance with a determination that the movement of the person in the physical environment has a third spatial relationship to the first location in the physical environment corresponding to the position of the surface in the three-dimensional environment (e.g., automatically displaying the surface with a greater amount of transparency while the person is at a position that corresponds to the position of the surface, such that the user has an improved view of the person in the physical environment without requiring the user to provide additional user input to interrupt the user's session in the three-dimensional environment (e.g., by requesting to reduce a level of immersion in the three-dimensional environment to view the person)), provides improved visual feedback to the user and enables an operation to be performed (e.g., automatically) when a set of conditions has been met without requiring further user input.

In some embodiments, changing the first display property of the first surface of the first user interface object includes changing the first display property of a first portion of the first surface relative to a second portion of the first surface. Changing a display property of a first portion of the surface of the user interface object in the three-dimensional environment, relative to a second portion of the surface of the user interface object, in accordance with a determination that the movement of the person in the physical environment has a third spatial relationship to the first location in the physical environment corresponding to the position of the surface in the three-dimensional environment (e.g., automatically displaying a portion, less than all, of the surface with a greater amount of transparency while the person is at a position that corresponds to the position of the (e.g., portion of the) surface, such that the user has an improved view of the person in the physical environment without distracting the user by changing the display property of the entire surface, and without requiring the user to provide additional user input to interrupt the user's session in the three-dimensional environment (e.g., by requesting to reduce a level of immersion in the three-dimensional environment to view the person)), provides improved visual feedback to the user and enables an operation to be performed (e.g., automatically) when a set of conditions has been met without requiring further user input.

In some embodiments, changing the first display property of the first portion of the first surface relative to the second portion of the first surface includes changing the first display property of the first portion of the first surface relative to the second portion of the first surface by a first amount, and changing the first display property of a third portion of the first surface that is between the first portion and the second portion of the first surface by a second amount that is smaller than the first amount. For example, in some embodiments, the translucency of the first surface is gradually increased from the second portion to the first portion of the first surface, where the first portion is a portion of the first surface that is between the virtual position of a preset portion (e.g., face, head and upper body, etc.) of the first person and the viewpoint. Changing a display property for different portions of the surface displayed in the three-dimensional environment by different amounts (e.g., to display a gradual transition between the portions of the surface with display properties that have been changed by a larger amount than the display properties of other portions of the surface), makes it easier for the user to view the changed portions of the surface relative to portions of the surface that have not been changed (e.g., as much)(e.g., without interrupting the user's view of the entire surface), thereby providing improved visual feedback.

In some embodiments, in response to detecting the movement of the first person in the physical environment relative to the first location in the physical environment and in accordance with a determination that the movement of the first person in the physical environment does not have the third spatial relationship (e.g., the location of the first person corresponds to a virtual position that is not behind the first surface, relative to the viewpoint of the currently displayed view of the three-dimensional environment, is not within a threshold range of the first surface, etc.) to the first location in the physical environment that corresponds to the first position of the first surface of the first user interface object, the computer system restores the first display property (e.g., to the state shown in FIG. 7P again, optionally with a different portion of dynamic content that has been progressing on the first surface before the detection of presence and/or movement of the person 7300) (e.g., reducing the increased translucency, increasing the reduced opacity, no longer making transparent, etc.) of the first surface of the first user interface object (e.g., the first surface no longer reveals the representation of the first person and/or physical environment at positions behind the first surface). Restoring a display property of the surface in accordance with a determination that the person in the physical environment no longer has the third spatial relationship to the first location in the physical environment corresponding to the position of the surface (e.g., automatically redisplaying the surface in the three-dimensional environment without modification, after the person is no longer at the position, without requiring the user to interrupt, and then request to resume, the user's session in the three-dimensional environment (e.g., by requesting to increase a level of immersion in the three-dimensional environment after the person is no longer at the position)), provides real-time visual feedback without requiring additional user input.

In some embodiments, in response to detecting the movement of the first person (e.g., person 7300 in FIGS. 7Q-7R, another person that is not a user of the computer system, etc.) in the physical environment relative to the first location in the physical environment: in accordance with a determination that a location of a first portion of the first person has the third spatial relationship to the first location while a location of a second portion of the first person does not have the third spatial relationship to the first location (e.g., the location of the first portion, but not the second portion, of the first person corresponds to a virtual position that is behind the first surface, relative to the viewpoint of the currently displayed view of the three-dimensional environment, is within a threshold range of the first surface, etc.), the computer system changes the first display property of the first surface of the first user interface object includes changing the first display property of the first portion of the first surface without changing the first display property of the second portion of the first surface; and in accordance with a determination that an updated location of the first portion of the first person (e.g., as a result of the movement of the first person) does not have the third spatial relationship to the first location while an updated location of the second portion of the first person (e.g., as a result of the movement of the first person) has the third spatial relationship to the first location (e.g., the location of the second portion, but not the first portion, of the first person corresponds to a virtual position that is behind the first surface, relative to the viewpoint of the currently displayed view of the three-dimensional environment, is within a threshold range of the first surface, etc.), the computer system changes the first display property of the first surface of the first user interface object includes restoring changes made to the first display property of the first portion of the first surface; and changing the first display property of the second portion of the first surface.

Changing a display property of a first portion of the surface in accordance with a determination that the person in the physical environment has the third spatial relationship to the first location in the physical environment corresponding to the position of the surface, and restoring changes made to the display property of the first portion of the surface while changing the display property of a second portion of the surface in accordance with the person no longer having the third spatial relationship to the first location (e.g., automatically updating different portions of the surface to appear with the modified display property as the person moves to different positions in the physical environment, such that a respective portion of the surface is only changed based on a current respective position of the person (e.g., and removing the previous change to another portion of the surface when the person is no longer at the previous respective position), and such that the user is enabled to stay aware of a current position of the person, without requiring the user to interrupt the user's session in the three-dimensional environment (e.g., by requesting to decrease a level of immersion in the three-dimensional environment)), provides real-time visual feedback to the user and enables an operation to be performed (e.g., automatically) when a set of conditions has been met without requiring further user input.

In some embodiments, in response to detecting the movement of the first person (e.g., person 7300 in FIGS. 7Q-7R, another person that is not a user of the computer system, etc.) in the physical environment and in accordance with the determination that the movement of the first person in the physical environment has the first spatial relationship (e.g., within a first threshold distance, within a first threshold angle, etc.) to the first location in the physical environment that corresponds to the first user interface object, the computer system modifies one or more display properties (e.g., color, brightness, transparency, opacity, optical properties, etc.) of the first surface in accordance with an appearance (e.g., colors, shape, brightness, etc.) of the first person while the first person is at a location that corresponds to a position behind the first surface of the first user interface object relative to a viewpoint of the first view of the three-dimensional environment. In some embodiments, the virtual position of the second person is behind the first surface, but the first surface allows visual characteristics of the second person to be visible or reflected through changes of the display properties of the first surface. This is illustrated in FIG. 7R, where the appearance of the person 7300 is reflected in a portion of the first surface of the first user interface object 7200, in accordance with some embodiments. In some embodiments, when the first person moves in a location that corresponds to a position behind the first surface relative to the viewpoint of the currently displayed view of the three-dimensional environment, the first surface becomes more translucent to let the visual characteristics of the first person be visible fully or to a limited extent through the translucent first surface. In some embodiments, the changes in the display properties of the first surface also takes into account of changes in the position, shape, and/or spatial extent of the first surface (e.g., affecting the simulated optical path length, refractive index, color, etc. of the first surface) as a result of the movement of the first person. Modifying display properties of the surface in accordance with an appearance of the first person while the first person is at a location that corresponds to a position behind the surface relative to a viewpoint of the first view of the three-dimensional environment (e.g., and automatically revealing the person (e.g., or a representation of the person) at the location allows the user to become aware of an identity of the person (e.g., based on the appearance of the person), without requiring the user to interrupt the user's session in the three-dimensional environment (e.g., by requesting to decrease a level of immersion in the three-dimensional environment to view the person)), provides real-time visual feedback to the user and enables an operation to be performed (e.g., automatically) when a set of conditions has been met without requiring further user input.

In some embodiments, modifying the one or more display properties (e.g., color, brightness, transparency, opacity, optical properties, etc.) of the first surface in accordance with the appearance (e.g., colors, shape, brightness, etc.) of the first person includes modifying the one or more display properties (e.g., color, brightness, transparency, opacity, optical properties, etc.) of a first portion of the first surface in accordance with the appearance (e.g., colors, shape, brightness, etc.) of the first person, without modifying the one or more display properties of a second portion of the first surface in accordance with the appearance of the first person. In some embodiments, the computer system identifies different portions (e.g., head, torso, legs, arms, etc.) of the first person that have corresponding virtual positions behind the first surface of the first user interface object in the three-dimensional environment, and makes a portion of the first surface that is in front of the virtual position of a first preset portion (e.g., head, upper body, arms, etc.) of the first person more translucent to allow the first preset portion to be visible to the user, while maintaining the existing translucency level of other portions of the first surface (e.g., portions that are in front of the virtual positions of other portions of the first person and portions that are not in front of the virtual position of the first person). In some embodiments, the computer system changes the display properties of a different portion of the first surface and restores the display properties of the first portion of the first surface, in accordance with a determination that the first person has moved away from the virtual position behind the first portion of the first surface, and reach to a virtual position behind the different portion of the first surface. Modifying display properties of a first portion of the surface in accordance with an appearance of the first person while the first person is at a location that corresponds to a position behind the surface relative to a viewpoint of the first view of the three-dimensional environment, without modifying the display properties of a second portion of the surface (e.g., and automatically revealing the person (e.g., or a representation of the person) at the location allows the user to become aware of an identity of the person (e.g., based on the appearance of the person), without changing display of the entire surface (e.g., and without interrupting the user's current session), and without requiring the user to request to decrease a level of immersion in the three-dimensional environment to view the person), provides real-time visual feedback to the user and enables an operation to be performed (e.g., automatically) when a set of conditions has been met without requiring further user input.

In some embodiments, modifying the one or more display properties (e.g., color, brightness, transparency, opacity, optical properties, etc.) of the first surface in accordance with the appearance (e.g., colors, shape, brightness, etc.) of the first person includes modifying the one or more display properties (e.g., color, brightness, transparency, opacity, optical properties, etc.) of the first portion of the first surface in accordance with the appearance (e.g., colors, shape, brightness, etc.) of the first person by a first amount, and modifying the one or more display properties (e.g., color, brightness, transparency, opacity, optical properties, etc.) of a third portion of the first surface in accordance with the appearance (e.g., colors, shape, brightness, etc.) of the first person by a second amount, where the third portion of the first surface is between the first portion and the second portion of the first surface, and the second amount is less than the first amount. Modifying one or more display properties for different portions of the surface displayed in the three-dimensional environment by different amounts (e.g., to display a gradual transition between the portions of the surface with display properties that have been changed by a larger amount than the display properties of other portions of the surface), making it easier for the user to view the changed portions of the surface relative to portions of the surface that have not been changed (e.g., as much)(e.g., without interrupting the user's view of the entire surface), provides improved visual feedback.

In some embodiments, the first surface of the first user interface object includes one or more selectable user interface objects. In some embodiments, the one or more selectable user interface objects include selectable avatars, selectable menu items, selectable device controls, selectable content items, slider controls, buttons, a virtual three-dimensional object, a control, a control panel that includes multiple controls corresponding to different functions or operations, an information item, a media item, etc. In some embodiments, a respective selectable user interface object, when activated by a user input in accordance with respective activation criteria, causes performance of an operation that causes changes (e.g., cause display of additional virtual content that was not previously displayed, changes a device function, changes an output mode, changes currently displayed content, scrolls the currently displayed content, etc.) in the three-dimensional environment or in the physical environment that are external to the respective user interface object. Providing one or more selectable user interface objects on the surface of the user interface object (e.g., and maintaining the selectable user interface objects even as display properties of the surface change), provides additional control options to the user in the user's view of the three-dimensional environment, without requiring the user to navigate through complex menu hierarchies, thereby providing improved visual feedback.

In some embodiments, the first surface of the first user interface (e.g., user interface object 7200 in FIGS. 7P and 7R, another user interface object, etc.) includes media content. In some embodiments, the media content includes photos, videos, holographic representations, avatars, etc. where some embodiments, the media content are displayed in two or three dimensions via the first surface. Providing media content that is displayed on the surface of the user interface object (e.g., and maintaining display of the media content even as display properties of the surface change), allows the user to continue consuming the media content, while also being aware of a person moving in the physical environment, without requiring the user input to pause or interrupt the media content, thereby providing improved visual feedback without requiring additional user input.

In some embodiments, in response to detecting the movement of the first person in the physical environment and after moving the first surface of the first user interface object in the first view of the three-dimensional environment in accordance with the movement of the first person in the physical environment, in accordance with a determination that the movement of the first person in the physical environment ceases to have the first spatial relationship (e.g., no longer within a first threshold distance, no longer within a first threshold angle, out of the field of view, etc.) to the first location in the physical environment that corresponds to the first user interface object, the computer system restores the first surface of the first user interface object in the first view of the three-dimensional environment. For example, the user interface object is optionally restored to the state shown in FIG. 7P, in accordance with some embodiments. In some embodiments, restoring the first surface of the first user interface object in the first view of the three-dimensional environment includes ceasing to move the first surface of the first user interface object, returning the first surface to its original position and shape before the movement was stated, restoring any changes to the display properties of the first surface that were made in response to the movement of the first person, etc. In some embodiments, the computer system displays an animated transition of the first surface of the first user interface object from a moved state to an initial (e.g., unmoved) state. In some embodiments, where the first surface of the first user interface includes media content in a first state (e.g., a first frame of a movie, a first photo in a slideshow, etc.), restoring the first surface of the first user interface object includes restoring the media content in the first surface to a second state different from the first state (e.g., to a second frame of the movie, a second photo in the slideshow, etc.). Restoring the surface of the user interface object after moving (e.g., changing display properties of) the surface in accordance with movement of the person in the physical environment, in accordance with the person ceasing to have the first spatial relationship to the first location (e.g., to redisplay the surface as it was displayed before detecting movement of the person at the first location, such that the user's view is updated, in real-time, for the user to be fully immersed into the three-dimensional environment, after the person no longer has the first spatial relationship to the first location), provides improved visual feedback.

In some embodiments, in response to detecting the movement of the first person in the physical environment and after moving the first surface of the first user interface object in the first view of the three-dimensional environment in accordance with the movement of the first person in the physical environment, in accordance with a determination that the movement of the first person in the physical environment ceases to have the first spatial relationship (e.g., no longer within a first threshold distance, no longer within a first threshold angle, out of the field of view, etc.) to the first location in the physical environment that corresponds to the first user interface object, the computer system continues movement of the first surface over a first period of time with decreasing magnitude until the first surface is restored to a state before movement of the first surface in accordance with the movement of the first person was started. For example, after the first person has moved past the region at or near the virtual position of the first user interface object, or moved out of the field of view of the display generation component, the computer system gradually reduces the movement of the first surface (e.g., simulating gradually dissipation of the virtual kinetic energy of the first surface over time), until eventually the first surface is restored to its original shape and position it had before the movement of the first surface was started in response to the movement of the first person. For example, the first surface of the first user interface object 7200 gradually returns to the state shown in FIG. 7P, after the person 7300 has left the scene 105, in accordance with some embodiments. Continuing to move the surface of the user interface object for a period of time after moving (e.g., changing display properties of) the surface in accordance with movement of the person in the physical environment, in accordance with the person ceasing to have the first spatial relationship to the first location (e.g., to continue displaying the surface with a ripple effect, even after detecting movement of the person at the first location, and updating the display of the surface, in real-time, to animate the surface in the three-dimensional environment), provides improved visual feedback.

In some embodiments, moving (e.g., translating, rotating, and/or deforming, etc.) the first surface of the first user interface object in the first view of the three-dimensional environment in accordance with the movement of the first person in the physical environment includes: in accordance with a determination that a current location of the first person is behind the first location, relative to a user of the computer system (e.g., the position of the first surface is between the viewpoint of the currently displayed view of the three-dimensional environment and the virtual position of the first person), moving the first surface in a first spatial portion of the three-dimensional environment that corresponds to a first spatial region between the first person and the user of the computer system in the physical environment; and in accordance with a determination that a current location of the first person is in front of the first location, relative to a user of the computer system (e.g., the position of the first surface is behind the virtual position of the first person), moving the first surface in a second spatial portion of the three-dimensional environment that corresponds to a second spatial region behind the first person relative to the user of the computer system in the physical environment. Moving the surface in a first spatial portion of the three-dimensional environment between the person and the user in accordance with a determination that a location of the person is behind the first location, and moving the first surface in a second spatial portion of the three-dimensional environment behind the person relative to the user in accordance with a determination that the location of the person is in front of the first location (e.g., automatically determining a location of the user relative to other displayed virtual content, and automatically displaying the surface as moving in front of the person or behind the other person based on the person's location), provides improved visual feedback and enables an operation to be performed (e.g., automatically) when a set of conditions has been met without requiring further user input.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, and 12000) are also applicable in an analogous manner to method 11000 described above with respect to FIG. 11. For example, the gestures, gaze inputs, physical objects, user interface objects, controls, movements, criteria, three-dimensional environment, display generation component, surface, representation of physical object, virtual objects, and/or animations described above with reference to method 11000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, and 12000). For brevity, these details are not repeated here.

Figure 12:
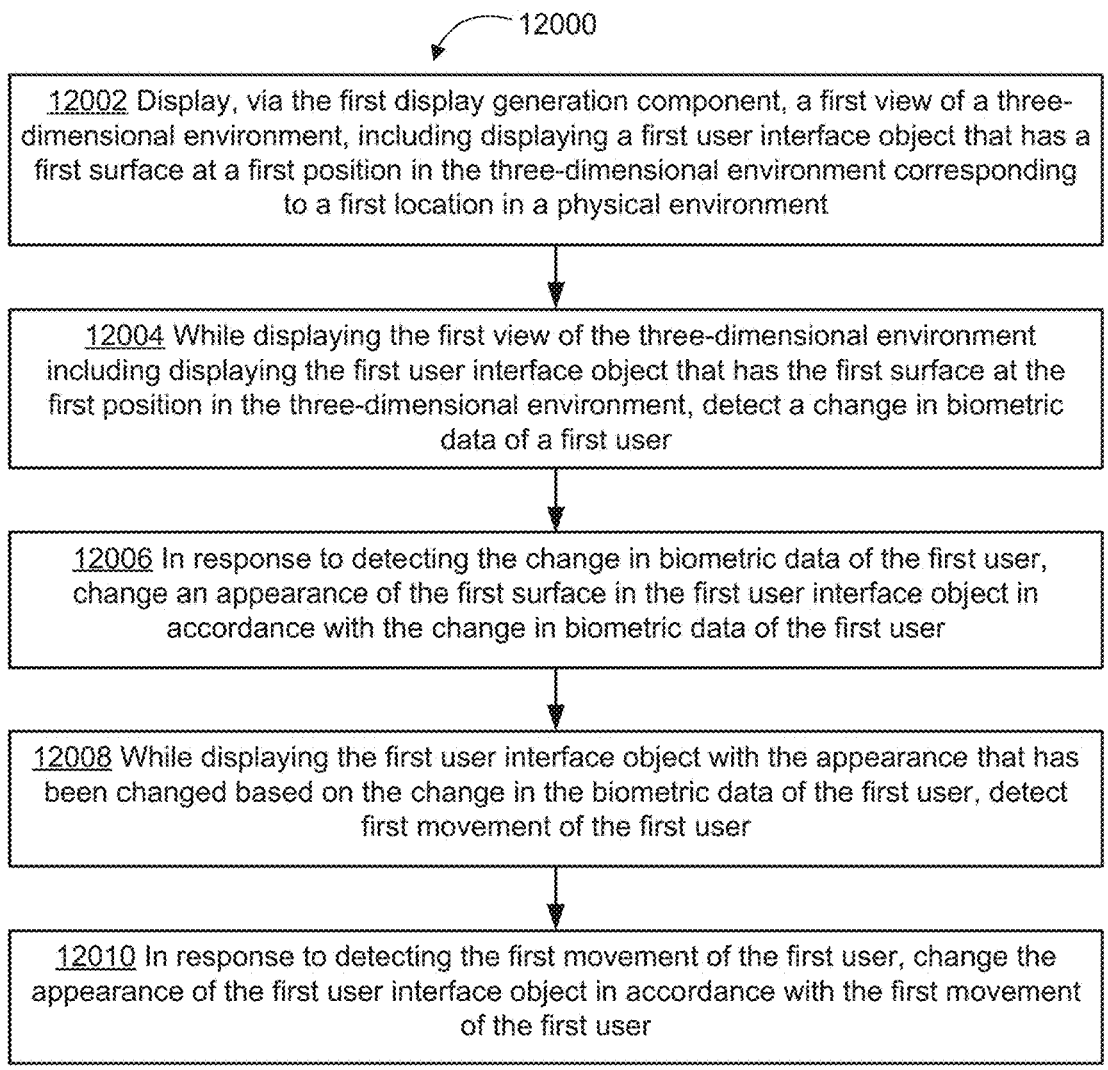
FIG. 12 is a flowchart of a method of altering an appearance of a surface of a user interface object in a three-dimensional environment in response to changes of biometric data of a user and movement of the user, in accordance with some embodiments.

FIG. 12 is a flowchart of a method 12000 of altering an appearance of a surface of a user interface object in a three-dimensional environment in response to changes of biometric data of a user and movement of the user, in accordance with some embodiments.

In some embodiments, the method 12000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In some embodiments, the method 12000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, etc.). In some embodiments, the computer system is an integrated device with one or more processors and memory enclosed in the same housing as the first display generation component and at least some of the one or more input devices. In some embodiments, the computer system includes a computing component that includes one or more processors and memory that is separate from the first display generation component and/or the one or more input devices. In some embodiments, the first display generation component and the one or more input devices are integrated and enclosed in the same housing.

The method 12000 relates to automatically displaying virtual materials with a visual appearance that changes, in real-time, in accordance with biometric measurements and physical movement of the user. Automatically changing display of virtual materials in a three-dimensional environment, in real-time, based on the user's current state (e.g., including the user's biometric measurements and the user's physical movement), as automatically detected by the computer system, without requiring the user to input user data related to the user's current state, provides real-time visual feedback as the user changes the user's state, without requiring additional input from the user. Providing improved visual feedback to the user and performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In the method 12000, the computer system displays (12002), via the first display generation component, a first view (e.g., view 7206 in FIG. 7T, or another view, etc.) of a three-dimensional environment (e.g., a first computer-generated experience, a virtual environment, an augmented reality environment, a mixed reality environment, etc.), including displaying a first user interface object (e.g., user interface object 7200 in FIG. 7T, or another user interface object, etc.) (e.g., a virtual user interface object that does not correspond to a physical object in the physical environment, a computer-generated user interface object, a media item, a virtual three-dimensional object, a virtual surface, virtual scenery, a virtual screen that displays virtual content, a user interface object that includes controls that, when activated, cause performance of operations in the three-dimensional environment, etc.) that has a first surface (e.g., a representation of a screen, curtain, fabric, waves, window, leaf, flame, etc.) at a first position in the three-dimensional environment corresponding to a first location in a physical environment (e.g., in a first portion of the first view of the three-dimensional environment, with a first spatial relationship to representations of users and/or virtual objects in the three-dimensional environment). In the method 12000, while displaying the first view (e.g., view 7206 in FIGS. 7T-7V, or another view, etc.) of the three-dimensional environment including displaying the first user interface object that has the first surface at the first position in the three-dimensional environment, the computer system detects (12004) a change in biometric data of a first user (e.g., as shown in FIGS. 7T-7U, a change in biometric data corresponding to the user 7002 is detected, as indicated by device 7500). In some embodiments, the biometric data includes vital statistics of a first user, such as breathing rate, breathing volume, heart rate, blood pressure, skin temperature, body temperature (e.g., skin temperature, core temperature), serum concentration of certain chemical, medication, hormones, etc., brain waves, focus level, pupil size, metabolic rate, blood sugar level, amount of movement, stress level, one or more types of biometric data that may vary over time during a user's engagement with the three-dimensional environment, one or more types of biometric data that may vary through the user's own actions (e.g., meditation, breathing pattern change, exercise, etc., as opposed to direct interaction with user interface elements or controls provided by the computer system) during the user's engagement with three-dimensional environment, one or more types of composite metrics of multiple types of biometric data that correspond to a user's mood, happiness, and/or stress level, etc., etc. In some embodiments, the biometric data of the first user is obtained from a respective user input device (e.g., a smart watch, a fitness tracker, a health monitoring device, a wearable device, a camera, etc.) connected to or pointed at the first user. In the method 12000, in response to detecting the change in biometric data of the first user, the computer system changes (12006) an appearance (e.g., translating, rotating, deforming (e.g., bending, twisting, stretching, compressing, warping, etc.), modifying one or more display properties (e.g., shape, size, opacity, color saturation, luminescence, brightness, etc.), etc.) of the first surface in the first user interface object in accordance with the change in biometric data of the first user (e.g., the values of the vital statistics of the first user are used to determine the types, amounts, timing, and/or locations, etc. of modifications made to the appearance of the first surface). For example, as shown in FIGS. 7T-7U, a change in biometric data corresponding to the user 7002 causes the computer system to change the appearance of the user interface object 7200. In the method 12000, while displaying the first user interface object with the appearance that has been changed based on the change in the biometric data of the first user, the computer system detects (12008) first movement (e.g., movement 7061 in FIG. 7V, or another movement such as those shown in FIGS. 7A-7N, etc.) of the first user (e.g., movement of a user's arm, head, or other body part in the physical environment, movement of the first user as a whole, etc.). In the method 12000, in response to detecting the first movement of the first user, the computer system changes (12010) the appearance of the first user interface object in accordance with the first movement of the first user (optionally, in some embodiments, the change in appearance of the first user interface object includes both a first change due to the change in biometric data of the first user and a second change due to the first movement of the first user). For example, as shown in FIG. 7V, the computer system changes the appearance of the user interface object 7200 in response to the movement 7061 of the user's hand 7102. In some embodiments, the change in appearance is aggregated based on the change in appearance caused by the change in biometric data and the change caused by the movement of the user's hand.

These features are illustrated, for example, in FIGS. 7S-7V, where a first view 7206 of a three-dimensional environment is displayed. A user interface object 7200 is displayed in the first view 7206 of the three-dimensional environment (FIG. 7T). Changes in the biometric data of the user cause the computer system to alter the appearance (e.g., change shape, move, change translucency, etc.) of the user interface object 7200 in FIG. 7T. Movement 7061 of the user's hand 7102 causes the computer system to alter the appearance of the user interface object 7200 as well, as shown in FIG. 7V, which may be followed and aggregated to the changes in appearance caused by the change in biometric data, in accordance with some embodiments.

In some embodiments, the biometric data of the first user comprises first data corresponding to breathing of the first user (e.g., a vital statistic such as breathing rate, breathing volume, blood oxygenation etc.). In some embodiments, changing the appearance (e.g., translating, rotating, deforming (e.g., bending, twisting, stretching, compressing, warping, etc.), modifying one or more display properties (e.g., shape, size, opacity, color saturation, luminescence, brightness, etc.), etc.) of the first surface in the first user interface object in accordance with the change in biometric data of the first user includes changing the appearance of the first surface with magnitudes and rhythms that correspond to the magnitudes and rhythms of breathing of the first user. Detecting a change in biometric data, that includes data about the user's breathing, and changing an appearance of the first user interface object in accordance with the change in the user's breathing (e.g., updating, as the computer system automatically detects a change in the user's breathing, visual properties of a displayed user interface object, in real-time, without requiring the user to manually input data about the user's breathing), provides improved visual feedback and enables an operation to be performed (e.g., automatically) when a set of conditions has been met.

In some embodiments, while displaying the first view (e.g., view 7206 in FIGS. 7Q-7R, the view 7206 in FIGS. 7T-7V, another view, etc.) of the three-dimensional environment including displaying the first user interface object that has the first surface at the first position in a three-dimensional environment, the computer system detects movement of a first person (e.g., person 7300, or another person) in the physical environment where the first person is not the first user (e.g., user 7002 in FIGS. 7Q-7R, and 7T-7V) of the computer system. For example, the first person is not a user of the one or more input devices in communication with the computer system. The first person is different from a person (e.g., the first user) who is primarily using the first display generation component and providing inputs to update the user interface displayed by the first display generation component. In some embodiments, the computer system recognizes the first person as an object of significance (e.g., a human, a person of significance to the first user of the first display generation component, etc.) in the physical environment, but does not recognize or accept inputs from the first person to proactively control the content displayed in the three-dimensional environment. The first person is not an active participant of a computer-facilitated shared experience that is provided by the first display generation component, and does not alter the shared experience via another device in communication with the computer system. In response to detecting the movement of the first person in the physical environment relative to the first location in the physical environment, in accordance with a determination that the movement of the first person in the physical environment has a first spatial relationship (e.g., within a first threshold distance, within a first threshold angle, etc.) to the first location in the physical environment that corresponds to the first user interface object, the computer system moves (e.g., translating, rotating, and/or deforming, etc.) the first surface of the first user interface object in the first view of the three-dimensional environment in accordance with the movement of the first person in the physical environment. This is illustrated in FIGS. 7Q-7R, for example. In some embodiments, the movement of the first surface of the user interface object 7200 due to different causes (e.g., biometric data of the user 7002, movement of the user 7002, movement of the person 7300, etc.) are aggregated in the currently displayed view of the three-dimensional environment. In some embodiments, the computer system moves the first surface of the first user interface object in the first view of the three-dimensional environment in accordance with values of one or more characteristics of movement (e.g., movement speed, movement direction, movement pattern, distance of the first person to the first location in the physical environment, etc.). In some embodiments, values of various characteristics of the movement of the first surface of the first user interface object are selected in accordance with characteristics of the movement of the first person. In some embodiments, the movement of the first person also causes other changes in the appearance of the first user interface object, such as changing values of one or more display properties (e.g., color, transparency level, opacity, translucency, refractive properties, etc.) of the first surface of the first user interface object. In some embodiments, the movement of the first person in the physical environment has the first spatial relationship to the first location in the physical environment that corresponds to the first user interface object when the first person moves within a threshold range of a spatial region in the physical environment that corresponds to the spatial portion of the three-dimensional environment occupied by the first user interface object. In some embodiments, the movement of the first person in the physical environment has the first spatial relationship to the first location in the physical environment that corresponds to the first user interface object when the first person moves in a direction toward a spatial region in the physical environment that corresponds to the spatial portion of the three-dimensional environment occupied by the first user interface object.

In some embodiments, the movement of the first person (e.g., person 7300, or another person) in the physical environment has the first spatial relationship to the first location in the physical environment that corresponds to the first user interface object (e.g., user interface object 7200 in FIGS. 7P, 7R, 7T-7V, etc.) when the first person moves in a spatial region in the physical environment that is within a preset portion (e.g., central portion and/or left and right peripheral portions, etc.) of the field of view provided by the first display generation component. In some embodiments, the movement of the first surface of the first user interface object in accordance with the movement of the first person makes the first person more visible (e.g., by moving away from the virtual position of the first person, by becoming more transparent or translucent, etc.)(e.g., as illustrated in FIG. 7R). Detecting movement of a person in the physical environment, other than the user, and in accordance with a determination that the movement of the person has a first spatial relationship to the first location in the physical environment that corresponds to the first user interface object, automatically moving the surface of the first user interface object in accordance with the movement of the person (e.g., automatically modifying the surface of the object, such that the user is enabled to be aware of the person (e.g., and the person's position) in the physical environment, without requiring the user to provide additional user input to interrupt the user's session in the three-dimensional environment (e.g., by requesting to reduce a level of immersion in the three-dimensional environment to view the person)), provides improved visual feedback to the user and enables an operation to be performed (e.g., automatically) when a set of conditions has been met without requiring further user input.

In some embodiments, while displaying the first view (e.g., view 7206 in FIGS. 7T-7V, or another view, etc.) of the three-dimensional environment including displaying the first user interface object that has the first surface at the first position in the three-dimensional environment, the computer system detects a change in environmental data of a physical environment (e.g., environmental data of the physical environment surrounding the first user and the display generation component, weather conditions, air conditioning, fans, air pressure, moisture level, brightness level, ambient lighting, etc.), and in response to detecting the change in environmental data of the physical environment, the computer system changes the appearance (e.g., translating, rotating, deforming (e.g., bending, twisting, stretching, compressing, warping, etc.), modifying one or more display properties (e.g., shape, size, opacity, color saturation, luminescence, brightness, etc.), etc.) of the first user interface object in accordance with the change in environmental data of the physical environment (e.g., the values of the environmental data are used to determine the types, amounts, timing, and/or locations, etc. of modifications made to the appearance of the first surface). Optionally, in some embodiments, the change in appearance of the first user interface object includes both a first change due to the change in biometric data of the first user and second change due to the change in environmental data of the physical environment. In some embodiments, the change in appearance of the first user interface object includes both a first change due to the change in biometric data of the first user, a second change due to the first moment of the first user, and a third change due to the change in environmental data of the physical environment. Detecting a change in environmental data of the physical environment, and in response to a change in the environmental data, automatically changing the appearance of the first user interface object in accordance the change in environmental data (e.g., automatically updating the user interface object to reflect changes in the physical environment, such that the user is enabled to be aware of current environmental conditions in the physical environment, without requiring the user to provide additional user input to interrupt the user's session in the three-dimensional environment (e.g., by requesting to reduce a level of immersion in the three-dimensional environment to view the current environmental conditions)), provides improved visual feedback to the user and enables an operation to be performed (e.g., automatically) when a set of conditions has been met without requiring further user input.

In some embodiments, displaying the first view of the three-dimensional environment includes displaying a representation of a physical environment (e.g., representations of the scene 105, including representations 7004', 6006', 7008' of walls, floor, and representations of physical objects, etc.) surrounding the first user (e.g., user 7002), and displaying one or more virtual objects, including the first user interface object, at respective positions in the three-dimensional environment relative to virtual positions of one or more portions of the physical environment in the first view of the three-dimensional environment. In some embodiments, the view of the physical environment is augmented with virtual elements generated by the computer system that are displaying in the first view of the three-dimensional environment. In some embodiments, the first surface in the first user interface objects overlays, replaces display of, or blocks a view of, etc. a representation of a portion of the physical environment (e.g., a single continuous portion, or multiple separate, disjointed portions, etc.) that would have been in the first user's field of view if the first surface were not displayed. In some embodiments, at least some of the virtual elements displayed in the three-dimensional environment have positions in the three-dimensional environment that correspond to locations and object in the physical environment e.g., the virtual content is integrated with the physical environment in the view of the computer-generated environment). In some embodiments, the representation of the physical environment is a view of the physical environment through a transparent or semi-transparent portion of the display generation component, the first user interface object is projected onto a first location in the physical environment that corresponds to the first position in the three-dimensional environment (which is seen through the transparent or semi-transparent portion of the display generation component). In some embodiments, the representation of the physical environment is a view of the physical environment through a transparent or semi-transparent portion of the display generation component, the first user interface object is displayed at a first position in the three-dimensional environment by the display generation component and blocks the view of a first location in the physical environment that corresponds to the first position in the three-dimensional environment. In some embodiments, the representation of the physical environment is a camera view of the physical environment, and the first user interface object is projected onto a first location in the physical environment that corresponds to the first position in the three-dimensional environment (which is shown in the camera view of the physical environment). In some embodiments, the representation of the physical environment is a camera view of the physical environment, the first user interface object is displayed at a first position in the three-dimensional environment by the display generation component and replaces display of the camera view of a first location in the physical environment that corresponds to the first position in the three-dimensional environment.

Displaying at representation of a physical environment that is surrounding the user, and concurrently displaying virtual objects relative to portions of the physical environment (e.g., displaying virtual objects in a three-dimensional environment that includes a representation of a portion of the physical environment (e.g., in an AR environment), that is updated in real-time with features of the physical environment, without interrupting the user's AR session), provides improved visual feedback to the user.

In some embodiments, in response to detecting the change in biometric data of the first user and in accordance with a determination that the biometric data of the first user meets first biometric criteria (e.g., preset criteria for indicating that the first user is preparing to enter a more immersive three-dimensional environment, preset criteria for indicating that the first user has decreased engagement with the physical environment, preset criteria for indicating that the first user is in a deeper meditative state, etc.) (e.g., the heart rate of the user is lower than a first threshold heart rate, the breathing rate of the first user is less than a first threshold breathing rate, the blood pressure of the first user is lower than a first threshold blood pressure, movement of the first user that is below a first threshold amount of movement during a first threshold amount of time, body temperature of the first user that is lower than a first threshold body temperature, etc.), the computer system replaces the first view (e.g., first view 7206 in FIGS. 7T-7V, or another view, etc.) of the three-dimensional environment with a second view of the three-dimensional environment, where the representation of the physical environment has a reduced visual prominence in the second view of the three-dimensional environment than in the first view of the three-dimensional environment (e.g., transitioning from an augmented environment into an environment with a higher level of immersion, less connection to the physical environment, etc.). In some embodiments, the representation of the physical environment is replaced by a plain background (e.g., a light or dark background). In some embodiments, the representation of the physical environment is blurred, brightened with less color saturation, or darkened with less color saturation, etc. In some embodiments, in accordance with a determination that the biometric data of the first user meets first biometric criteria, the computer system does not replace the first view of the three-dimensional environment with the second view of the three-dimensional environment, and continues to display the representation of the physical environment with the existing visual prominence. In response to detecting a change in biometric data of the user, and in accordance with the biometric data meeting first biometric criteria, replacing a view of the three-dimensional environment to display portions of the physical environment with less visual prominence (e.g., than a level of visual prominence of the portions of the physical environment displayed before the biometric data meets the first biometric criteria) (e.g., automatically changing a background to further immerse the user in the three-dimensional environment (e.g., and reduce visual prominence of the portions of the physical environment that are displayed), in response to detecting that the user's biometric data has satisfied criteria, without requiring the user to request the change in background), provides improved visual feedback to the user and enables an operation to be performed (e.g., automatically) when a set of conditions has been met without requiring further user input.

In some embodiments, displaying the first user interface object having the first surface at the first position in the three-dimensional environment includes displaying the first surface of the first user interface object with values for one or more display properties (e.g., color, reflection, etc.) being selected in accordance with an appearance of a portion of the physical environment that is adjacent to (e.g., the portion of the physical environment is not blocked by other physical objects, representation of the portion of the physical environment is not blocked by other virtual objects in the three-dimensional environment) the first location in the physical environment (e.g., the location that corresponds to the first position of the first surface in the three-dimensional environment). Displaying the surface of the first user interface object with display properties that are based on an appearance of a portion of the physical environment that surrounds the first location in the physical environment (e.g., automatically changing a virtual surface to be displayed with features based on the physical environment and allowing the user to be aware of the user's physical surroundings without interrupting the user's session in the three-dimensional environment), provides improved visual feedback to the user.

In some embodiments, in response to detecting the change in biometric data of the first user and in accordance with a determination that the change in biometric data of the first user meets first criteria, the computer system changes an audio output mode of the computer system (e.g., of an audio output component of the computer system, of an audio component of the first display generation component, etc.) from a first audio output mode to a second audio output mode (e.g., from stereo sound to surround sound, from head-locked audio to spatial audio, etc.). In some embodiments, in response to detecting the change in biometric data of the first user: in accordance with a determination that the change in biometric data meets second criteria different from the first criteria (e.g., no longer meets the first criteria), the computer system changes the audio output mode of the computer system (e.g., of an audio output component of the computer system, of an audio component of the first display generation component, etc.) from the second audio output mode to the first audio output mode (e.g., from surround sound to stereo sound, from spatial audio to head-locked audio, etc.). Changing an audio mode from a first audio output mode to a second audio output mode in accordance with a change in the user's biometric data (e.g., updating, as the computer system automatically detects a change in the user's breathing, an audio mode of an audio output, in real-time, without requiring the user to manually input data about the user's breathing), provides improved audio feedback and enables an operation to be performed (e.g., automatically) when a set of conditions has been met.

In some embodiments, in response to detecting the change in biometric data of the first user, the computer system changes one or more characteristics of an audio output in accordance with the change in biometric data. In some embodiments, the computer system changes from a first track, album, media, etc. to a second track, album, media, etc. In some embodiments, the computer system changes the volume, frequency, pitch, harmonics, key, reverberation, and/or wave pattern, etc. of the audio output, etc. Changing characteristics of an audio output in accordance with a change in the user's biometric data (e.g., updating, as the computer system automatically detects a change in the user's breathing, audio properties of an audio output, in real-time, without requiring the user to manually input data about the user's breathing), provides improved audio feedback and enables an operation to be performed (e.g., automatically) when a set of conditions has been met.

In some embodiments, the first movement of the first user includes movement of a hand of the first user in the physical environment (e.g., movement 7016, movement 7059, movement 7051, movement 7049, movement 7045, movement 7047, etc., in FIGS. 7C-7D, 7E, 7G-7J, and 7K, movement of the hand 7102 shown in FIGS. 7M-7N, other movement, etc.). In some embodiments, the location of the hand during the movement remains separated from the first location that corresponds to the first position of the first surface of the first user interface object in the three-dimensional environment. In some embodiments, the movement of the hand includes movement of a portion of the hand relative to another portion of the hand without movement of the hand as a whole in the physical environment. In some embodiments, the movement of the hand includes movement of the hand as a whole in the physical environment. In some embodiments, the movement of the hand does not correspond to a recognized input gesture that causes performance of an operation that corresponds to the first user interface object. In some embodiments, the movement of the hand corresponds to a recognized input gesture that causes the performance of the operation that corresponds to the first user interface object, and the computer system performs the operation in response to recognizing the input gesture. Changing the appearance of the first user interface object in accordance with movement of the first user's hand in the physical environment (e.g., updating, as the computer system automatically detects a movement of the user's hand, display properties of the first user interface object, in real-time, without requiring the user to perform additional user input), provides improved audio feedback and enables an operation to be performed (e.g., automatically) when a set of conditions has been met.

In some embodiments, the computer system displays a virtual optical effect (e.g., representation 7201 of the optical effect in FIGS. 7P, 7R, and 7T-7V, another representation, etc.) (e.g., a virtual reflection, virtual shadow, virtual illumination, and/or change in color etc.) of the first surface at a position that corresponds to a representation of a physical surface (e.g., a floor surface, a window, a table top, ceiling, etc.) in the three-dimensional environment, where a position of the representation of the physical surface in the three-dimensional environment corresponds to a location of the physical surface in the physical environment. In some embodiments, the virtual optical effect of the first surface dynamically changes in accordance with the change in appearance of the first surface in the first user interface object in response to detecting the change in biometric data of the first user (e.g., the virtual optical effect is continually adjusted based on the movement and deformation of the first surface under the influence of the user's movement and/or biometric data). Displaying a virtual optical effect of the first surface at a position that corresponds to a representation of a physical surface in the three-dimensional environment, which corresponds to a location of the physical surface in the physical environment (e.g., automatically displaying virtual reflections, lights, and/or other optical effects on a surface that corresponds to a surface in the physical environment, and improving the immersive experience for the user as virtual optical effects are applied to surfaces corresponding to surfaces that are in the user's surrounding physical environment), provides improved visual feedback to the user.

In some embodiments, the virtual optical effect includes a virtual reflection, and the physical surface is a floor of the physical environment. Displaying a virtual reflection on the surface that to a representation of a floor in the three-dimensional environment, which corresponds to a location of the floor in the physical environment (e.g., automatically displaying a virtual reflections on a surface that corresponds to the floor in the physical environment, and improving the immersive experience for the user as virtual reflection is applied to a representation of the floor that is in the user's surrounding physical environment), provides improved visual feedback to the user.

In some embodiments, the virtual optical effect includes a virtual illumination, and the physical surface is a ceiling of the physical environment. In some embodiments, multiple virtual optical effects are displayed, at positions corresponding to different types of physical surfaces. In some embodiments, multiple virtual optical effects are displayed at a position corresponding a respective physical surface. In some embodiments, the multiple virtual optical effects include displaying both a virtual reflection and a virtual illumination (e.g., where a respective physical surface is a wall of the physical environment, first virtual light and first virtual shadows of the first surface are both displayed at positions that correspond to the same or different portions of the representation of the wall; where a respective physical surface is a floor of the physical environment, second virtual light and second virtual shadows of the first surface are both displayed at positions that corresponds to the same or different portions of the representation of the floor; etc.). Displaying a virtual illumination effect of the first surface at a position that corresponds to a representation of a ceiling in the three-dimensional environment, which corresponds to a location of the ceiling in the physical environment (e.g., automatically displaying virtual lighting on a surface that corresponds to a ceiling in the physical environment, and improving immersive experience for the user as virtual lighting is applied to a representation of the ceiling that is in the user's surrounding physical environment), provides improved visual feedback to the user.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, and 11000) are also applicable in an analogous manner to method 12000 described above with respect to FIG. 12. For example, the gestures, gaze inputs, physical objects, user interface objects, controls, movements, criteria, three-dimensional environment, display generation component, surface, representation of physical object, virtual objects, and/or animations described above with reference to method 12000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, and 11000). For brevity, these details are not repeated here.

The operations described above with reference to FIGS. 8, 9, 10, 11, and 12 are, optionally, implemented by components depicted in FIGS. 1-6. In some embodiments, aspects/operations of methods 8000, 9000, 10000, 11000, and 12000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with a first display generation component and one or more first input devices:
displaying, via the first display generation component, a first view of a three-dimensional environment, including displaying a representation of a physical environment surrounding the first display generation component and displaying a first user interface object comprising a first surface, wherein the first surface is displayed at a first position in the three-dimensional environment that corresponds to a first location in the physical environment;
while displaying the first view of the three-dimensional environment, detecting movement of a first person in the physical environment, wherein the first person is not a user of the one or more first input devices in communication with the computer system; and
in response to detecting the movement of the first person in the physical environment:
in accordance with a determination that the movement of the first person in the physical environment has a first spatial relationship to the first location in the physical environment that corresponds to the first surface, moving the first surface of the first user interface object in the first view of the three-dimensional environment in accordance with the movement of the first person in the physical environment.

2. The method of claim 1, including:
in response to detecting the movement of the first person in the physical environment:
in accordance with a determination that the movement of the first person in the physical environment does not have the first spatial relationship to the first location in the physical environment that corresponds to the first user interface object, forgoing movement of the first surface of the first user interface object in the first view of the three-dimensional environment in accordance with the movement of the first person in the physical environment.

3. The method of claim 1, including:
obtaining values of one or more characteristics of the movement of the first person in the physical environment; and
determining values of one or more characteristics of the movement of the first surface of the first user interface object in accordance with the values of the one or more characteristics of the movement of the first person in the physical environment, while a location of the first person is spatially separated from the first location by a distance.

4. The method of claim 1, including:
in response to detecting movement of the first person in the physical environment relative to the first location in the physical environment:
in accordance with a determination that at least a portion of the first person in the physical environment has a second spatial relationship to the first location in the physical environment, generating a first audio output in conjunction with moving the first surface in the three-dimensional environment.

5. The method of claim 4, including:
while displaying the first view of the three-dimensional environment, detecting movement of at least a portion of a second person in the physical environment, wherein the second person is a user of the one or more first input devices in communication with the computer system; and
in response to detecting the movement of at least the portion of the second person in the physical environment:
in accordance with a determination that at least the portion of the second person in the physical environment has the second spatial relationship to the first location in the physical environment, generating a second audio output in conjunction with moving the first surface in the three-dimensional environment, wherein the second audio output is different from the first audio output in at least one of one or more characteristics of the first audio output and the second audio output.

6. The method of claim 1, including:
in response to detecting the movement of the first person in the physical environment:
in accordance with the determination that the movement of the first person in the physical environment has a third spatial relationship to the first location in the physical environment that corresponds to the first position of the first surface of the first user interface object, changing a first display property of the first surface of the first user interface object.

7. The method of claim 6, wherein changing the first display property of the first surface of the first user interface object includes changing the first display property of a first portion of the first surface relative to a second portion of the first surface.

8. The method of claim 7, wherein changing the first display property of the first portion of the first surface relative to the second portion of the first surface includes changing the first display property of the first portion of the first surface relative to the second portion of the first surface by a first amount, and changing the first display property of a third portion of the first surface that is between the first portion and the second portion of the first surface by a second amount that is smaller than the first amount.

9. The method of claim 6, including:
in response to detecting the movement of the first person in the physical environment relative to the first location in the physical environment:
in accordance with a determination that the movement of the first person in the physical environment does not have the third spatial relationship to the first location in the physical environment that corresponds to the first position of the first surface of the first user interface object, restoring the first display property of the first surface of the first user interface object.

10. The method of claim 6, including:
in response to detecting the movement of the first person in the physical environment relative to the first location in the physical environment:
in accordance with a determination that a location of a first portion of the first person has the third spatial relationship to the first location while a location of a second portion of the first person does not have the third spatial relationship to the first location, changing the first display property of the first surface of the first user interface object includes changing the first display property of the first portion of the first surface without changing the first display property of the second portion of the first surface; and
in accordance with a determination that an updated location of the first portion of the first person does not have the third spatial relationship to the first location while an updated location of the second portion of the first person has the third spatial relationship to the first location, changing the first display property of the first surface of the first user interface object includes restoring changes made to the first display property of the first portion of the first surface; and changing the first display property of the second portion of the first surface.

11. The method of claim 1, including:
in response to detecting the movement of the first person in the physical environment:
in accordance with the determination that the movement of the first person in the physical environment has the first spatial relationship to the first location in the physical environment that corresponds to the first user interface object, modifying one or more display properties of the first surface in accordance with an appearance of the first person while the first person is at a location that corresponds to a position behind the first surface of the first user interface object relative to a viewpoint of the first view of the three-dimensional environment.

12. The method of claim 11, wherein modifying the one or more display properties of the first surface in accordance with the appearance of the first person includes:
modifying the one or more display properties of a first portion of the first surface in accordance with the appearance of the first person, without modifying the one or more display properties of a second portion of the first surface in accordance with the appearance of the first person.

13. The method of claim 12, wherein modifying the one or more display properties of the first surface in accordance with the appearance of the first person includes:
modifying the one or more display properties of the first portion of the first surface in accordance with the appearance of the first person by a first amount; and
modifying the one or more display properties of a third portion of the first surface in accordance with the appearance of the first person by a second amount, wherein the third portion of the first surface is between the first portion and the second portion of the first surface, and the second amount is less than the first amount.

14. The method of claim 1, wherein the first surface of the first user interface object includes one or more selectable user interface objects.

15. The method of claim 1, wherein:
the first surface of the first user interface object includes media content.

16. The method of claim 1, including:
in response to detecting the movement of the first person in the physical environment:
after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, restoring the first surface of the first user interface object in the first view of the three-dimensional environment.

17. The method of claim 1, including:
in response to detecting the movement of the first person in the physical environment:
after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, continuing movement of the first surface over a first period of time with decreasing magnitude until the first surface is restored to a state before movement of the first surface in accordance with the movement of the first person was started.

18. The method of claim 1, wherein moving the first surface of the first user interface object in the first view of the three-dimensional environment in accordance with the movement of the first person in the physical environment includes:
in accordance with a determination that a current location of the first person is behind the first location, relative to a user of the computer system, moving the first surface in a first spatial portion of the three-dimensional environment that corresponds to a first spatial region between the first person and the user of the computer system in the physical environment; and
in accordance with a determination that a current location of the first person is in front of the first location, relative to a user of the computer system, moving the first surface in a second spatial portion of the three-dimensional environment that corresponds to a second spatial region behind the first person relative to the user of the computer system in the physical environment.

19. The method of claim 1, wherein moving the first surface of the first user interface object includes deforming the first surface of the first user interface object.

20. The method of claim 1, wherein moving the first surface of the first user interface object includes stretching and/or compressing at least a portion of the first surface.

21. The method of claim 1, wherein moving the first surface of the first user interface object includes moving a first portion of the first surface relative to a second portion of the first surface.

22. A computer system, comprising:
a first display generation component;
one or more first input devices;
one or more processors; and
memory storing one or more programs, wherein the one or more programs are configured to be executed by the one or more processors, the one or more programs including instructions for:
displaying, via the first display generation component, a first view of a three-dimensional environment, including displaying a representation of a physical environment surrounding the first display generation component and displaying a first user interface object comprising a first surface, wherein the first surface is displayed at a first position in the three-dimensional environment that corresponds to a first location in the physical environment;
while displaying the first view of the three-dimensional environment, detecting movement of a first person in the physical environment, wherein the first person is not a user of the one or more first input devices in communication with the computer system; and
in response to detecting the movement of the first person in the physical environment:
in accordance with a determination that the movement of the first person in the physical environment has a first spatial relationship to the first location in the physical environment that corresponds to the first surface, moving the first surface of the first user interface object in the first view of the three-dimensional environment in accordance with the movement of the first person in the physical environment.

23. The computer system of claim 22, wherein the one or more programs include instructions for:
in response to detecting the movement of the first person in the physical environment:
in accordance with a determination that the movement of the first person in the physical environment does not have the first spatial relationship to the first location in the physical environment that corresponds to the first user interface object, forgoing movement of the first surface of the first user interface object in the first view of the three-dimensional environment in accordance with the movement of the first person in the physical environment.

24. The computer system of claim 22, wherein the one or more programs include instructions for:
- obtaining values of one or more characteristics of the movement of the first person in the physical environment; and
- determining values of one or more characteristics of the movement of the first surface of the first user interface object in accordance with the values of the one or more characteristics of the movement of the first person in the physical environment, while a location of the first person is spatially separated from the first location by a distance.

25. The computer system of claim 22, wherein the one or more programs include instructions for:
- in response to detecting movement of the first person in the physical environment relative to the first location in the physical environment:
  - in accordance with a determination that at least a portion of the first person in the physical environment has a second spatial relationship to the first location in the physical environment, generating a first audio output in conjunction with moving the first surface in the three-dimensional environment.

26. The computer system of claim 25, wherein the one or more programs include instructions for:
- while displaying the first view of the three-dimensional environment, detecting movement of at least a portion of a second person in the physical environment, wherein the second person is a user of the one or more first input devices in communication with the computer system; and
- in response to detecting the movement of at least the portion of the second person in the physical environment:
  - in accordance with a determination that at least the portion of the second person in the physical environment has the second spatial relationship to the first location in the physical environment, generating a second audio output in conjunction with moving the first surface in the three-dimensional environment, wherein the second audio output is different from the first audio output in at least one of one or more characteristics of the first audio output and the second audio output.

27. The computer system of claim 22, wherein the one or more programs include instructions for:
- in response to detecting the movement of the first person in the physical environment:
  - in accordance with the determination that the movement of the first person in the physical environment has a third spatial relationship to the first location in the physical environment that corresponds to the first position of the first surface of the first user interface object, changing a first display property of the first surface of the first user interface object.

28. The computer system of claim 27, wherein changing the first display property of the first surface of the first user interface object includes changing the first display property of a first portion of the first surface relative to a second portion of the first surface.

29. The computer system of claim 28, wherein changing the first display property of the first portion of the first surface relative to the second portion of the first surface includes changing the first display property of the first portion of the first surface relative to the second portion of the first surface by a first amount, and changing the first display property of a third portion of the first surface that is between the first portion and the second portion of the first surface by a second amount that is smaller than the first amount.

30. The computer system of claim 27, wherein the one or more programs include instructions for:
- in response to detecting the movement of the first person in the physical environment relative to the first location in the physical environment:
  - in accordance with a determination that the movement of the first person in the physical environment does not have the third spatial relationship to the first location in the physical environment that corresponds to the first position of the first surface of the first user interface object, restoring the first display property of the first surface of the first user interface object.

31. The computer system of claim 27, wherein the one or more programs include instructions for:
- in response to detecting the movement of the first person in the physical environment relative to the first location in the physical environment:
  - in accordance with a determination that a location of a first portion of the first person has the third spatial relationship to the first location while a location of a second portion of the first person does not have the third spatial relationship to the first location, changing the first display property of the first surface of the first user interface object includes changing the first display property of the first portion of the first surface without changing the first display property of the second portion of the first surface; and
  - in accordance with a determination that an updated location of the first portion of the first person does not have the third spatial relationship to the first location while an updated location of the second portion of the first person has the third spatial relationship to the first location, changing the first display property of the first surface of the first user interface object includes restoring changes made to the first display property of the first portion of the first surface; and changing the first display property of the second portion of the first surface.

32. The computer system of claim 22, wherein the one or more programs include instructions for:
- in response to detecting the movement of the first person in the physical environment:
  - in accordance with the determination that the movement of the first person in the physical environment has the first spatial relationship to the first location in the physical environment that corresponds to the first user interface object, modifying one or more display properties of the first surface in accordance with an appearance of the first person while the first person is at a location that corresponds to a position behind the first surface of the first user interface object relative to a viewpoint of the first view of the three-dimensional environment.

33. The computer system of claim 32, wherein modifying the one or more display properties of the first surface in accordance with the appearance of the first person includes:
- modifying the one or more display properties of a first portion of the first surface in accordance with the appearance of the first person, without modifying the one or more display properties of a second portion of the first surface in accordance with the appearance of the first person.

34. The computer system of claim 33, wherein modifying the one or more display properties of the first surface in accordance with the appearance of the first person includes:
modifying the one or more display properties of the first portion of the first surface in accordance with the appearance of the first person by a first amount; and
modifying the one or more display properties of a third portion of the first surface in accordance with the appearance of the first person by a second amount, wherein the third portion of the first surface is between the first portion and the second portion of the first surface, and the second amount is less than the first amount.

35. The computer system of claim 22, wherein the first surface of the first user interface object includes one or more selectable user interface objects.

36. The computer system of claim 22, wherein:
the first surface of the first user interface object includes media content.

37. The computer system of claim 22, wherein the one or more programs include instructions for:
in response to detecting the movement of the first person in the physical environment:
after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, restoring the first surface of the first user interface object in the first view of the three-dimensional environment.

38. The computer system of claim 22, wherein the one or more programs include instructions for:
in response to detecting the movement of the first person in the physical environment:
after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, continuing movement of the first surface over a first period of time with decreasing magnitude until the first surface is restored to a state before movement of the first surface in accordance with the movement of the first person was started.

39. The computer system of claim 22, wherein moving the first surface of the first user interface object in the first view of the three-dimensional environment in accordance with the movement of the first person in the physical environment includes:
in accordance with a determination that a current location of the first person is behind the first location, relative to a user of the computer system, moving the first surface in a first spatial portion of the three-dimensional environment that corresponds to a first spatial region between the first person and the user of the computer system in the physical environment; and
in accordance with a determination that a current location of the first person is in front of the first location, relative to a user of the computer system, moving the first surface in a second spatial portion of the three-dimensional environment that corresponds to a second spatial region behind the first person relative to the user of the computer system in the physical environment.

40. The computer system of claim 22, wherein moving the first surface of the first user interface object includes deforming the first surface of the first user interface object.

41. The computer system of claim 22, wherein moving the first surface of the first user interface object includes stretching and/or compressing at least a portion of the first surface.

42. The computer system of claim 22, wherein moving the first surface of the first user interface object includes moving a first portion of the first surface relative to a second portion of the first surface.

43. A non-transitory computer readable storage medium storing one or more programs, the one or more programs comprising instructions that, when executed by a computer system that includes a first display generation component and one or more first input devices, cause the computer system to perform operations, including:
displaying, via the first display generation component, a first view of a three-dimensional environment, including displaying a representation of a physical environment surrounding the first display generation component and displaying a first user interface object comprising a first surface, wherein the first surface is displayed at a first position in the three-dimensional environment that corresponds to a first location in the physical environment;
while displaying the first view of the three-dimensional environment, detecting movement of a first person in the physical environment, wherein the first person is not a user of the one or more first input devices in communication with the computer system; and
in response to detecting the movement of the first person in the physical environment:
in accordance with a determination that the movement of the first person in the physical environment has a first spatial relationship to the first location in the physical environment that corresponds to the first surface, moving the first surface of the first user interface object in the first view of the three-dimensional environment in accordance with the movement of the first person in the physical environment.

44. The non-transitory computer readable storage medium of claim 43, wherein the one or more programs include instructions, which when executed by the computer system, cause the computer system to:
in response to detecting the movement of the first person in the physical environment:
in accordance with a determination that the movement of the first person in the physical environment does not have the first spatial relationship to the first location in the physical environment that corresponds to the first user interface object, forgo movement of the first surface of the first user interface object in the first view of the three-dimensional environment in accordance with the movement of the first person in the physical environment.

45. The non-transitory computer readable storage medium of claim 43, wherein the one or more programs include instructions, which when executed by the computer system, cause the computer system to:
obtain values of one or more characteristics of the movement of the first person in the physical environment; and determine values of one or more characteristics of the movement of the first surface of the first user interface object in accordance with the values of the one or more characteristics of the movement of the first person in the physical environment, while a location of the first person is spatially separated from the first location by a distance.

46. The non-transitory computer readable storage medium of claim 43, wherein the one or more programs include instructions, which when executed by the computer system, cause the computer system to:
in response to detecting movement of the first person in the physical environment relative to the first location in the physical environment:
in accordance with a determination that at least a portion of the first person in the physical environment has a second spatial relationship to the first location in the physical environment, generate a first audio output in conjunction with moving the first surface in the three-dimensional environment.

47. The non-transitory computer readable storage medium of claim 46, wherein the one or more programs include instructions, which when executed by the computer system, cause the computer system to:
while displaying the first view of the three-dimensional environment, detect movement of at least a portion of a second person in the physical environment, wherein the second person is a user of the one or more first input devices in communication with the computer system; and
in response to detecting the movement of at least the portion of the second person in the physical environment:
in accordance with a determination that at least the portion of the second person in the physical environment has the second spatial relationship to the first location in the physical environment, generate a second audio output in conjunction with moving the first surface in the three-dimensional environment, wherein the second audio output is different from the first audio output in at least one of one or more characteristics of the first audio output and the second audio output.

48. The non-transitory computer readable storage medium of claim 43, wherein the one or more programs include instructions, which when executed by the computer system, cause the computer system to:
in response to detecting the movement of the first person in the physical environment:
in accordance with the determination that the movement of the first person in the physical environment has a third spatial relationship to the first location in the physical environment that corresponds to the first position of the first surface of the first user interface object, change a first display property of the first surface of the first user interface object.

49. The non-transitory computer readable storage medium of claim 48, wherein changing the first display property of the first surface of the first user interface object includes changing the first display property of a first portion of the first surface relative to a second portion of the first surface.

50. The non-transitory computer readable storage medium of claim 49, wherein changing the first display property of the first portion of the first surface relative to the second portion of the first surface includes changing the first display property of the first portion of the first surface relative to the second portion of the first surface by a first amount, and changing the first display property of a third portion of the first surface that is between the first portion and the second portion of the first surface by a second amount that is smaller than the first amount.

51. The non-transitory computer readable storage medium of claim 48, wherein the one or more programs include instructions, which when executed by the computer system, cause the computer system to:
in response to detecting the movement of the first person in the physical environment relative to the first location in the physical environment:
in accordance with a determination that the movement of the first person in the physical environment does not have the third spatial relationship to the first location in the physical environment that corresponds to the first position of the first surface of the first user interface object, restore the first display property of the first surface of the first user interface object.

52. The non-transitory computer readable storage medium of claim 48, wherein the one or more programs include instructions, which when executed by the computer system, cause the computer system to:
in response to detecting the movement of the first person in the physical environment relative to the first location in the physical environment:
in accordance with a determination that a location of a first portion of the first person has the third spatial relationship to the first location while a location of a second portion of the first person does not have the third spatial relationship to the first location, change the first display property of the first surface of the first user interface object includes changing the first display property of the first portion of the first surface without changing the first display property of the second portion of the first surface; and
in accordance with a determination that an updated location of the first portion of the first person does not have the third spatial relationship to the first location while an updated location of the second portion of the first person has the third spatial relationship to the first location, change the first display property of the first surface of the first user interface object includes restoring changes made to the first display property of the first portion of the first surface; and changing the first display property of the second portion of the first surface.

53. The non-transitory computer readable storage medium of claim 43, wherein the one or more programs include instructions, which when executed by the computer system, cause the computer system to:
in response to detecting the movement of the first person in the physical environment:
in accordance with the determination that the movement of the first person in the physical environment has the first spatial relationship to the first location in the physical environment that corresponds to the first user interface object, modify one or more display properties of the first surface in accordance with an appearance of the first person while the first person is at a location that corresponds to a position behind the first surface of the first user interface object relative to a viewpoint of the first view of the three-dimensional environment.

54. The non-transitory computer readable storage medium of claim 53, wherein the one or more programs include instructions, which when executed by the computer system, cause the computer system to:

modify the one or more display properties of a first portion of the first surface in accordance with the appearance of the first person, without modifying the one or more display properties of a second portion of the first surface in accordance with the appearance of the first person.

55. The non-transitory computer readable storage medium of claim 54, wherein modifying the one or more display properties of the first surface in accordance with the appearance of the first person includes:

modifying the one or more display properties of the first portion of the first surface in accordance with the appearance of the first person by a first amount; and modifying the one or more display properties of a third portion of the first surface in accordance with the appearance of the first person by a second amount, wherein the third portion of the first surface is between the first portion and the second portion of the first surface, and the second amount is less than the first amount.

56. The non-transitory computer readable storage medium of claim 43, wherein the first surface of the first user interface object includes one or more selectable user interface objects.

57. The non-transitory computer readable storage medium of claim 43, wherein:

the first surface of the first user interface object includes media content.

58. The non-transitory computer readable storage medium of claim 43, wherein the one or more programs include instructions, which when executed by the computer system, cause the computer system to:

in response to detecting the movement of the first person in the physical environment:

after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, restore the first surface of the first user interface object in the first view of the three-dimensional environment.

59. The non-transitory computer readable storage medium of claim 43, wherein the one or more programs include instructions, which when executed by the computer system, cause the computer system to:

in response to detecting the movement of the first person in the physical environment:

after moving the first surface of the first user interface object in the first view of the three-dimensional environment in accordance with the movement of the first person in the physical environment, in accordance with a determination that the movement of the first person in the physical environment ceases to have the first spatial relationship to the first location in the physical environment that corresponds to the first user interface object, continue movement of the first surface over a first period of time with decreasing magnitude until the first surface is restored to a state before movement of the first surface in accordance with the movement of the first person was started.

60. The non-transitory computer readable storage medium of claim 43, wherein moving the first surface of the first user interface object in the first view of the three-dimensional environment in accordance with the movement of the first person in the physical environment includes:

in accordance with a determination that a current location of the first person is behind the first location, relative to a user of the computer system, moving the first surface in a first spatial portion of the three-dimensional environment that corresponds to a first spatial region between the first person and the user of the computer system in the physical environment; and in accordance with a determination that a current location of the first person is in front of the first location, relative to a user of the computer system, moving the first surface in a second spatial portion of the three-dimensional environment that corresponds to a second spatial region behind the first person relative to the user of the computer system in the physical environment.

61. The non-transitory computer readable storage medium of claim 43, wherein moving the first surface of the first user interface object includes deforming the first surface of the first user interface object.

62. The non-transitory computer readable storage medium of claim 43, wherein moving the first surface of the first user interface object includes stretching and/or compressing at least a portion of the first surface.

63. The non-transitory computer readable storage medium of claim 43, wherein moving the first surface of the first user interface object includes moving a first portion of the first surface relative to a second portion of the first surface.

\* \* \* \* \*